(12) United States Patent
Sikchi et al.

(10) Patent No.: US 9,239,821 B2
(45) Date of Patent: Jan. 19, 2016

(54) TRANSLATION FILE

(71) Applicant: Microsoft Technology Licensing, LLC, Redmond, WA (US)

(72) Inventors: Prakash Sikchi, Issaquah, WA (US); Evgeny N. Veselov, Sammamish, WA (US); Stephen J. Mooney, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/530,237

(22) Filed: Oct. 31, 2014

(65) Prior Publication Data

US 2015/0052424 A1 Feb. 19, 2015

Related U.S. Application Data

(63) Continuation of application No. 12/028,651, filed on Feb. 8, 2008, now Pat. No. 8,892,993, which is a continuation of application No. 10/632,297, filed on Aug. 1, 2003, now Pat. No. 7,406,660.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/2264* (2013.01); *G06F 17/24* (2013.01); *G06F 17/2725* (2013.01)

(58) Field of Classification Search
CPC .......... G06F 17/30917; G06F 17/2264; G06F 17/243; G06F 17/2725
See application file for complete search history.

(56) References Cited

U.S. PATENT DOCUMENTS 2,804,878 A 9/1957 Fishwood et al.
3,091,077 A 5/1963 Erickson et al.
(Continued)

FOREIGN PATENT DOCUMENTS

AU 2006200285 9/2006
AU 2006200483 10/2006
(Continued)

OTHER PUBLICATIONS

Supplemental Notice of Allowance in U.S. Appl. No. 12/061,613, mailed Nov. 17, 2014, 2 pgs.
(Continued)

*Primary Examiner* — Laurie Ries
(74) *Attorney, Agent, or Firm* — Julie Kane Akhter; Danielle Johnston Holmes; Micky Minhas

(57) ABSTRACT

A data processing application uses a translation file to render a visual surface based on underlying structured data. The data processing application provides mapping between nodes associated with the visual surface and nodes associated with the structured data. The mapping is generated in two phases. In a first phase, the data processing application adds mapping functions to the translation file. In the second phase, the data processing application renders the visual surface on the basis of a specific instance of the structured data, and, in the process, executes the mapping functions within the translation file to provide specific pointer information that is embedded amongst the nodes associated with the visual surface. The pointer information points back to specific locations in the structured data, thus providing mapping between the visual surface and the structured data. The structured data can be formed using Extensible Markup Language (XML). The visual surface can be formed using Hypertext Markup Language (HTML). The translation file can be formed using Extensible Stylesheet Language Transformation (XSLT).

20 Claims, 13 Drawing Sheets

(51) Int. Cl.
*G06F 17/27* (2006.01)
*G06F 17/24* (2006.01)

(56) References Cited

U.S. PATENT DOCUMENTS

| | | |
|---|---|---|
| 3,104,520 A | 9/1963 | Cazier et al. |
| 3,195,805 A | 7/1965 | Cholvin et al. |
| 3,196,606 A | 7/1965 | Cholvin et al. |
| 3,812,942 A | 5/1974 | Espenschied et al. |
| 3,874,828 A | 4/1975 | Herschler et al. |
| 3,961,748 A | 6/1976 | McNabney |
| 4,005,578 A | 2/1977 | McInerney |
| 4,005,579 A | 2/1977 | Lloyd |
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yamane et al. |
| 4,396,345 A | 8/1983 | Hutchinson |
| 4,498,147 A | 2/1985 | Agnew et al. |
| 4,514,800 A | 4/1985 | Gruner et al. |
| 4,514,985 A | 5/1985 | Cadeddu |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,783,648 A | 11/1988 | Homma et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 4,975,690 A | 12/1990 | Torres |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,202,828 A | 4/1993 | Vertelney et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,257,646 A | 11/1993 | Meyer |
| 5,274,803 A | 12/1993 | Dubin et al. |
| 5,287,448 A | 2/1994 | Nicol et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,325,481 A | 6/1994 | Hunt |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,388,967 A | 2/1995 | Firnhaber et al. |
| 5,388,968 A | 2/1995 | Wood et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,965 A | 7/1995 | Matheny et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,456,582 A | 10/1995 | Firnhaber et al. |
| 5,459,865 A | 10/1995 | Heninger et al. |
| 5,463,726 A | 10/1995 | Price |
| 5,481,722 A | 1/1996 | Skinner |
| 5,497,489 A | 3/1996 | Menne |
| 5,504,898 A | 4/1996 | Klein |
| 5,511,116 A | 4/1996 | Shastry et al. |
| 5,517,655 A | 5/1996 | Collins et al. |
| 5,523,775 A | 6/1996 | Capps |
| 5,535,389 A | 7/1996 | Elder et al. |
| 5,537,596 A | 7/1996 | Yu et al. |
| 5,540,558 A | 7/1996 | Harden et al. |
| 5,542,070 A | 7/1996 | LeBlanc et al. |
| 5,548,745 A | 8/1996 | Egan et al. |
| 5,550,976 A | 8/1996 | Henderson et al. |
| 5,551,035 A | 8/1996 | Arnold et al. |
| 5,555,325 A | 9/1996 | Burger |
| 5,556,271 A | 9/1996 | Zuercher et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,612,719 A | 3/1997 | Beernink et al. |
| 5,613,837 A | 3/1997 | Konishi et al. |
| 5,625,783 A | 4/1997 | Ezekiel et al. |
| 5,627,979 A | 5/1997 | Chang et al. |
| 5,630,126 A | 5/1997 | Redpath |
| 5,630,706 A | 5/1997 | Yang |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,644,739 A | 7/1997 | Moursund |
| 5,649,099 A | 7/1997 | Theimer et al. |
| 5,655,887 A | 8/1997 | Chou |
| 5,659,729 A | 8/1997 | Nielsen |
| 5,664,133 A | 9/1997 | Malamud et al. |
| 5,664,178 A | 9/1997 | Sinofsky |
| 5,664,938 A | 9/1997 | Yang |
| 5,668,966 A | 9/1997 | Ono et al. |
| 5,669,005 A | 9/1997 | Curbow et al. |
| 5,681,151 A | 10/1997 | Wood |
| 5,682,536 A | 10/1997 | Atkinson et al. |
| 5,689,667 A | 11/1997 | Kurtenbach |
| 5,689,703 A | 11/1997 | Atkinson et al. |
| 5,692,540 A | 12/1997 | Huang |
| 5,704,029 A | 12/1997 | Wright, Jr. |
| 5,706,501 A | 1/1998 | Horikiri et al. |
| 5,717,939 A | 2/1998 | Bricklin et al. |
| 5,720,016 A | 2/1998 | Egashira |
| 5,721,824 A | 2/1998 | Taylor |
| 5,727,129 A | 3/1998 | Barrett et al. |
| 5,734,380 A | 3/1998 | Adams et al. |
| 5,740,439 A | 4/1998 | Atkinson et al. |
| 5,740,455 A | 4/1998 | Pavley et al. |
| 5,742,504 A | 4/1998 | Meyer et al. |
| 5,742,795 A | 4/1998 | Kussel |
| 5,745,683 A | 4/1998 | Lee et al. |
| 5,745,712 A | 4/1998 | Turpin et al. |

(56) References Cited

U.S. PATENT DOCUMENTS

| | | | |
|---|---|---|---|
| 5,748,807 | A | 5/1998 | Lopresti et al. |
| 5,758,184 | A | 5/1998 | Lucovsky et al. |
| 5,758,358 | A | 5/1998 | Ebbo |
| 5,761,408 | A | 6/1998 | Kolawa et al. |
| 5,761,683 | A | 6/1998 | Logan et al. |
| 5,764,984 | A | 6/1998 | Loucks |
| 5,764,985 | A | 6/1998 | Smale |
| 5,778,372 | A | 7/1998 | Cordell et al. |
| 5,778,402 | A | 7/1998 | Gipson |
| 5,784,555 | A | 7/1998 | Stone |
| 5,785,081 | A | 7/1998 | Krawczyk et al. |
| 5,787,274 | A | 7/1998 | Agrawal et al. |
| 5,790,796 | A | 8/1998 | Sadowsky |
| 5,796,403 | A | 8/1998 | Adams et al. |
| 5,798,757 | A | 8/1998 | Smith |
| 5,799,311 | A | 8/1998 | Agrawal et al. |
| 5,801,701 | A | 9/1998 | Koppolu et al. |
| 5,801,702 | A | 9/1998 | Dolan et al. |
| 5,802,304 | A | 9/1998 | Stone |
| 5,802,530 | A | 9/1998 | Van Hoff |
| 5,803,715 | A | 9/1998 | Kitchener |
| 5,805,165 | A | 9/1998 | Thorne et al. |
| 5,805,824 | A | 9/1998 | Kappe |
| 5,806,079 | A | 9/1998 | Rivette et al. |
| 5,815,138 | A | 9/1998 | Tsubaki et al. |
| 5,815,830 | A | 9/1998 | Anthony |
| 5,818,444 | A | 10/1998 | Alimpich et al. |
| 5,819,034 | A | 10/1998 | Joseph et al. |
| 5,825,359 | A | 10/1998 | Derby et al. |
| 5,826,031 | A | 10/1998 | Nielsen |
| 5,826,265 | A | 10/1998 | Van Huben et al. |
| 5,835,777 | A | 11/1998 | Staelin |
| 5,838,906 | A | 11/1998 | Doyle et al. |
| 5,842,018 | A | 11/1998 | Atkinson et al. |
| 5,845,077 | A | 12/1998 | Fawcett |
| 5,845,090 | A | 12/1998 | Collins, III et al. |
| 5,845,122 | A | 12/1998 | Nielsen et al. |
| 5,845,299 | A | 12/1998 | Arora et al. |
| 5,854,630 | A | 12/1998 | Nielsen |
| 5,859,973 | A | 1/1999 | Carpenter et al. |
| 5,862,372 | A | 1/1999 | Morris et al. |
| 5,862,379 | A | 1/1999 | Rubin et al. |
| 5,864,819 | A | 1/1999 | De Armas et al. |
| 5,870,735 | A | 2/1999 | Agrawal et al. |
| 5,873,088 | A | 2/1999 | Hayashi et al. |
| 5,875,815 | A | 3/1999 | Ungerecht et al. |
| 5,898,434 | A | 4/1999 | Small et al. |
| 5,905,492 | A | 5/1999 | Straub et al. |
| 5,907,621 | A | 5/1999 | Bachman et al. |
| 5,907,704 | A | 5/1999 | Gudmundson et al. |
| 5,910,895 | A | 6/1999 | Proskauer et al. |
| 5,911,776 | A | 6/1999 | Guck |
| 5,915,112 | A | 6/1999 | Boutcher |
| 5,919,247 | A | 7/1999 | Van Hoff et al. |
| 5,922,072 | A | 7/1999 | Hutchinson et al. |
| 5,926,796 | A | 7/1999 | Walker et al. |
| 5,928,363 | A | 7/1999 | Ruvolo |
| 5,929,858 | A | 7/1999 | Shibata et al. |
| RE36,281 | E | 8/1999 | Zuercher et al. |
| 5,940,075 | A | 8/1999 | Mutschler, III et al. |
| 5,947,711 | A | 9/1999 | Myers et al. |
| 5,950,010 | A | 9/1999 | Hesse et al. |
| 5,950,221 | A | 9/1999 | Draves et al. |
| 5,953,731 | A | 9/1999 | Glaser |
| 5,956,481 | A | 9/1999 | Walsh et al. |
| 5,960,199 | A | 9/1999 | Brodsky et al. |
| 5,960,411 | A | 9/1999 | Hartman et al. |
| 5,963,208 | A | 10/1999 | Dolan et al. |
| 5,963,964 | A | 10/1999 | Nielsen |
| 5,973,696 | A | 10/1999 | Agranat et al. |
| 5,974,454 | A | 10/1999 | Apfel et al. |
| 5,982,370 | A | 11/1999 | Kamper |
| 5,983,348 | A | 11/1999 | Ji |
| 5,986,657 | A | 11/1999 | Berteig et al. |
| 5,987,480 | A | 11/1999 | Donohue et al. |
| 5,991,710 | A | 11/1999 | Papineni et al. |
| 5,991,731 | A | 11/1999 | Colon et al. |
| 5,991,877 | A | 11/1999 | Luckenbaugh |
| 5,995,103 | A | 11/1999 | Ashe |
| 5,999,740 | A | 12/1999 | Rowley |
| 6,005,570 | A | 12/1999 | Gayraud et al. |
| 6,006,227 | A | 12/1999 | Freeman et al. |
| 6,006,241 | A | 12/1999 | Purnaveja et al. |
| 6,012,066 | A | 1/2000 | Discount et al. |
| 6,014,135 | A | 1/2000 | Fernandes |
| 6,016,520 | A | 1/2000 | Facq et al. |
| 6,018,743 | A | 1/2000 | Xu |
| 6,021,403 | A | 2/2000 | Horvitz et al. |
| 6,026,379 | A | 2/2000 | Haller et al. |
| 6,026,416 | A | 2/2000 | Kanerva et al. |
| 6,031,989 | A | 2/2000 | Cordell et al. |
| 6,035,297 | A | 3/2000 | Van Huben et al. |
| 6,035,309 | A | 3/2000 | Dauerer et al. |
| 6,035,336 | A | 3/2000 | Lu et al. |
| 6,044,205 | A | 3/2000 | Reed et al. |
| 6,052,531 | A | 4/2000 | Waldin et al. |
| 6,052,710 | A | 4/2000 | Saliba et al. |
| 6,054,987 | A | 4/2000 | Richardson |
| 6,057,837 | A | 5/2000 | Hatakeda et al. |
| 6,058,413 | A | 5/2000 | Flores et al. |
| 6,065,043 | A | 5/2000 | Domenikos et al. |
| 6,069,626 | A | 5/2000 | Cline et al. |
| 6,070,184 | A | 5/2000 | Blount et al. |
| 6,072,870 | A | 6/2000 | Nguyen et al. |
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,085,227 | A | 7/2000 | Kraft et al. |
| 6,088,679 | A | 7/2000 | Barkley |
| 6,088,708 | A | 7/2000 | Burch et al. |
| 6,091,417 | A | 7/2000 | Lefkowitz |
| 6,094,657 | A | 7/2000 | Hailpern et al. |
| 6,096,096 | A | 8/2000 | Murphy et al. |
| 6,097,382 | A | 8/2000 | Rosen et al. |
| 6,098,081 | A | 8/2000 | Heidorn et al. |
| 6,101,512 | A | 8/2000 | DeRose et al. |
| 6,105,012 | A | 8/2000 | Chang et al. |
| 6,106,570 | A | 8/2000 | Mizuhara |
| 6,108,637 | A | 8/2000 | Blumenau |
| 6,108,783 | A | 8/2000 | Krawczyk et al. |
| 6,115,044 | A | 9/2000 | Alimpich et al. |
| 6,115,646 | A | 9/2000 | Fiszman et al. |
| 6,121,965 | A | 9/2000 | Kenney et al. |
| 6,122,647 | A | 9/2000 | Horowitz et al. |
| 6,144,969 | A | 11/2000 | Inokuchi et al. |
| 6,151,624 | A | 11/2000 | Teare et al. |
| 6,154,128 | A | 11/2000 | Wookev et al. |
| 6,161,107 | A | 12/2000 | Stern |
| 6,163,772 | A | 12/2000 | Kramer et al. |
| 6,167,521 | A | 12/2000 | Smith et al. |
| 6,167,523 | A | 12/2000 | Strang |
| 6,178,551 | B1 | 1/2001 | Sana et al. |
| 6,182,094 | B1 | 1/2001 | Humpleman et al. |
| 6,182,095 | B1 | 1/2001 | Leymaster et al. |
| 6,188,401 | B1 | 2/2001 | Peyer |
| 6,191,797 | B1 | 2/2001 | Politis |
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,423 | B1 | 4/2001 | Davis |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,243,088 | B1 | 6/2001 | McCormack et al. |
| 6,247,016 | B1 | 6/2001 | Rastogi et al. |
| 6,253,366 | B1 | 6/2001 | Mutschler, III |
| 6,253,374 | B1 | 6/2001 | Dresevie et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |

(56) References Cited

U.S. PATENT DOCUMENTS

| | | |
|---|---|---|
| 6,271,862 B1 | 8/2001 | Yu |
| 6,272,506 B1 | 8/2001 | Bell |
| 6,275,227 B1 | 8/2001 | DeStefano |
| 6,275,575 B1 | 8/2001 | Wu |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,286,130 B1 | 9/2001 | Poulsen et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,336,797 B1 | 1/2002 | Kazakis et al. |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschier, III |
| 6,385,767 B1 | 5/2002 | Ziebell |
| 6,389,434 B1 | 5/2002 | Rivette et al. |
| 6,393,442 B1 | 5/2002 | Cromarty et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,401,077 B1 | 6/2002 | Godden et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,427,142 B1 | 7/2002 | Zachary et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,434,743 B1 | 8/2002 | Click et al. |
| 6,442,563 B1 | 8/2002 | Bacon et al. |
| 6,442,583 B1 | 8/2002 | Eilert et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,476,834 B1 | 11/2002 | Doval et al. |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,006 B1 | 12/2002 | Gourdol et al. |
| 6,493,007 B1 | 12/2002 | Pang |
| 6,493,702 B1 | 12/2002 | Adar et al. |
| 6,496,203 B1 | 12/2002 | Beaumont et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan |
| 6,505,300 B2 | 1/2003 | Chan et al. |
| 6,505,344 B1 | 1/2003 | Blais et al. |
| 6,507,856 B1 | 1/2003 | Chen et al. |
| 6,513,154 B1 | 1/2003 | Porterfield |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| 6,539,464 B1 | 3/2003 | Getov |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,559,966 B1 | 5/2003 | Laverty et al. |
| 6,560,616 B1 | 5/2003 | Garber |
| 6,560,620 B1 | 5/2003 | Chinq |
| 6,560,640 B2 | 5/2003 | Smethers |
| 6,563,514 B1 | 5/2003 | Samar |
| 6,571,253 B1 | 5/2003 | Thompson et al. |
| 6,574,655 B1 | 6/2003 | Libert et al. |
| 6,578,144 B1 | 6/2003 | Gennaro et al. |
| 6,580,440 B1 | 6/2003 | Wagner et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,604,238 B1 | 8/2003 | Lim et al. |
| 6,606,606 B2 | 8/2003 | Star |
| 6,609,200 B2 | 8/2003 | Anderson et al. |
| 6,611,812 B2 | 8/2003 | Hurtado et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,625,622 B1 | 9/2003 | Henrickson et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,242 B2 | 10/2003 | Bowman-Amuah |
| 6,636,845 B2 | 10/2003 | Chau et al. |
| 6,640,249 B1 | 10/2003 | Bowman-Amuah |

(56) References Cited

U.S. PATENT DOCUMENTS

| | | |
|---|---|---|
| 6,643,633 B2 | 11/2003 | Chau et al. |
| 6,643,652 B2 | 11/2003 | Helgeson et al. |
| 6,643,684 B1 | 11/2003 | Malkin et al. |
| 6,643,721 B1 | 11/2003 | Sun |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,658,652 B1 | 12/2003 | Alexander et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,625 B1 | 1/2004 | Reise et al. |
| 6,678,717 B1 | 1/2004 | Schneider |
| 6,681,370 B2 | 1/2004 | Gounares et al. |
| 6,683,600 B1 | 1/2004 | Lui |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,708,172 B1 | 3/2004 | Wong et al. |
| 6,710,789 B1 | 3/2004 | Sekiguchi et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,732,102 B1 | 5/2004 | Khandekar et al. |
| 6,735,721 B1 | 5/2004 | Morrow et al. |
| 6,738,783 B2 | 5/2004 | Melli et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,757,890 B1 | 6/2004 | Wallman |
| 6,760,723 B2 | 7/2004 | Oshinsky et al. |
| 6,763,343 B1 | 7/2004 | Brooke et al. |
| 6,766,526 B1 | 7/2004 | Ellis |
| 6,772,139 B1 | 8/2004 | Smith, III |
| 6,772,165 B2 | 8/2004 | O'Carroll |
| 6,774,926 B1 | 8/2004 | Ellis et al. |
| 6,774,928 B2 | 8/2004 | Bruzzone |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,806,892 B1 | 10/2004 | Plow et al. |
| 6,816,849 B1 | 11/2004 | Halt, Jr. |
| 6,823,478 B1 | 11/2004 | Prologo et al. |
| 6,828,992 B1 | 12/2004 | Freeman et al. |
| 6,829,745 B2 | 12/2004 | Yassin et al. |
| 6,833,925 B2 | 12/2004 | Igoe et al. |
| 6,842,175 B1 | 1/2005 | Schmalstieg et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,084 B1 | 3/2005 | Dobner et al. |
| 6,874,130 B1 | 3/2005 | Baweja et al. |
| 6,874,143 B1 | 3/2005 | Murray |
| 6,876,996 B2 | 4/2005 | Czajkowski et al. |
| 6,883,168 B1 | 4/2005 | James et al. |
| 6,885,748 B1 | 4/2005 | Wang |
| 6,889,359 B1 | 5/2005 | Conner et al. |
| 6,901,403 B1 | 5/2005 | Bata et al. |
| 6,915,294 B1 | 7/2005 | Singh et al. |
| 6,915,454 B1 | 7/2005 | Moore et al. |
| 6,925,609 B1 | 8/2005 | Lucke |
| 6,931,532 B1 | 8/2005 | Davis |
| 6,941,129 B2 | 9/2005 | Marce et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,000,230 B1 | 2/2006 | Murray et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,013,340 B1 | 3/2006 | Burd et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,043,688 B1 | 5/2006 | Tsutsumi et al. |
| 7,051,273 B1 | 5/2006 | Holt et al. |
| 7,058,645 B2 | 6/2006 | Seto et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,092,992 B1 | 8/2006 | Yu |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,522 B1 | 9/2006 | Morgan et al. |
| 7,107,539 B2 | 9/2006 | Abbott et al. |
| 7,120,863 B1 | 10/2006 | Wang |
| 7,124,167 B1 | 10/2006 | Bellotti et al. |
| 7,124,251 B2 | 10/2006 | Clark et al. |
| 7,130,885 B2 | 10/2006 | Chandra et al. |
| 7,134,083 B1 | 11/2006 | Guerrero |
| 7,143,103 B1 | 11/2006 | Zisman et al. |
| 7,143,341 B1 | 11/2006 | Kohli |
| 7,146,564 B2 | 12/2006 | Kim et al. |
| 7,152,027 B2 | 12/2006 | Andrade et al. |
| 7,152,205 B2 | 12/2006 | Day et al. |
| 7,159,011 B1 | 1/2007 | Knight et al. |
| 7,168,035 B1 | 1/2007 | Bell et al. |
| 7,170,499 B1 | 1/2007 | Lapstun et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,197,515 B2 | 3/2007 | Rivers-Moore et al. |
| 7,200,665 B2 | 4/2007 | Eshghi et al. |
| 7,200,816 B2 | 4/2007 | Falk et al. |
| 7,213,200 B2 | 5/2007 | Abe et al. |
| 7,228,541 B2 | 6/2007 | Gupton et al. |
| 7,234,105 B2 | 6/2007 | Bezrukov et al. |

(56) References Cited

U.S. PATENT DOCUMENTS

| | | |
|---|---|---|
| 7,236,982 B2 | 6/2007 | Zlatanov et al. |
| 7,237,114 B1 | 6/2007 | Rosenberg |
| 7,240,279 B1 | 7/2007 | Chartier et al. |
| 7,240,296 B1 | 7/2007 | Matthews et al. |
| 7,249,328 B1 | 7/2007 | Davis |
| 7,251,777 B1 | 7/2007 | Valtchev et al. |
| 7,269,664 B2 | 9/2007 | Hutsch et al. |
| 7,269,788 B2 | 9/2007 | Gharavy |
| 7,272,789 B2 | 9/2007 | O'Brien |
| 7,272,815 B1 | 9/2007 | Eldridge |
| 7,275,216 B2 | 9/2007 | Paoli et al. |
| 7,281,018 B1 | 10/2007 | Begun et al. |
| 7,281,206 B2 | 10/2007 | Schnelle et al. |
| 7,281,245 B2 | 10/2007 | Reynar et al. |
| 7,284,208 B2 | 10/2007 | Matthews |
| 7,284,239 B1 | 10/2007 | Young et al. |
| 7,287,218 B1 | 10/2007 | Knotz et al. |
| 7,293,268 B2 | 11/2007 | Masuda et al. |
| 7,295,336 B2 | 11/2007 | Yoshida et al. |
| 7,296,017 B2 | 11/2007 | Larcheveque et al. |
| 7,305,613 B2 | 12/2007 | Oezgen |
| 7,308,646 B1 | 12/2007 | Cohen et al. |
| 7,313,757 B2 | 12/2007 | Bradley et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,187 B1 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,360,171 B2 | 4/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,392,522 B2 | 6/2008 | Murray |
| 7,406,660 B1 | 7/2008 | Sikchi et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,430,711 B2 | 9/2008 | Rivers-Moore et al. |
| 7,441,200 B2 | 10/2008 | Savage |
| 7,451,392 B1 | 11/2008 | Chalecki et al. |
| 7,490,109 B1 | 2/2009 | Sikchi et al. |
| 7,490,167 B2 | 2/2009 | Pena et al. |
| 7,496,632 B2 | 2/2009 | Chapman et al. |
| 7,496,837 B1 | 2/2009 | Larcheveque et al. |
| 7,512,896 B2 | 3/2009 | Rockey et al. |
| 7,516,145 B2 | 4/2009 | Sikchi et al. |
| 7,516,399 B2 | 4/2009 | Hsu et al. |
| 7,533,268 B1 | 5/2009 | Catorcini |
| 7,543,228 B2 | 6/2009 | Kelkar |
| 7,549,115 B2 | 6/2009 | Kotler |
| 7,562,215 B2 | 7/2009 | Cummins |
| 7,568,101 B1 | 7/2009 | Catorcini |
| 7,581,177 B1 | 8/2009 | Mollicone et al. |
| 7,584,417 B2 | 9/2009 | Friend et al. |
| 7,610,562 B2 | 10/2009 | Rockey et al. |
| 7,613,996 B2 | 11/2009 | Dallett et al. |
| 7,624,356 B1 | 11/2009 | Rockey et al. |
| 7,653,687 B2 | 1/2010 | Reisman |
| 7,669,116 B2 | 2/2010 | Lopata et al. |
| 7,673,227 B2 | 3/2010 | Kotler |
| 7,673,228 B2 | 3/2010 | Kelkar |
| 7,676,843 B1 | 3/2010 | Stott |
| 7,689,929 B2 | 3/2010 | Ruthfield |
| 7,692,636 B2 | 4/2010 | Kim |
| 7,707,487 B2 | 4/2010 | Easter et al. |
| 7,712,022 B2 | 5/2010 | Smuga |
| 7,712,048 B2 | 5/2010 | Rockey et al. |
| 7,721,190 B2 | 5/2010 | Sikchi |
| 7,725,834 B2 | 5/2010 | Bell |
| 7,739,602 B2 | 6/2010 | Feng et al. |
| 7,743,063 B2 | 6/2010 | James et al. |
| 7,755,786 B2 | 7/2010 | Foehr et al. |
| 7,774,620 B1 | 8/2010 | Stott |
| 7,779,027 B2 | 8/2010 | James |
| 7,809,698 B1 | 10/2010 | Salz et al. |
| 7,818,677 B2 | 10/2010 | Ruthfield |
| 7,865,477 B2 | 1/2011 | Larcheveque et al. |
| 7,900,134 B2 | 3/2011 | Ardeleanu |
| 7,904,801 B2 | 3/2011 | Catorcini et al. |
| 7,913,159 B2 | 3/2011 | Larcheveque |
| 7,925,621 B2 | 4/2011 | Sikchi |
| 7,934,098 B1 | 4/2011 | Hahn et al. |
| 7,937,651 B2 | 5/2011 | Kelkar et al. |
| 7,971,139 B2 | 6/2011 | Stanciu |
| 7,979,856 B2 | 7/2011 | Murray |
| 8,001,459 B2 | 8/2011 | Rivers-Moore et al. |
| 8,010,515 B2 | 8/2011 | Mirzad |
| 8,074,217 B2 | 12/2011 | James |
| 8,078,960 B2 | 12/2011 | Chaleki |
| 8,117,552 B2 | 2/2012 | Paoli |
| 8,200,975 B2 | 6/2012 | O'Connor |
| 8,429,522 B2 | 4/2013 | Stanciu et al. |
| 8,487,879 B2 | 7/2013 | Kim et al. |
| 8,819,072 B1 | 8/2014 | Croicu et al. |
| 8,892,993 B2 | 11/2014 | Sikchi et al. |
| 8,918,729 B2 | 12/2014 | Fortini et al. |
| 2001/0003828 A1 | 6/2001 | Peterson et al. |
| 2001/0007109 A1 | 7/2001 | Lange |
| 2001/0013947 A1 | 8/2001 | Van Der Linden et al. |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0027472 A1 | 10/2001 | Guan |
| 2001/0037345 A1 | 11/2001 | Kieman et al. |
| 2001/0044850 A1 | 11/2001 | Raz et al. |
| 2001/0047372 A1 | 11/2001 | Gorelik et al. |
| 2001/0051907 A1 | 12/2001 | Kumar et al. |
| 2001/0051928 A1 | 12/2001 | Brody |
| 2001/0052121 A1 | 12/2001 | Masuda et al. |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019812 A1 | 2/2002 | Board et al. |
| 2002/0019941 A1 | 2/2002 | Chan et al. |
| 2002/0023111 A1 | 2/2002 | Arora et al. |
| 2002/0023113 A1 | 2/2002 | Hsing et al. |
| 2002/0026356 A1 | 2/2002 | Bergh et al. |
| 2002/0026441 A1 | 2/2002 | Kutay et al. |
| 2002/0026461 A1 | 2/2002 | Kutay et al. |
| 2002/0026462 A1 | 2/2002 | Shotton et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0035617 A1 | 3/2002 | Lynch et al. |
| 2002/0040469 A1 | 4/2002 | Pramberger |
| 2002/0049790 A1 | 4/2002 | Ricker et al. |
| 2002/0052769 A1 | 5/2002 | Navani et al. |
| 2002/0053021 A1 | 5/2002 | Rice et al. |
| 2002/0054115 A1 | 5/2002 | Mack et al. |
| 2002/0054126 A1 | 5/2002 | Gamon |
| 2002/0054128 A1 | 5/2002 | Lau et al. |
| 2002/0057297 A1 | 5/2002 | Grimes et al. |
| 2002/0059566 A1 | 5/2002 | Delcambre et al. |
| 2002/0065798 A1 | 5/2002 | Bostleman et al. |
| 2002/0065847 A1 | 5/2002 | Furukawa et al. |
| 2002/0065950 A1 | 5/2002 | Katz et al. |
| 2002/0070973 A1 | 6/2002 | Croley |
| 2002/0072951 A1 | 6/2002 | Lee et al. |
| 2002/0078074 A1 | 6/2002 | Cho et al. |
| 2002/0078103 A1 | 6/2002 | Gorman et al. |

(56) References Cited

U.S. PATENT DOCUMENTS

| | | |
|---|---|---|
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0085033 A1* | 7/2002 | Robinson et al. ............ 345/762 |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0103711 A1 | 8/2002 | Karas et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0116371 A1 | 8/2002 | Dodds et al. |
| 2002/0123993 A1* | 9/2002 | Chau et al. .................... 707/5 |
| 2002/0124172 A1 | 9/2002 | Manahan |
| 2002/0129056 A1 | 9/2002 | Conant |
| 2002/0133484 A1 | 9/2002 | Chau et al. |
| 2002/0143815 A1 | 10/2002 | Sather |
| 2002/0143856 A1 | 10/2002 | Sastri et al. |
| 2002/0147726 A1 | 10/2002 | Yehia et al. |
| 2002/0147748 A1 | 10/2002 | Huang |
| 2002/0147929 A1 | 10/2002 | Rose |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156905 A1 | 10/2002 | Weissman |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184213 A1* | 12/2002 | Lau et al. .................... 707/6 |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0184491 A1 | 12/2002 | Morgan et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0194388 A1 | 12/2002 | Boloker et al. |
| 2002/0196281 A1 | 12/2002 | Audleman et al. |
| 2002/0196288 A1 | 12/2002 | Emrani |
| 2002/0197593 A1 | 12/2002 | Sutton |
| 2002/0198891 A1 | 12/2002 | Li et al. |
| 2002/0198935 A1 | 12/2002 | Crandall et al. |
| 2003/0002526 A1 | 1/2003 | Dias et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0014406 A1 | 1/2003 | Faieta et al. |
| 2003/0018668 A1 | 1/2003 | Britton et al. |
| 2003/0020746 A1 | 1/2003 | Chen et al. |
| 2003/0023639 A1* | 1/2003 | Chen et al. .................... 707/530 |
| 2003/0023641 A1 | 1/2003 | Gorman et al. |
| 2003/0023674 A1 | 1/2003 | Hildebrand |
| 2003/0023953 A1 | 1/2003 | Lucassen et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0028762 A1 | 2/2003 | Trilli et al. |
| 2003/0029911 A1 | 2/2003 | Kitayama |
| 2003/0033037 A1 | 2/2003 | Yuen et al. |
| 2003/0033179 A1 | 2/2003 | Katz et al. |
| 2003/0033606 A1 | 2/2003 | Puente et al. |
| 2003/0037021 A1 | 2/2003 | Krothappalli et al. |
| 2003/0037303 A1 | 2/2003 | Bodlaender et al. |
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Llin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0058286 A1 | 3/2003 | Dano |
| 2003/0061386 A1 | 3/2003 | Brown et al. |
| 2003/0061567 A1 | 3/2003 | Brown et al. |
| 2003/0067497 A1 | 4/2003 | Pichon |
| 2003/0069881 A1 | 4/2003 | Huttunen |
| 2003/0074279 A1 | 4/2003 | Viswanath |
| 2003/0084424 A1 | 5/2003 | Reddy et al. |
| 2003/0085918 A1 | 5/2003 | Beaumont et al. |
| 2003/0093755 A1 | 5/2003 | O'Carroll |
| 2003/0101414 A1 | 5/2003 | Liu et al. |
| 2003/0103071 A1 | 6/2003 | Lusen |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135553 A1 | 7/2003 | Pendakur |
| 2003/0135825 A1 | 7/2003 | Gertner et al. |
| 2003/0140132 A1 | 7/2003 | Champagne |
| 2003/0140160 A1 | 7/2003 | Raz et al. |
| 2003/0142072 A1 | 7/2003 | Lapstun et al. |
| 2003/0145018 A1 | 7/2003 | Hitchcock et al. |
| 2003/0149737 A1 | 8/2003 | Labert et al. |
| 2003/0149934 A1 | 8/2003 | Worden |
| 2003/0154464 A1 | 8/2003 | Ullmann et al. |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lai |
| 2003/0182327 A1 | 9/2003 | Ramanujam et al. |
| 2003/0182463 A1 | 9/2003 | Valk |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0197733 A1 | 10/2003 | Beauchamp et al. |
| 2003/0200254 A1 | 10/2003 | Wei |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0206170 A1 | 11/2003 | Bickmore . |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0212988 A1 | 11/2003 | Tsai et al. |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0229716 A1 | 12/2003 | Holland |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003341 A1 | 1/2004 | alSafadi et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |

(56) References Cited

U.S. PATENT DOCUMENTS

| | | |
|---|---|---|
| 2004/0010752 A1 | 1/2004 | Chan et al. |
| 2004/0010753 A1 | 1/2004 | Salter |
| 2004/0015778 A1 | 1/2004 | Britton et al. |
| 2004/0015783 A1 | 1/2004 | Lennon et al. |
| 2004/0024720 A1 | 2/2004 | Fairweather |
| 2004/0024842 A1 | 2/2004 | Witt |
| 2004/0030991 A1 | 2/2004 | Hepworth et al. |
| 2004/0031052 A1 | 2/2004 | Wannamaker et al. |
| 2004/0032611 A1 | 2/2004 | Daly et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1* | 3/2004 | Pesenson ............ 715/513 |
| 2004/0044965 A1 | 3/2004 | Toyama et al. |
| 2004/0046787 A1 | 3/2004 | Henry et al. |
| 2004/0046789 A1 | 3/2004 | Inanoria |
| 2004/0047643 A1 | 3/2004 | Jackelen et al. |
| 2004/0054966 A1 | 3/2004 | Busch et al. |
| 2004/0059754 A1 | 3/2004 | Barghout et al. |
| 2004/0060006 A1 | 3/2004 | Lindblad et al. |
| 2004/0073565 A1 | 4/2004 | Kaufman et al. |
| 2004/0073868 A1 | 4/2004 | Easter et al. |
| 2004/0073924 A1 | 4/2004 | Pendakur |
| 2004/0078756 A1 | 4/2004 | Napper et al. |
| 2004/0083426 A1 | 4/2004 | Sahu |
| 2004/0083431 A1 | 4/2004 | Graham et al. |
| 2004/0088320 A1 | 5/2004 | Perry |
| 2004/0088647 A1 | 5/2004 | Miller et al. |
| 2004/0088652 A1 | 5/2004 | Abe et al. |
| 2004/0093296 A1 | 5/2004 | Phelan et al. |
| 2004/0093596 A1 | 5/2004 | Koyano |
| 2004/0107367 A1 | 6/2004 | Kisters |
| 2004/0111418 A1 | 6/2004 | Nguyen et al. |
| 2004/0117439 A1 | 6/2004 | Levett et al. |
| 2004/0117769 A1 | 6/2004 | Lauzon |
| 2004/0123277 A1 | 6/2004 | Schrader et al. |
| 2004/0128296 A1 | 7/2004 | Krishnamurthy et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0168119 A1 | 8/2004 | Liu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0193465 A1 | 9/2004 | Sangroniz et al. |
| 2004/0194035 A1 | 9/2004 | Chakraborty |
| 2004/0196266 A1 | 10/2004 | Matsuura et al. |
| 2004/0199572 A1 | 10/2004 | Hunt et al. |
| 2004/0199577 A1 | 10/2004 | Burd et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0212586 A1 | 10/2004 | Denny, III |
| 2004/0215665 A1 | 10/2004 | Edgar et al. |
| 2004/0216084 A1 | 10/2004 | Brown et al. |
| 2004/0220912 A1 | 11/2004 | Manikutty et al. |
| 2004/0221238 A1 | 11/2004 | Cifra et al. |
| 2004/0221245 A1 | 11/2004 | Chickles et al. |
| 2004/0225749 A1 | 11/2004 | Pavlik et al. |
| 2004/0230676 A1 | 11/2004 | Spivack et al. |
| 2004/0237030 A1 | 11/2004 | Malkin |
| 2004/0237120 A1 | 11/2004 | Lewin et al. |
| 2004/0260593 A1 | 12/2004 | Abraham-Fuchs et al. |
| 2004/0261019 A1 | 12/2004 | Imamura et al. |
| 2004/0261032 A1 | 12/2004 | Olander et al. |
| 2004/0268229 A1 | 12/2004 | Paoli et al. |
| 2004/0268259 A1 | 12/2004 | Rockey et al. |
| 2004/0268260 A1 | 12/2004 | Rockey et al. |
| 2005/0004893 A1 | 1/2005 | Sangraniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027676 A1 | 2/2005 | Eichstaedt |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033657 A1 | 2/2005 | Herrington et al. |
| 2005/0033728 A1 | 2/2005 | James |
| 2005/0038711 A1 | 2/2005 | Marlelo |
| 2005/0039117 A1 | 2/2005 | Lwo |
| 2005/0044524 A1 | 2/2005 | Murray |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080756 A1 | 4/2005 | Hitchcock et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108262 A1 | 5/2005 | Fawcett, Jr. et al. |
| 2005/0108624 A1 | 5/2005 | Carrier |
| 2005/0108633 A1 | 5/2005 | Sahota et al. |
| 2005/0108634 A1 | 5/2005 | Sahota et al. |
| 2005/0114757 A1 | 5/2005 | Sahota et al. |
| 2005/0114764 A1 | 5/2005 | Gudenkauf et al. |
| 2005/0119910 A1 | 6/2005 | Schneider |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149511 A1 | 7/2005 | Ruthfield |
| 2005/0149512 A1 | 7/2005 | Ruthfield |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0165615 A1 | 7/2005 | Minar |
| 2005/0171746 A1 | 8/2005 | Thalhammer-Reyero |
| 2005/0177803 A1 | 8/2005 | Ruthfield et al. |
| 2005/0182645 A1 | 8/2005 | Ehlis et al. |
| 2005/0183006 A1 | 8/2005 | Rivers-Moore et al. |
| 2005/0198086 A1 | 9/2005 | Moore et al. |
| 2005/0198125 A1 | 9/2005 | Macleod Beck et al. |
| 2005/0198247 A1 | 9/2005 | Perry et al. |
| 2005/0200907 A1 | 9/2005 | Kitayama et al. |
| 2005/0210263 A1 | 9/2005 | Levas et al. |
| 2005/0216439 A1 | 9/2005 | Kawakita |
| 2005/0216452 A1 | 9/2005 | Teague |
| 2005/0216837 A1 | 9/2005 | Washburn |
| 2005/0219226 A1 | 10/2005 | Liu et al. |
| 2005/0223063 A1 | 10/2005 | Chang et al. |
| 2005/0223320 A1 | 10/2005 | Brintzenhofe et al. |
| 2005/0228887 A1 | 10/2005 | Wang |
| 2005/0234890 A1 | 10/2005 | Enzler et al. |
| 2005/0240620 A1 | 10/2005 | Danner et al. |

(56) References Cited

U.S. PATENT DOCUMENTS

| | | |
|---|---|---|
| 2005/0240876 A1 | 10/2005 | Myers et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2005/0268100 A1 | 12/2005 | Gasparini et al. |
| 2005/0268217 A1 | 12/2005 | Garrison |
| 2005/0268222 A1 | 12/2005 | Cheng |
| 2005/0289147 A1 | 12/2005 | Kahn et al. |
| 2005/0289468 A1 | 12/2005 | Kahn et al. |
| 2006/0004703 A1 | 1/2006 | Spivack et al. |
| 2006/0004815 A1 | 1/2006 | Murata et al. |
| 2006/0004910 A1 | 1/2006 | Burd et al. |
| 2006/0010386 A1 | 1/2006 | Khan |
| 2006/0020586 A1 | 1/2006 | Prompt et al. |
| 2006/0020883 A1 | 1/2006 | Kothari et al. |
| 2006/0026500 A1 | 2/2006 | Qa 'Im-maqami |
| 2006/0026534 A1 | 2/2006 | Ruthfield et al. |
| 2006/0031757 A9 | 2/2006 | Vincent |
| 2006/0036995 A1 | 2/2006 | Chickles et al. |
| 2006/0041593 A1 | 2/2006 | Borthakur et al. |
| 2006/0041838 A1 | 2/2006 | Khan |
| 2006/0053293 A1 | 3/2006 | Zager et al. |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0074933 A1 | 4/2006 | Barac et al. |
| 2006/0074969 A1 | 4/2006 | Barac et al. |
| 2006/0074981 A1 | 4/2006 | Mauceri |
| 2006/0075245 A1 | 4/2006 | Meier |
| 2006/0080657 A1 | 4/2006 | Goodman |
| 2006/0085409 A1 | 4/2006 | Rys et al. |
| 2006/0095507 A1 | 5/2006 | Watson |
| 2006/0101037 A1 | 5/2006 | Brill et al. |
| 2006/0101051 A1 | 5/2006 | Carr et al. |
| 2006/0107197 A1 | 5/2006 | Friend et al. |
| 2006/0107206 A1 | 5/2006 | Koskimies |
| 2006/0107224 A1 | 5/2006 | Friend et al. |
| 2006/0129583 A1 | 6/2006 | Catorcini et al. |
| 2006/0129917 A1 | 6/2006 | Volk et al. |
| 2006/0129978 A1 | 6/2006 | Abrari et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0161845 A1 | 7/2006 | Kahn et al. |
| 2006/0173865 A1 | 8/2006 | Fong |
| 2006/0173985 A1 | 8/2006 | Moore |
| 2006/0184393 A1 | 8/2006 | Ewin et al. |
| 2006/0191662 A1 | 8/2006 | Deibl et al. |
| 2006/0195413 A1 | 8/2006 | Davis et al. |
| 2006/0200443 A1 | 9/2006 | Kahn et al. |
| 2006/0200740 A1 | 9/2006 | Kahn et al. |
| 2006/0200754 A1 | 9/2006 | Kablesh et al. |
| 2006/0203081 A1 | 9/2006 | Pulitzer |
| 2006/0206589 A1 | 9/2006 | Lentini et al. |
| 2006/0206803 A1 | 9/2006 | Smith |
| 2006/0218403 A1 | 9/2006 | Sauve et al. |
| 2006/0230363 A1 | 10/2006 | Rapp |
| 2006/0242663 A1 | 10/2006 | Gogerty |
| 2006/0248468 A1 | 11/2006 | Constantine et al. |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0271839 A1 | 11/2006 | Gottlieb et al. |
| 2006/0282552 A1 | 12/2006 | Bhesania et al. |
| 2006/0288011 A1 | 12/2006 | Gandhi et al. |
| 2006/0288329 A1 | 12/2006 | Gandhi |
| 2007/0005611 A1 | 1/2007 | Takasugi et al. |
| 2007/0005978 A1 | 1/2007 | O'Connor |
| 2007/0011156 A1 | 1/2007 | Maron |
| 2007/0011665 A1 | 1/2007 | Gandhi et al. |
| 2007/0036433 A1 | 2/2007 | Teutsch |
| 2007/0050446 A1 | 3/2007 | Moore |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100836 A1 | 5/2007 | Eichstaedt et al. |
| 2007/0100877 A1 | 5/2007 | Paoli |
| 2007/0100967 A1 | 5/2007 | Smith et al. |
| 2007/0101280 A1 | 5/2007 | Paoli |
| 2007/0101313 A1 | 5/2007 | Bodin et al. |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208759 A1 | 9/2007 | von Koch et al. |
| 2007/0208769 A1 | 9/2007 | Boehm et al. |
| 2007/0245251 A1 | 10/2007 | Kim |
| 2007/0276768 A1 | 11/2007 | Pallante |
| 2008/0021916 A1 | 1/2008 | Schnelle et al. |
| 2008/0027896 A1 | 1/2008 | Anjur |
| 2008/0028340 A1 | 1/2008 | Davis |
| 2008/0040635 A1 | 2/2008 | Larcheveque |
| 2008/0052287 A1 | 2/2008 | Stanciu |
| 2008/0126402 A1 | 5/2008 | Sikchi et al. |
| 2008/0134162 A1 | 6/2008 | James |
| 2008/0162498 A1 | 7/2008 | Omoigui |
| 2008/0189335 A1 | 8/2008 | Sikchi |
| 2008/0195483 A1 | 8/2008 | Moore |
| 2008/0222514 A1 | 9/2008 | Rivers-Moore |
| 2009/0013266 A1 | 1/2009 | Gandhi |
| 2009/0019063 A1 | 1/2009 | Gandhi |
| 2009/0043798 A1 | 2/2009 | Tan et al. |
| 2009/0044103 A1 | 2/2009 | Chaleki et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125778 A1 | 5/2010 | Kelkar |
| 2010/0229110 A1 | 9/2010 | Rockey et al. |
| 2010/0281313 A1 | 11/2010 | White et al. |
| 2011/0173560 A1 | 7/2011 | Larchveque |
| 2011/0239101 A1 | 9/2011 | Rivers-Moore |
| 2011/0246868 A1 | 10/2011 | Stanciu |
| 2011/0296290 A1 | 12/2011 | Ruthfield |
| 2012/0066044 A1 | 3/2012 | Honnef et al. |
| 2013/0238967 A1 | 9/2013 | Stanciu et al. |
| 2013/0271409 A1 | 10/2013 | Kim et al. |
| 2013/0275865 A1 | 10/2013 | Kim et al. |

FOREIGN PATENT DOCUMENTS

| | | |
|---|---|---|
| CN | 1536483 | 10/2004 |
| CN | 1636208 | 7/2005 |
| EP | 0173123 | 3/1986 |
| EP | 0841615 | 5/1998 |
| EP | 0961197 | 12/1999 |
| EP | 1076290 | 2/2001 |
| EP | 1221661 | 7/2002 |
| EP | 1997023 | 12/2008 |
| EP | 2325745 | 5/2011 |
| GB | 2325539 | 11/1998 |
| JP | 63085960 | 4/1988 |
| JP | 401173140 | 7/1989 |
| JP | 3191429 | 8/1991 |
| JP | 4225466 | 8/1992 |
| JP | 04290126 | 10/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 08263246 | 10/1996 |
| JP | 08263247 | 10/1996 |
| JP | 09016801 | 1/1997 |
| JP | 09134273 | 5/1997 |

(56) References Cited

FOREIGN PATENT DOCUMENTS

| | | |
|---|---|---|
| JP | 09146736 | 6/1997 |
| JP | 09190327 | 7/1997 |
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 2000029713 | 1/2000 |
| JP | 2000132436 | 5/2000 |
| JP | 2002183652 | 6/2002 |
| JP | 2003173288 | 6/2003 |
| JP | 2003296235 | 10/2003 |
| JP | 2003316769 | 11/2003 |
| JP | 2003337648 | 11/2003 |
| JP | 2004501450 | 1/2004 |
| JP | 2004054749 | 2/2004 |
| JP | 2004341675 | 12/2004 |
| JP | 2008547117 | 12/2008 |
| JP | 2009528648 | 8/2009 |
| JP | 2009529185 | 8/2009 |
| JP | 4833490 | 9/2011 |
| RU | 2413987 | 3/2011 |
| TW | 200506661 | 2/2004 |
| TW | 1224742 | 12/2004 |
| TW | I364674 | 5/2012 |
| TW | I428827 | 3/2014 |
| WO | WO 9414115 | 6/1994 |
| WO | WO 9427227 | 11/1994 |
| WO | WO 9924945 | 5/1999 |
| WO | WO 9956207 | 11/1999 |
| WO | WO 0126018 | 4/2001 |
| WO | WO 0144934 | 6/2001 |
| WO | WO 0157720 | 8/2001 |
| WO | WO 0198888 | 12/2001 |
| WO | WO 0198927 | 12/2001 |
| WO | WO 0198949 | 12/2001 |
| WO | WO 2005089336 | 9/2005 |

OTHER PUBLICATIONS

Final Office Action, U.S. Appl. No. 13/207,125, mailed Nov. 6, 2014, 27 pgs.
Final Office Action in U.S. Appl. No. 13/159,239, mailed Oct. 23, 2014, 42 pgs.
Gajic, "Understanding ViewState and Postback Processing in ASP. NET applications", Retrieved from: <http://web.archive.org/web/20050918075312/http://delphi.about.com/library/weekly/aaO51705a.htm> on Oct. 23, 2014, Sep. 18, 2005, 3 pages.
"Advisory Action", U.S. Appl. No. 10/185,048, (Jun. 20, 2006), 3 pgs.
"Advisory Action", U.S. Appl. No. 10/185,048, (Sep. 16, 2005), 3 pgs.
"Advisory Action", U.S. Appl. No. 10/632,437, (Aug. 23, 2006), 3 pgs.
"Advisory Action", U.S. Appl. No. 11/276,584, (Apr. 17, 2009), 3 pgs.
"Advisory Action", U.S. Appl. No. 10/916,692, (Dec. 10, 2008), 3 pgs.
"Advisory Action", U.S. Appl. No. 12/061,613, May 20, 2014, 3 pgs.
"Applicant's statement regarding a non-public use", (May 31, 2006), 1 page.
"Attensa Outlook—Getting Started", www.attensa.com, (2005), pp. 1-33.
"Blogdigger—Add Feed Form", Internet Resource, Retrieved from <http://web.archive.org/web/20050618015745/http://www.blogdiggercom/add.jsp> on Nov. 13, 2008,1 page.
"Bradbury Software FeedDemon 1.0", 3 pages.
"Dreamweaver Technote, Changes in Copying and Pasting in Dreamweaver 4", Macromedia, Inc., (Mar. 12, 2001), 2 pages.
"Dreamweaver Technote: Changes in copying and pasting in Dreamweaver 4", http://store1.adobe.com/cfusion/knowledgebase/index.cfm?id=tn 15152, (Mar. 2001), 2 pages.
"EP Search Report", Application No. 07751586.4, (Aug. 13, 2009), 9 pages.
"EP Search Report", Application Serial No. 07750552.7, EESR, (Sep. 30, 2009), 6 pages.
"EP Search Report", EP Application No. 00306806, (Jul. 16, 2003), 3 pages.
"EP Search Report", EP Application No. 05112241.4, (Mar. 18, 2010), 10 pages.
"EP Search Report", EP Application No. 97307138, (Mar. 21, 2003), 3 pages.
"European Search Report", EP Application No. 12152133.0, Jul. 14, 2014, 10 pgs.
"European Search Report", EP Application No. 06111546.5, (Nov. 9, 2006), 5 pages.
"Feed Splicing, Part 1", Retrieved from: <http://blogs.feedburner.com/feedburner/archives/2004/07/feedsplicing part i.php> on Jul. 14, 2004, 5 pages.
"Feed Splicing, Part 2", Retrieved from <http://blogs.feedburner.com/feedburner/archives/2004/08feedsplicing part ii.php> on Dec. 8, 2008, (Aug. 16, 2004), 5 pages.
"FeedBurner", Retrieved from <http://www.feedburner.com> on Dec. 8, 2008, (Feb. 25, 2004), 1 Page.
"Final Office Action", U.S. Appl. No. 10/185,048, (Mar. 13, 2006), 14 Pages.
"Final Office Action", U.S. Appl. No. 10/185,048, (Jun. 3, 2005), 14 Pages.
"Final Office Action", U.S. Appl. No. 10/609,274, (Oct. 3, 2008), 50 pages.
"Final Office Action", U.S. Appl. No. 10/609,274, (Oct. 31, 2007), 41 pages.
"Final Office Action", U.S. Appl. No. 10/632,437, (Jan. 25, 2008), 25 pages.
"Final Office Action", U.S. Appl. No. 10/632,437, (Jun. 1, 2006), 21 pages.
"Final Office Action", U.S. Appl. No. 10/781,586, (Aug. 9, 2007), 20 pages.
"Final Office Action", U.S. Appl. No. 10/876,418, (May 22, 2008), 14 pages.
"Final Office Action", U.S. Appl. No. 10/916,692, (Oct. 2, 2008), 11 pages.
"Final Office Action", U.S. Appl. No. 11/095,254, (Dec. 22, 2008), 9 pages.
"Final Office Action", U.S. Appl. No. 11/158,398, (Oct. 15, 2010),11 pages.
"Final Office Action", U.S. Appl. No. 11/158,398, (Feb. 25, 2009),12 pages.
"Final Office Action", U.S. Appl. No. 11/158,398, (Mar. 22, 2010),11 pages.
"Final Office Action", U.S. Appl. No. 11/158,911, (Oct. 15, 2010),13 pages.
"Final Office Action", U.S. Appl. No. 11/158,911, (Oct. 28, 2009),10 pages.
"Final Office Action", U.S. Appl. No. 11/158,936, (Jun. 26, 2009),16 pages.
"Final Office Action", U.S. Appl. No. 11/158,936, (Jul. 19, 2010),14 pages.
"Final Office Action", U.S. Appl. No. 11/234,767, (Mar. 10, 2011), 28 pages.
"Final Office Action", U.S. Appl. No. 11/276,536, (Apr. 23, 2010), 20 pages.
"Final Office Action", U.S. Appl. No. 11/276,584, (Oct. 29, 2009),12 pages.
"Final Office Action", U.S. Appl. No. 11/927,296, (Jul. 7, 2011),12 pages.
"Final Office Action", U.S. Appl. No. 12/061,613, (Apr. 28, 2011),11 pages.
"Final Office Action", U.S. Appl. No. 12/694,836, (Sep. 16, 2013), 35 pgs.
"Final Office Action", U.S. Appl. No. 12/694,836, Apr. 24, 2013, 36 pgs.

(56) References Cited

OTHER PUBLICATIONS

"Final Office Action", U.S. Appl. No. 12/061,613, Jan. 30, 2014, 17 pgs.
"Final Office Action", U.S. Appl. No. 13/051,741, Feb. 6, 2014, 11 pgs.
"First Office Action", Chinese Application No. 200780007512.9, (Jan. 15, 2010), 7 pages.
"First Office Action", Chinese Application No. 200780008302.1, (Jan. 8, 2010), 15 pages.
"flaggeditems.png", Print screen from Internet Search, Retrieved from <http://web.archive.org/web/20050623095655/http://ranchero.com/images/nnw2/flaggedit ems.png> on Nov. 13, 2008, 1 page.
"Foreign Office Action", Australian Application No. 2006200483, (Aug. 27, 2010), 1 page.
"Foreign Office Action", Australian Application No. 2006262540, (Oct. 8, 2010), 1 page.
"Foreign Office Action", BR Application No. PI0111797-1, May 5, 2014, 4 pgs.
"Foreign Office Action", CA Application No. 2408313, Jun. 18, 2012, 7 pgs.
"Foreign Office Action", Chinese Application Serial No. 200680018421.0, (Jan. 9, 2009), 10 pages.
"Foreign Office Action", EP Application No. 01939368.5, Jul. 16, 2014, 9 pgs.
"Foreign Office Action", European Application Serial No. 07750552.7, (Nov. 17, 2009), 6 pages.
"Google Reader: beta feed reader", Retrieved from <http://vwww.consumingexperience.com/2005/10/google-reader-beta-feedreader.html, (Oct. 7, 2005), 8 pages.
"Google Reader: Reviewer's Guide", Available at: <http://www.google.com/press/guides/readeroverview.pdf>, (Oct. 16, 2005), pp. 1-5.
"Introduction to RSS", Retrieved from: <http://vvvvw.webreference.com/authoring/languages/xml/rss/intro.> on Jan. 28, 2008, (Mar. 27, 2000), 3 Pages.
"Issue Notification", U.S. Appl. No. 10/610,504, (Mar. 9, 2007), 1 page.
"JP Notice of Publication", Application Serial No. 2008-558275, (Aug. 6, 2009), 2 pages.
"JP Notice of Publication", Application Serial No. 2008-558294, (Aug. 13, 2009), 2 pages.
"Kalsey Blogfeed", Internet Article, Retrieved from <http://web.archive.org/web/20050515005125/http://www.kalsey.com/tools/blogfeed/> on Nov. 13, 2008, pp. 1-3.
"mainWindow2.png", Print Screen from Internet Article, Retrieved from <http://web.archive.org/web/20050623095300/http://ranchero.com/images/nnw2/mainWindow2.png> on Nov. 13, 2008, 1 page.
"Mott Porous Metal. The Most Reliable Means of Restricting Gas Flow", Mott Corporation Webpage, retrieved from <<http://www.mottcorp.com/industry/oem/oem_flowres.htm>> on Aug. 23, 2004, 4 pages.
"NetNewsWire_helpbook_faq", Internet Search FAQ sheet, Retrieved from <http://web.archive.org/web/20050623234918/http://ranchero.com/netnewswire/helpBook /faq.html> on Nov. 13, 2008, pp. 1-3.
"Non Final Office Action", U.S. Appl. No. 09/599,806, (Mar. 12, 2003), 7 pages.
"Non Final Office Action", U.S. Appl. No. 09/599,806, (Aug. 17, 2004), 5 pages.
"Non Final Office Action", U.S. Appl. No. 10/395,505, (Sep. 11, 2006), 8 pages.
"Non Final Office Action", U.S. Appl. No. 10/609,274, (Jan. 17, 2007), 43 pages.
"Non Final Office Action", U.S. Appl. No. 10/609,274, (Apr. 2, 2008), 43 pages.
"Non Final Office Action", U.S. Appl. No. 10/632,437, (Dec. 16, 2005), 22 pages.
"Non Final Office Action", U.S. Appl. No. 10/632,437, (Jul. 26, 2007), 19 pages.
"Non Final Office Action", U.S. Appl. No. 10/632,437, (Sep. 10, 2008), 28 pages.
"Non Final Office Action", U.S. Appl. No. 10/770,240, (May 1, 2008), 30 pages.
"Non Final Office Action", U.S. Appl. No. 10/770,240, (Aug. 24, 2006), 25 pages.
"Non Final Office Action", U.S. Appl. No. 10/988,720, (Apr. 2, 2009), 14 pages.
"Non Final Office Action", U.S. Appl. No. 11/158,911, (Jun. 30, 2009), 9 pages.
"Non Final Office Action", U.S. Appl. No. 11/276,536, (Jan. 9, 2009), 33 pages.
"Non Final Office Action", U.S. Appl. No. 11/276,536, (May 28, 2009), 18 pages.
"Non Final Office Action", U.S. Appl. No. 11/276,584, (Jun. 25, 2009), 11 pages.
"Non Final Office Action", U.S. Appl. No. 11/567,140, (Feb. 18, 2011), 8 pages.
"Non Final Office Action", U.S. Appl. No. 12/126,532, (Mar. 24, 2011), 23 pages.
"Non Final Office Action", U.S. Appl. No. 12/126,532, Jul. 2, 2014, 19 pgs.
"Non Final Office Action", U.S. Appl. No. 12/249,973, (Apr. 12, 2011), 8 pages.
"Non-Final Office Action", U.S. Appl. No. 10/185,048, (Dec. 8, 2004), 14 pages.
"Non-Final Office Action", U.S. Appl. No. 10/610,504, (Mar. 9, 2006), 12 pages.
"Non-Final Office Action", U.S. Appl. No. 10/781,586, (Jan. 9, 2008), 22 pages.
"Non-Final Office Action", U.S. Appl. No. 10/781,586, (Oct. 20, 2006), 21 pages.
"Non-Final Office Action", U.S. Appl. No. 10/876,418, (Sep. 13, 2007), 14 pages.
"Non-Final Office Action", U.S. Appl. No. 10/916,692, (Apr. 1, 2008), 9 pages.
"Non-Final Office Action", U.S. Appl. No. 10/976,451, (Mar. 20, 2008), 9 pages.
"Non-Final Office Action", U.S. Appl. No. 11/095,254, (Apr. 17, 2008), 8 pages.
"Non-Final Office Action", U.S. Appl. No. 11/158,398, (Sep. 8, 2009), 9 pages.
"Non-Final Office Action", U.S. Appl. No. 11/158,398, (May 13, 2010), 10 pages.
"Non-Final Office Action", U.S. Appl. No. 11/158,911, (Jun. 10, 2010), 11 pages.
"Non-Final Office Action", U.S. Appl. No. 11/158,936, (Jan. 12, 2010), 12 pages.
"Non-Final Office Action", U.S. Appl. No. 11/276,536, (Oct. 7, 2009), 15 pages.
"Non-Final Office Action", U.S. Appl. No. 11/276,536, (Sep. 15, 2010), 13 pages.
"Non-Final Office Action", U.S. Appl. No. 11/276,584, (Dec. 28, 2009), 12 pages.
"Non-Final Office Action", U.S. Appl. No. 11/276,584, (Jul. 26, 2010), 14 pages.
"Non-Final Office Action", U.S. Appl. No. 11/927,296, (Mar. 4, 2011), 19 pages.
"Non-Final Office Action", U.S. Appl. No. 12/234,449, (Oct. 27, 2010), 8 pages.
"Non-Final Office Action", U.S. Appl. No. 12/234,449, (Jun. 1, 2010), 8 pages.
"Non-Final Office Action", U.S. Appl. No. 13/051,741, Apr. 24, 2013, 11 pgs.
"Non-Final Office Action", U.S. Appl. No. 13/207,125, Jun. 6, 2014, 17 pgs.
"Notice of Acceptance", Australian Application No. 2006200483, (Dec. 17, 2010), 3 pages.
"Notice of Allowance", U.S. Appl. No. 09/599,806, (Jan. 21, 2005), 9 pages.

(56) References Cited

OTHER PUBLICATIONS

"Notice of Allowance", U.S. Appl. No. 10/395,505, (Oct. 4, 2006), 8 pages.
"Notice of Allowance", U.S. Appl. No. 10/610,504, (Sep. 6, 2006), 4 pages.
"Notice of Allowance", U.S. Appl. No. 10/632,437, (May 21, 2009),15 pages.
"Notice of Allowance", U.S. Appl. No. 10/781,586, (May 9, 2008), 6 pages.
"Notice of Allowance", U.S. Appl. No. 10/876,418, (Dec. 31, 2008), 8 pages.
"Notice of Allowance", U.S. Appl. No. 10/976,451, (Feb. 4, 2013), 10 pages.
"Notice of Allowance", U.S. Appl. No. 11/072,087, (Feb. 23, 2010), 4 pages.
"Notice of Allowance", U.S. Appl. No. 11/107,347, (Dec. 13, 2010), 11 pages.
"Notice of Allowance", U.S. Appl. No. 11/218,149, (Feb. 11, 2011), 7 pages.
"Notice of Allowance", U.S. Appl. No. 11/295,178, (Mar. 22, 2011), 21 pages.
"Notice of Allowance", U.S. Appl. No. 11/931,730, (Feb. 2, 2011), 7 pages.
"Notice of Allowance", U.S. Appl. No. 10/770,240, Jan. 3, 2014, 10 pgs.
"Notice of Reexamination", Chinese Application No. 01813138.7, (Apr. 22, 2011), 14 pgs.
"PCT Search Report and Written Opinion", Application No. PCT/US06/23336, (Oct. 29, 2007), 8 pages.
"PCT Search Report", PCT Application No. PCT/IB98/01392, (Apr. 9, 1999), 3 pages.
"PCT Search Report", PCT Application No. PCT/IB99/02003, (Nov. 28, 2000), 3 pages.
"PCT Search Report", PCT Application No. PCT/US99/09620, (Sep. 22, 1999), 3 pages.
"Persistence.png", Print Screen from Internet Article, Retrieved from <http://web.archive.org/web/20050623095937/http://ranchero.com/images/nnw2/persiste nce.png> on Nov. 13, 2008,1 page.
"Protecting Commercial Secure Web Servers from Key-Finding Threats", nCipher, Inc., Available at <www.nciphercom/uploads/resources/pcws.pdf>, (1999), 12 pages.
"Ranchero Software Editing LiveJournal Logs", Internet Article, Retrieved from <http://web.archive.org/web/20051217022724/http://ranchero.com/netnewswire/tips/livejournalconfig.php> on Nov. 13, 2008, pp. 1-3.
"Ranchero Software Features Chart", Internet Article, Retrieved from <http://web.archive.org/web/20050609010027/http://ranchero.com/netnewswire/featuresc hart20.php> on Nov. 13, 2008, pp. 1-3.
"Ranchero Software NetNewsWfaq", Internet Search Engine FAQ sheet, Retrieved from <http://web.archive.org/web/20030201120948/http://ranchero.com/netnewswire/faq.php> on Nov. 13, 2008, pp. 1-4.
"Ranchero Software NetNewsWire 2.0 Change Notes", Internet Article, Retrieved from <http://web.archive.org/web/20051024203943/http://ranchero.com/netnewswire/changen otes/netnewswire20.php> on Nov. 13, 2008, 3 pages.
"Ranchero Software Search Engine Subscriptions", On-line Article, Retrieved from <http://web.archive.org/web/20050714082710/http://ranchero.com/netnewswire/features/searchEngineSubscriptions.php> on Nov. 13, 2008, pp. 1-2.
"Ranchero Software Smart Lists", Internet Article, Retrieved from <http://web.archive.org/web/20050602084724/http://ranchero.com/netnewswire/features/smartLists.php> on Nov. 13, 2008, pp. 1-2.
"Ranchero Software Subscription Sharing", Internet Article, Retrieved from <http://web.archive.org/web/20050811083741/http://ranchero.com/netnewswire/features/ sharing.php> on Nov., 13, 2008, pp. 1-3.

"Ranchero Software: NetNewsWire", Internet Article, Retrieved from <http://web.archive.org/web/20051003204517/ranchero.com/netnewswire/> on Nov. 13, 2008,(2005), 5 pages.
"Ranchero Software: What's New in NetNewsWire 2.0", Web article, retrieved from <http://web.archive.org/web/20050618014501/http://ranchero.com/netnewswire/whatsne w/netnewswire20.php> on Nov. 13, 2008, pp. 1-3.
"Restriction Requirement", U.S. Appl. No. 09/599,806, (Mar. 3, 2003), 5 pages.
"Restriction Requirement", U.S. Appl. No. 10/770,240, (Jan. 26, 2009), 7 pages.
"Restriction Requirement", U.S. Appl. No. 10/781,586, (Jun. 26, 2006), 5 pages.
"Restriction Requirement", U.S. Appl. No. 11/095,254, (Nov. 1, 2007), 8 pages.
"RSS 2.0 Specification", (Jul. 15, 2003), 8 pages.
"RSS Submissions", Internet Article, Retrieved from <http://web.archive.org/web/20050619014308/http://vvvvw.rss-specifications.com/rsssubmission.htm> on Nov. 13, 2008, pp. 1-3.
"Search Engine Subscriptions", Internet Article, Retrieved from <http://web.archive.org/web/20051217013212/http://ranchero.com/netnewswire/helpBook/searchEngineSubs.html> on Nov. 13, 2008, 1 page.
"SearchFeed.png", Print Screen in article, Retrieved from <http://web.archive.org/web/20050623095831/http://ranchero.com/images/nnw2/searchF eed.png> on Nov. 13, 2008, 1 page.
"Searching.png", Print Screen from article, Retrieved from <http://web.archive.org/web/20050623095422/http://ranchero.com/images/nnw2/searchin g.png> on Nov. 13, 2008, 1 page.
"smartList.png", Print Screen from Internet Article, Retrieved from <http://web.archive.org/web/20050623095628/http://ranchero.com/images/nnw2/smartList.png> on Nov. 13, 2008, 1 page.
"Subscribing and Unsubscribing", Internet Article, Retrieved from <http://web.archive.org/web/20060915152527/http://ranchero.com/netnewswire/helpBook /subUnsub.html> on Nov. 13, 2008, pp. 1-2.
"Supplemental Notice of Allowance", U.S. Appl. No. 10/781,586, (Jun. 4, 2008), 2 pages.
"Supplemental Notice of Allowance", U.S. Appl. No. 10/781,586, (Jul. 18, 2008), 3 pages.
"Supplemental Notice of Allowance", U.S. Appl. No. 10/976,451, (Apr. 22, 2013), 2 pages.
"Supplemental Notice of Allowance", U.S. Appl. No. 10/976,451, (May 22, 2013), 2 pages.
"Supplemental Notice of Allowance", U.S. Appl. No. 10/976,451, (Jun. 18, 2013), 2 pages.
"Supplemental Notice of Allowance", U.S. Appl. No. 11/072,087, (Apr. 19, 2010), 2 pages.
"Supplemental Notice of Allowance", U.S. Appl. No. 11/107,347, (Jun. 10, 2011), 10 pages.
"Supplemental Notice of Allowance", U.S. Appl. No. 11/218,149, (Apr. 5, 2011), 2 pages.
"Supplemental Notice of Allowance", U.S. Appl. No. 11/218,149, (Jun. 6, 2011), 2 pages.
"Supplemental Notice of Allowance", U.S. Appl. No. 11/931,730, (Mar. 2, 2011), 2 pages.
"Supplemental Notice of Allowance", U.S. Appl. No. 11/931,730, (Apr. 22, 2011), 2 pages.
"Supplemental Notice of Allowance", U.S. Appl. No. 11/931,730, (May 6, 2011), 2 pages.
"Supplemental Notice of Allowance", U.S. Appl. No. 12/021,894, (Jan. 12, 2011), 6 pages.
"Supplemental Notice of Allowance", U.S. Appl. No. 12/021,894, (Feb. 8, 2011), 6 pages.
"Syncing", Internet Article, Retrieved from <http://web.archive.org/web/20051217023557/http://ranchero.com/netnewswire/helpBook /syncing.html> on Nov. 13, 2008, 1 page.
"syncing.png", Print Screen from article, retrieved from: <http://web.archive.org/web/20050623095327/http://ranchero.com/images/nnw2/syncing. png> on Nov. 13, 2008, 1 page.
"Syndic8.com—Documents1", Internet Article, Retrieved from: <http://web.archive.org/web/20050513214756/http://www.syndic8.com/documents/howto/ > on Nov. 13, 2008, pp. 1-3.

(56) References Cited

OTHER PUBLICATIONS

"Syndic8.com—Documents2", Internet Article, Retrieved from: <http://web.archive.org/web/20050622035505/http://www.syndic8.com/documents/howto/ > on Nov. 13, 2008, pp. 1-3.
"Syndic8.com—HowToUse", Internet Article, Retrieved from <http://web.archive.org/web/20050619233841/http://www.syndic8.com/howtophp> on Nov. 13, 2008, pp. 1-4.
"The Feed Thickens", Retrieved from: <http://blog.flickr.net/en/2004/07/14/the-feed-thickens/>, (Jul. 14, 2004), 2 pages.
"Yahoo! Publisher's Guide to RSS : Submit your RSS Feed", Internet Article, Retrieved from <http://web.archive.org/web/20051216153612/http://uk.promotions.yahoo.com/publisher/ submit.html> on Nov. 13, 2008, pp. 1-3.
"Yahoo! Search Services and Tools", Internet Search Screen, Retrieved from <http://web.archive.org/web/20051001065344/http://search.yahoo.com/m rss/subm it> on Nov. 13, 2008, 1 page.
About Microsoft Word, Microsoft Word 2000, published 1983-1999, and Microsoft Excel 2000 (see Screen Shot "About Microsoft Excel"), Published 1988-1999, 3 pgs.
Acklen, et al., "Using Corel Wordperfect 9", Que Corporation,(1998), pp. 251-284, 424-434 ,583-585.
Adams, Susie et al., "BizTalk Unleashed", Sams publishing, 2002, first printing Mar. 2001, 1-2, 31-138.
Adobe GoLive 5.0: User Guide, "Adobe Systems, 2000, Chapter 12.", (2000),11 pages.
Advisory Action, U.S. Appl. No. 10/632,297, (Dec. 29, 2006), 3 pages.
Advisory Action, U.S. Appl. No. 10/723,188, (Feb. 21, 2007), 5 pages.
Advisory Action, U.S. Appl. No. 10/898,657, (Mar. 25, 2008), 4 pages.
Advisory Action, U.S. Appl. No. 10/942,528 (Oct. 26, 2009), 3 pages.
Advisory Action, U.S. Appl. No. 11/036,910, (Sep. 10, 2009), 3 pages.
Advisory Action, U.S. Appl. No. 12/061,613, Jul. 23, 2014, 3 pgs.
Akihiro, Senda "Word 2000, Conservative—Looking but 'Attentive' New Function", NIKKEI PC 21, vol. 4, No. 8, (Aug. 1, 1999), pp. 115-116.
Alschuler, Liora "A tour of XMetal", Retrieved from www.sml.com/Qub/a/SeyboldReQort/iQ031102.html on Feb. 5, 2003, XML.com, Online! XP002230081, (Jul. 14, 1999), 2 pgs.
Altova, "Altova Tools for XPath 1.0/2.0", Retrieved from http://www.altova.comdevportalpath.html, Altova, 1-12.
Altova, "XML Spy4.0 Manual", 1998-2001 Altova Inc. &Altova GmbH, (Sep. 10, 2001), pp. 1-90, 343-362.
Altova, "XmlSpy 2004 Enterprise Edition Manual", Altova, (May 17, 2004), pp. 1-25, 220-225. (113 pgs).
Altova, "Altova Tools for XPath 1.0/2.0", retrieved from http://www.altova.comdev_portal_xpath.html, Altova, copyright 2005-2007, obtained online Nov. 7, 2007, pp. 1-12.
Altova, et al., "User and Reference Manual Version 4.4", www.xmlspy.com, (May 24, 2007), pp. 1-565.
Altova, et al., "XML Spy, XML Intergrated Development Environments", Altova Inc., (2002), pp. 1-18.
Anat, Eyal et al., "Integrating and Customizing Hereroogeneous E-Commerce Applications", The VLDB Journal—The International Journal on Very Large Data Bases, vol. 1 0, Issue 1,(Aug. 2001), pp. 16-38.
Anonymous, "The Evolution of RSS", (Online); XP002546010; Internet; Retrieved from the Internet: URL:http://web.archive.org/web/20041011055544/http://vvvvw.webreference.com/authoring/languages/xml/rss/1/7.html *the whole document*,(Oct. 11, 2004), 1 page.
AppleWorks, Retrieved from: <http://en.wikipedia.org/wiki/AppleWorks> on Jul. 4, 2014, Jul. 3, 2014, 6 pgs.
Architecture for a Dynamic Information Area Control, IBM Technical Disclosure Bulletin, IBM Corp, NY, US vol. 37, No. 10, Jan. 10, 1994, pp. 245-246.
Asche, Ruediger R., "Multithreading for Rookies", Microsoft Developer Network Technology Group, Retrieved Apr. 17, 2002 from http://msdn.microsoft.com/library/en-us/dndllpro/html/msdnthreads.asp?frame=true, (Sep. 24, 1993), 13 pages.
Attardi, G et al., "The LOA Customizable Media Aggregator", Automated Production of Cross Media Content for Multi-Channel Distribution, 2005. Axmedis 2005. First International Conference on Florence, Italy 30-02 Nov. 2005, Piscataway, NJ, USA, IEEE, Nov. 30, 2005. XP010892440 ISBN: 978-0-7695-2348-4, (Nov. 30, 2005), 9 pages.
Au, Irene et al., "Netscape Communicator's Collapsible Toolbars", CHI 98, Human Factors in Computing Systems, Conference Proceedings, LA, CA,(Apr. 18-23, 1998), pp. 81-86.
Australian Notice of Allowance in Application 2006200285, mailed Sep. 23, 2010, 3 pgs.
Ayers, Danny et al., "Beginning RSS and Atom Programming", Wiley Publishing, Inc., (2005), pp. 1-54.
Baldwin, J F., et al., "A Mass Assignment Based ID3 Algorithm for Decision Tree Introduction", International Journal of Intelligent Systems, vol. 12, No. 7, (1997), pp. 523-548.
Barker, et al., "Creating In-Line Objects Within an Intergrated Editing Environment", IBM Technical Disclosure Bulletin, vol. 27, No. 5,(Oct. 1984), p. 2962.
Battle, Steven A., et al., "Flexible Information Presentation with XML", The Institution of Electrical Engineers, (1998), 6 pages.
Beauchemin, Dave "Using InfoPath to Create Smart Forms", Retrieved from the Internet at http://www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", Microsoft Office InfoPath 2003 Technical Articles, Retrieved from the Internet at http://msdn2.microsoft.com/en-us/library/aa168241(office.11,d=printer).aspx on Jan. 21, 2007,(Aug. 2004).
Benzinger, Brian "Google Reader Reviewed", Retrieved from: <http://www.solutionwatch.com/250/google-reader-reviewed> on Jun. 17, 2009, (Oct. 7, 2005), 5 pages.
Berg, A "Naming and Binding: Monikers", Inside OLE, Chapter 9, Harmony Books, (1995), pp. 431-490.
Blair, Eric "Review: NetNewsWire 2.0", Retrieved from: <http://vvvvw.atpm.com/11.06/netnewswire.shtml> on Nov. 11, 2008, (Jun. 2, 2005), 12 pages.
Borland, Russo "Running Microsoft Word 97", 314-315,338,361-362,390,and 714-719.
Brabrand, Claus et al., "PowerForms: Declarative Client-Side Form Field Validation", BRICS, Department of Computer Science, University of Aarhus, Denmark, World Wide Web, vol. 3, No. 4,(2000), pp. 205-214.
Brabrand, et al., "Power Forms Declarative Client-side Form Field Validation", (2002),1-20.
Bradley, Neil "The XML Companion, Third Edition", Published by Addison Wesley Professional, http://Proguest.safaribooksonline.com0201770598, (Dec. 12, 2001), 1-18.
Bray, Tim "Extensible Markup Language (XML)", http:/lwww.textuality.com/sgml-erb/wD-xml.html, second named inventor Jean Paoli, third named inventor C.M. Sperberg-McQueen, (Feb. 10, 1998), 37 pgs.
Brogden, William "Arbortext Adept 8 Editor Review", Retrieved from www.xml.com/pub/a/1999/09/adept/AdeptRyw.htm on Feb. 5, 2003, O'Reilly XML.com,Online!, (Sep. 22, 1999), 3 pgs.
Burch, Barbara "Notes R5 Technical Overview", Retrieved from: <http://www.ibm.com/developerworks/lotus/library/1 s-Notes R5 Technical Overview> on Aug. 13, 2010 (Apr. 1, 1999),14 pages.
Canadian Notice of Allowance in Application 2408527, mailed Apr. 17, 2012, 1 pg.
Canadian Office Action in Application 2408313, mailed Jun. 18, 2012, 7 pgs.
Canadian Office Action in Application 2800037, mailed Sep. 30, 2013, 2 pgs.
Chan, Chee-Yong et al., "Efficient Filtering of XML Documents with Xpath Expressions," The VLDB Journal (2002) 11, (Jun. 1, 2002), pp. 354-379.
Chen, Ya Bing et al., "Designing Valid XML Views", ER 2002, LNCS 2503, Springer-Verlag Berlin Heidelberg 2002, pp. 463-477.

(56) References Cited

OTHER PUBLICATIONS

Chen, Yi et al., "XKvalidator: A Constraint Validator for XML", CIKM '02, Nov. 4-9, 2002, McLean, VA, USA, Copyright 2002, ACM, ISBN 1-58113-492-4/02/0011, (Nov. 4-9, 2002), pp. 446-452.

Chien, Shu-Yao et al., "Efficient Management of Multiversion Documents by Object Referencing", Proceedings of the 27th VLDB Conference,(2001 ), pp. 291-300.

Chien, Shu-Yao et al., "Efficient Schemes for Managing Multiversion XML Documents", The VLDB Journal 2002, (Dec. 19, 2002), pp. 332-353.

Chien, Shu-Yao et al., "Storing and Querying Multiversion XML Documents using Durable Node Numbers", IEEE,(2002), pp. 232-241.

Chien, Shu-Yoa et al., "XML Document Versioning", SIGMOD Record, vol. 30, No. 3, (Sep. 2001 ), pp. 46-53.

Chuang, Tyng-Ruey "Generic Validation of Structural Content with Parametric Modules", ICFP, 01 copyright 2001, ACM 1-58113-415-0/01/0009, (Sep. 3-5, 2001 ), pp. 98-109.

Cinacarini, Paolo A., et al., "Managing Complex Documents Over the WWW: A Case Study for XML", Transactions on Knowledge and Data Engineering, vol. 11, No. 4, (Jul./Aug. 1999), pp. 629-638.

Clapp, D "The NeXT Application Kit Part 1: Non-Responsive Classes", The NeXT Bible Chapter 16, (1990), pp. 275-293.

Clark, J "XSL Transformation (XSL T), Version 1.0", Retrieved from www.w3.orq/TR/1999/REC-xslt19991116 WC3,(Nov. 16, 1999), pp. 1-156.

Clark, J. et al., "XML Path Language (XPath)", Retrieved from www.w3.orq/TR/1999/RCE-xpath-19991116 Version 1.0, (Nov. 16, 1999), pp. 1-49.

Clarke, Peter, "From Small Beginnings", Knowledge Management,(Nov. 2001 ), pp. 28-30.

Cloete, I et al., "CID3: An Extension of ID3 for Attributes with Ordered Domains", South African Computer Journal, vol. 4, (1991), pp. 10-16.

Copying the Search Form to Custom Pages in Windows SharePoint Services based Web Sites, Retrieved from www.sharepointcustomization.com/resources/tiQstricks/04wss-searchbox-tiQ.htm, Microsoft Corp, (2004), 1 pages.

Copying the Search Form to Services-based Web Sites, Cybook, Inc., the whole document, (Jul. 26, 2004),1 page.

Cover, Robin "XML Forms Architecture (XFA)", Cover Pages. Retrieved from "http://xml.coverpages.org/xfa.html" on Aug. 17, 2006, (Apr. 19, 2000), 4 pages.

Davidow, ARI "XML Editors: Allegations of Functionality in search of Reality", Retrieved from www.ivritvpe.com/xml/, SP002230082, (1999).

Dayton, Linnea et al., "Photo Shop 5/5.5 WOW! Book", 2000, Peach pit Press, pp. 8-17.

Dilascia, et al., "Sweeper", Microsoft interactive developer, vol. 1., No. 1, (1996), 27 pages.

Dodds, "Toward an XPath API", xml.com, (May 7, 2001), 1-3.

Dorward, Sean et al., "Unix Variants", Unix Review, vol. 10, No. 4, (Apr. 1992), pp. 29-31.

Dreamweaver Technote: Changes in copying and pasting in Dreamweaver 4, http://store1.adobe.com/cfusion/knowledgebase/index.cfm?id=tn 15152, (Mar. 2001), 2 pages.

Dubinko, et al., "XForms 1.0", W3C Recommendation, Retrieved from: <www.w3.org.TR/2003/REC-xforms-20031014/> on Feb. 29, 2012, (Oct. 14, 2003), 35 pages.

Dubinko, et al., "XForms 1.0, W3C Working Draft", W3C, (Dec. 7, 2001), pp. 1-125.

Dubinko, Micah, "XForms and Microsoft InfoPath", Retrieved from the Internet at http://www.xml.com/IpUa/1311 on Jan. 21, 2007, (Oct. 29, 2003), 6 pgs.

Duce, et al., "Web 2D Graphics File Formats", Google 2003 (2003), pp. 43-65.

Ducharme, "InfoPath and XForms", Retrieved from http://Iwww.weblog.infoworld.com/udell2003/02/26.html, InfoWorld, (Feb. 26, 2003), pp. 1-3.

Dyck, Timothy, "XML Spy Tops as XML Editor, eWeek, vol. 19, No. 47, Nov. 2002", p. 48.

Enter Key, Retrieved from the Internet at http://svstems.webopedia.com/TERM/Enter keV.htmlon, Dec. 20, 2006, 1 page.

Esposito, Dino "Cutting Edge No. 8", Microsoft Internet Developer, (Jan. 18, 2000),13 pages.

European Office Action, Application Serial No. 06111546.5, (Oct. 15, 2008), 5 pages.

European Search Report, European Application No. 10012887.5, (Jul. 4, 2011),12 pages.

Excel Developer Tip, Determining the Data Type of a Cell, (available at http://iwalk.com/ss/excel/tips/tip62.htm), (May 13, 1998),1 page.

Final Office Action in U.S. Appl. No. 10/988,720, (Oct. 14, 2008), 17 pgs.

Final Office Action, U.S. Appl. No. 11/036,910, (May 26, 2010), 10 pages.

Final Office Action, U.S. Appl. No. 11/107,347, (Mar. 22, 2010), 11 pages.

Final Office Action, U.S. Appl. No. 11/170,521, (Sep. 8, 2009), 12 pages.

Final Office Action, U.S. Appl. No. 09/599,086, (Mar. 6, 2008), 48 pages.

Final Office Action, U.S. Appl. No. 09/599,086, (May 10, 2007), 41 pages.

Final Office Action, U.S. Appl. No. 09/599,086, (May 25, 2004), 23 pages.

Final Office Action, U.S. Appl. No. 09/599,086, (Jul. 5, 2006), 34 pages.

Final Office Action, U.S. Appl. No. 09/599,086, (Aug. 8, 2005), 27 pages.

Final Office Action, U.S. Appl. No. 09/599,299, (Apr. 20, 2004), 23 pages.

Final Office Action, U.S. Appl. No. 09/599,812, (Aug. 12, 2003), 38 pages.

Final Office Action, U.S. Appl. No. 09/599,813, (Feb. 8, 2005), 27 pages.

Final Office Action, U.S. Appl. No. 09/599,813, (May 5, 2006), 46 pages.

Final Office Action, U.S. Appl. No. 10/178,291, (Dec. 19, 2005), 21 pages.

Final Office Action, U.S. Appl. No. 10/955,666, (Oct. 14, 2009), 25 pages.

Final Office Action, U.S. Appl. No. 10/402,640, (Aug. 28, 2009), 17 pages.

Final Office Action, U.S. Appl. No. 10/402,640, (Sep. 10, 2007), 16 pages.

Final Office Action, U.S. Appl. No. 10/632,297, (Sep. 8, 2006), 31 pages.

Final Office Action, U.S. Appl. No. 10/723,188 (Nov. 3, 2006), 34 pages.

Final Office Action, U.S. Appl. No. 10/723,188, (Jan. 9, 2009), 20 pages.

Final Office Action, U.S. Appl. No. 10/723,863, (Sep. 19, 2007), 34 pages.

Final Office Action, U.S. Appl. No. 10/770,240, (Apr. 13, 2011), 17 pages.

Final Office Action, U.S. Appl. No. 10/770,240, (Jun. 26, 2009), 15 pages.

Final Office Action, U.S. Appl. No. 10/770,240, (Jun. 29, 2007), 28 pages.

Final Office Action, U.S. Appl. No. 10/846,428, (Mar. 3, 2008), 23 pages.

Final Office Action, U.S. Appl. No. 10/857,689, (Jan. 6, 2009), 23 pages.

Final Office Action, U.S. Appl. No. 10/897,647, (Mar. 6, 2008), 25 pages.

Final Office Action, U.S. Appl. No. 10/897,647, (Jul. 14, 2009), 36 pages.

Final Office Action, U.S. Appl. No. 10/898,656, (Nov. 15, 2007), 16 pages.

Final Office Action, U.S. Appl. No. 10/898,657, (Jan. 3, 2008), 21 pages.

(56) References Cited

OTHER PUBLICATIONS

Final Office Action, U.S. Appl. No. 10/916,692, (Nov. 16, 2009), 10 pages.
Final Office Action, U.S. Appl. No. 10/938,476, (Jun. 20, 2011), 19 pages.
Final Office Action, U.S. Appl. No. 10/942,528, (Sep. 17, 2009), 27 pages.
Final Office Action, U.S. Appl. No. 10/955,087, (May 16, 2008), 14 pages.
Final Office Action, U.S. Appl. No. 10/955,666, (Oct. 31, 2008), 25 pages.
Final Office Action, U.S. Appl. No. 10/955,666, (Aug. 30, 2007), 20 pages.
Final Office Action, U.S. Appl. No. 10/976,451, (Jul. 2, 2009), 13 pages.
Final Office Action, U.S. Appl. No. 10/976,451, (Jul. 27, 2010), 12 pages.
Final Office Action, U.S. Appl. No. 10/977,198, (Sep. 3, 2008), 13 pages.
Final Office Action, U.S. Appl. No. 10/977,198, (Oct. 11, 2007), 11 pages.
Final Office Action, U.S. Appl. No. 10/988,718, (Jan. 30, 2008), 15 pages.
Final Office Action, U.S. Appl. No. 10/988,718, (Dec. 22, 2008), 17 pages.
Final Office Action, U.S. Appl. No. 10/988,732, (Nov. 13, 2009), 33 pages.
Final Office Action, U.S. Appl. No. 10/988,732, (Dec. 10, 2008), 30 pages.
Final Office Action, U.S. Appl. No. 11/012,472, (Mar. 23, 2010), 11 page.
Final Office Action, U.S. Appl. No. 11/036,910, (Jun. 1, 2009), 8 pages.
Final Office Action, U.S. Appl. No. 11/044,106, (Apr. 13, 2009), 20 pages.
Final Office Action, U.S. Appl. No. 11/056,500, (Apr. 16, 2009), 9 pages.
Final Office Action, U.S. Appl. No. 11/072,087, (Nov. 16, 2009), 9 pages.
Final Office Action, U.S. Appl. No. 11/107,347, (Apr. 2, 2009), 11 pages.
Final Office Action, U.S. Appl. No. 11/170,521, (Jun. 29, 2010), 13 pages.
Final Office Action, U.S. Appl. No. 11/203,818, (Apr. 14, 2009), 25 pages.
Final Office Action, U.S. Appl. No. 11/203,937, (May 7, 2009), 8 pages.
Final Office Action, U.S. Appl. No. 11/218,149, (Nov. 16, 2009), 18 pages.
Final Office Action, U.S. Appl. No. 11/218,149, (May 19, 2010), 17 pages.
Final Office Action, U.S. Appl. No. 11/226,044, (Apr. 20, 2009), 19 pages.
Final Office Action, U.S. Appl. No. 11/227,550, (Jan. 19, 2010), 12 pages.
Final Office Action, U.S. Appl. No. 11/227,550, (Aug. 19, 2010), 12 pages.
Final Office Action, U.S. Appl. No. 11/234 767, (Jan. 26, 2010), 23 pages.
Final Office Action, U.S. Appl. No. 11/234,767, (Jun. 10, 2009), 23 pages.
Final Office Action, U.S. Appl. No. 11/295,178, (Dec. 24, 2009), 38 pages.
Final Office Action, U.S. Appl. No. 11/295,178, (Jul. 30, 2010), 43 pages.
Final Office Action, U.S. Appl. No. 11/557,931, (Feb. 26, 2010), 8 pages.
Final Office Action, U.S. Appl. No. 11/567,140, (Aug. 19, 2010), 11 pages.
Final Office Action, U.S. Appl. No. 12/028,651, (Jul. 26, 2011), 9 pages.
Final Office Action, U.S. Appl. No. 12/061,613, (Aug. 30, 2012), 14 pages.
Final Office Action, U.S. Appl. No. 12/126,532, (Oct. 14, 2011), 25 pages.
Final Office Action, U.S. Appl. No. 12/694,836, (Aug. 29, 2012), 27 pages.
Final Office Action, U.S. Appl. No. 12/694,836, (Sep. 16, 2013), 35 pages.
Final Office Action, U.S. Appl. No. 13/159,239, (Dec. 11, 2013), 38 pages.
Final Office Action, U.S. Appl. No. 10/977,198, (Aug. 19, 2009), 15 pages.
Final Office Action, U.S. Appl. No. 12/722,414, Dec. 4, 2013, 23 pgs.
Foreign Decision of Grant, Russian Application No. 2006103267, (Aug. 13, 2010), 18 pages.
Foreign Decision of Grant, Russian Application No. 2006105526, (Nov. 8, 2010), 16 pages.
Foreign Notice of Allowance, CA Application No. 2,800,037, Aug. 25, 2014, 1 Page.
Foreign Notice of Allowance, Canadian Application No. 2412611, (Sep. 19, 2011), 1 page.
Foreign Notice of Allowance, Canadian Application No. 2533147, Mar. 11, 2013, 1 page.
Foreign Notice of Allowance, Japanese Application No. 2002-504581, (Sep. 14, 2011), 6 pages.
Foreign Notice of Allowance, JP Application No. 2002-503701, (Jul. 6, 2012), 6 Pages.
Foreign Notice of Allowance, Mexican Application No. PNa/2005/012067, (Nov. 13, 2009), 3 pages.
Foreign Notice of Allowance, TW Application No. 95103951, (Nov. 6, 2013) ,4 pages.
Foreign Office Action, Mexican Patent Application No. PNa/2006/002493, (Sep. 14, 2009), 5 pages.
Foreign Office Action, JP Application Serial No. 2002-503702, Final Notice of Rejection, (Jun. 5, 2009), 212 pages.
Foreign Office Action, Chinese Application Serial No. 200610003709.2, (Jan. 9, 2009), 8 pgs.
Foreign Office Action, Chinese Application Serial No. 200610051544.X, (Dec. 4, 2009), 9 pages.
Foreign Office Action, Canadian Application Serial No. 2412611, (Feb. 9, 2009), 6 pages.
Foreign Office Action, Australian Patent Application No. 2006200285, (May 20, 2010), 2 pgs.
Foreign Office Action, BR Application No. PI0111797-1, Feb. 11, 2014, 7 pages.
Foreign Office Action, Canadian Application No. 2800037, (Sep. 30, 2013), 2 pages.
Foreign Office Action, Canadian Application No. 2408313, (Oct. 26, 2010), 5 pages.
Foreign Office Action, Canadian Application No. 2408527, (Sep. 27, 2011), 3 pages.
Foreign Office Action, Canadian Application No. 2412611, (Oct. 26, 2010), 2 pages.
Foreign Office Action, Canadian Application No. 2533147, Jan. 25, 2013, 2 pages.
Foreign Office Action, Chinese Application No. 200610051554.X, (Jun. 25, 2010), 10 pages.
Foreign Office Action, Chinese Application No. 200610051554.X, (Jul. 10, 2009), 18 pages.
Foreign Office Action, Chinese Application No. 200680018421.0, (Jun. 24, 2010), 11 pgs.
Foreign Office Action, Chinese Application No. 200680018421.0, (Sep. 3, 2010), 9 pgs.
Foreign Office Action, Chinese Application No. 200680021415.0, (Jun. 8, 2010), 10 pgs.
Foreign Office Action, CN Application No. 01813162.x, (Feb. 16, 2007), 4 pages.
Foreign Office Action, CN Application No. 01813162.x, (May 9, 2008), 3 pages.
Foreign Office Action, CN Application No. 01813162.x, (Oct. 12, 2007), 7 pages.

(56) References Cited

OTHER PUBLICATIONS

Foreign Office Action, CN Application No. 201110365026.2, (Oct. 21, 2013), 18 pages.
Foreign Office Action, CN Application No. 201110365026.2, Jun. 5, 2014, 18 pages.
Foreign Office Action, EP Application No. 01935324.2, Sep. 10, 2014, 6 pages.
Foreign Office Action, EP Application No. 01937375.2, (Sep. 5, 2006), 4 pages.
Foreign Office Action, EP Application No. 01939034.3 (Nov. 5, 2007), 3 pages.
Foreign Office Action, EP Application No. 01935325.9, (Jun. 20, 2011), 5 pgs.
Foreign Office Action, EP Application No. 05112241.4, (Dec. 23, 2010), 6 pgs.
Foreign Office Action, European Application No. 01935325.9, (Jul. 20, 2010), 6 pgs.
Foreign Office Action, European Application No. 06101267.0, (Apr. 24, 2013), 7 pgs.
Foreign Office Action, European Patent Application No. 01939034.3, (Nov. 5, 2007), 3 pages.
Foreign Office Action, European Patent Application No. 01939368.5, (Feb. 25, 2010), 3 pages.
Foreign Office Action, Japanese Application No. 2002-503700, (May 10, 2011), 5 pages.
Foreign Office Action, Japanese Application No. 2002-503700, (Aug. 30, 2011), 4 pages.
Foreign Office Action, Japanese Application No. 2002-503701, (Mar. 16, 2012), 3 pages.
Foreign Office Action, Japanese Application No. 2002-503701, (May 31, 2011), 10 pages.
Foreign Office Action, Japanese Application No. 2002-504575, (Dec. 14, 2010), 4 pages.
Foreign Office Action, Japanese Application No. 2002-504581, (May 27, 2011), 6 pages.
Foreign Office Action, Japanese Application No. 2002-504581, (Dec. 17, 2010), 24 pages.
Foreign Office Action, Japanese Application No. 2002-530701, (Aug. 10, 2010), 11 pages.
Foreign Office Action, Japanese Application No. 2006-060050, (Aug. 26, 2011), 4 pages.
Foreign Office Action, Japanese Application No. 2006-071589, (Mar. 29, 2011), 9 pgs.
Foreign Office Action, Korean Application No. 10-2006-0012016, (Oct. 30, 2012), 6 pages.
Foreign Office Action, Korean Application No. 10-2012-0054230, (Aug. 19, 2012), 9 pages.
Foreign Office Action, Malaysian Application No. PI 200060743, (Jun. 8, 2012), 3 pages.
Foreign Office Action, Russian Application No. 2006103267, (Apr. 20, 2010), 10 pgs.
Foreign Office Action, Russian Application No. 2006105526, (Apr. 15, 2010), 10 pgs.
Foreign Office Action, Russian Application No. 2006105526, (Aug. 24, 2010), 5 pages.
Foreign Office Action, Taiwan Application No. 095103951, (Nov. 8, 2012), 15 pages.
Gill, Kathy E., "Blogging, RSS and the Information Landscape: A Look at Online News", In Proceedings of WWW 2005, 7 pages.
Grosso, et al., "XML Fragment Interchange", W3C, (Feb. 2001), 1-28.
Halberg, Bruce et al., "Using Microsoft Excel 97", (1997), 191-201, 213-219.
Halberg, et al., "Using Microsoft Excel 97", Que Corporation,,(1997),pp. 1-9, 18-25,85-89,98-101, 106-113, 124-127, 144-147, 190-201,209-210,218-227, 581-590, 632-633, 650-655, 712-714.
Hall, Ricard S., "Agent-based Software Configuration and Development", Retrieved from http://www.cs.colorado.edu/users/rickhali/documents/ThesisFinal.pdf on Nov. 7, 2003, Thesis of the University of Colorado, (Dec. 31, 1999), 182 pages.
Hall, Richard S., "Evaluating Software Deployment Languages and Schema", In Proceedings of International Conference on Software Maintenance, (Nov. 1998), 9 pages.
Hall, Richard S., et al., "Specifying the Deployable Software Description Format in XML", CU-SERL-207-99, Software Engineering Research Laboratory, University of Colorado at Boulder, (Mar. 31, 1999), 17 pages.
Hammersley, Ben "Content Syndication with RSS", Chapter 9: Using Feeds; Chapter 10: Directories, Web Aggregators, and Desktop Readers, O'Reilly books,(2007), 14 pages.
Hammersley, Ben "Developing Feeds with RSS and Atom", O'Reilly books, O'Reilly Media, Inc.,(Apr. 2005), 10 pages.
Han, Richard et al., "Websplitter: A Unified XML Framework for Multi-Device Collaborative Web Browsing", IBM Thomas J. Watson Research Center, (2000), 1-10.
Hardy, Matthew R., et al., "Mapping and Displaying Structural Transformations between XML and PDF", Proceedings of the 2002 ACM Symposium on Document Engineering 2002, ACM Press, pp. 95-102.
Haukeland, Jan-Henrick, "Tsbiff-tildeslash biff—version 1.2.1", http:///web.archive.org/web/19990912001527/http://www.tildeslash.com/tsbiff/., (Jun. 1999), 2 pgs.
Herzberg, Amir et al., "Protecting (even) Naive Web Users, or: Preventing Spoofing and Establishing Credentials of Web Sites", Bar Ilan University, Available at: <www.cs.bu.ac.il/-herzea/papers/ecommerce/trusted credentials area.pdf>, (Jul. 18, 2004), 26 pages.
Herzner, et al., "CDAM-Compound Document Access and Management. An Object-Oriented Approach", MultiMedia Systems Interaction and Applications, Chapter 3, (1992), pp. 17-36.
Hoffman, Michael "Architecture of Microsoft Office InfoPath 2003", Microsoft Office InfoPath 2003 Technical Articles, Retrieved from the Internet at http://msdn2.microsoft.com/en-us/library/aa219024(office.11,d=printer).aspx on Jan. 21, 2007, (Jun. 2003), 18 pgs.
Honkala, Mikko et al., "MultimodalInteraction with XForms", ICWE '06, (2006), pp. 201-208.
How to create a template that makes it easy for users to 'fill in the blank' without doing any programming, Retrieved from httQ://word.mvQs.org/FAQs/Customization/FillinTheBlanks.htm, (Apr. 2004), 2 pgs.
Howlett, Scott "A New Function for SOL Server 2000", MSDN Magazine, No. 1, (Apr. 18, 2000), 11 pages.
HP Blade Sever BH Series Operating System Guide, Hewlett-Packard, (Jul. 2002). pp. 1-69.
Hu, et al., "A Programmable Editor for Developing Structured Documents based on Bidirectional Transformations", ACM, (Aug. 2004): 178-179.
Huier, Zhang et al., "Design and Implementation of RSS-based Science and Technology Information Syndication System", Library of Chinese Academy of Sciences,(Jul. 2005), pp. 1-15.
Hwang, Kai et al., "Micro-Firewalls for Dynamic Network Security with Ditributed Intrusion Detection", IEEE Intl. Symposium on Network Computing and Applications, 2001 , pp. 68-79.
Ide, et al., "Outline of the International Standard Linguistic Annotation Framework", Proceedings of the ACL 2003 workshop on Linguistic Annotation, (Jul. 2003), 6 pages.
Intention to Grant, European Patent Application No. 01935325.9, (Dec. 7, 2012), 7 pages.
International Search Report, Application No. PCT/US01/15226 (Apr. 3, 2003), 4 pages.
International Search Report, Application No. PCT/US01/15576, (Feb. 24, 2003), 2 pages.
Issue Notification, U.S. Appl. No. 10/955,087, (Mar. 18, 2009), 1 page.
Issue Notification, U.S. Appl. No. 10/988,718 (Aug. 12, 2009), 1 page.
Issue Notification, U.S. Appl. No. 11/095,254, (Feb. 10, 2010), 1 page.
Issue Notification, U.S. Appl. No. 11/276,585 (Jan. 21, 2009), 1 page.
Japanese Notice of Allowance in Application 2006-060050, mailed Dec. 6, 2011, 6 pgs.

(56) References Cited

OTHER PUBLICATIONS

Kaiya, Haruniko et al., "Specifying Runtime Environments and Functionalities of Downloadable Components under the Sandbox Model", Int'l Symposium on Principles of Software Evolution, 2000, pp. 138-142.
Kanemoto, HI Rotaka et al., "An Efficiently Updatable Index Scheme for Structured Documents", (1998), pp. 991-996.
Kaori, Iwantani et al., "Perfect Manual of Clarisworks 4.0 for Macintosh", 1st Edition, Japan, (Jul. 22, 1997), pp. 153-167.
Kath, Randy "Managing Virtual Memory in Win32", Microsoft Developer Network Technology Group, Retrieved Apr. 17, 2002 from http://msdn.microsoft.comilibrary/en-us/dngenlib/html/msdnvirtmm.asp?frame=true, (Jan. 20, 1993), 9 pages.
Kay, Michael "XSL Transfornmations (XSLT) Version 2.0", http://www.w3.orq/TR/2005/WD-xslt20-20050404, (04/205), 1-374.
Kim, Sang-Kyun et al., "Immediate and Partial Validation Mechanism for the Conflict Resolution of Update Operations in XML Databases", WAIM 2002, LNCS 2419,2002, Springer-Verlag Berlin Heidelberg,(2002), pp. 387-396.
Klarlund, Nils "DSD: A Schema Language for XML", ACM, FSMP Portland Oregon (2000). pp. 101-111.
Kobayashi, et al., "An update on BTRON-specification OS Development", 0-8186-2475-2/91, IEEE 1991, pp. 132-140.
Komatsu, Net al., "A Proposal on Digital Watermark in Document Image Communication and it's Applications to Realizing a Signature", Electronics and Communication in Japan, Part I: Communications, vol. 73, No. 5, (May 1990), pp. 22-33.
Leblond, et al., "PC Magazine Guid to Quattro Pro for Windows", Ziff-Davis Press, (1993), pp. 9-11,42-61.
Lehtonen, Miro et al., "A Dynamic User Interface for Document Assembly", Department of Computer Science, University of Helsinki, (Nov. 2002), pp. 134-141.
Lotus Notes Release 5, Step by Step, Lotus Development Corporation, (1999), 224 pages.
Mansfield, "Excel 97 for Busy People", Osborne/Mcgraw-Hill, (1997), pp. 48-50.
Manual of Patent Office Practice, Computer-Implemented Inventions, Chapter 16.09.02, Data Structures, (Oct. 2010), 3 pages.
McCright, J.S. "New Tool kit to Link Groove with Microsoft SharePoint", eWeek, Enterprise News & Reviews, Ziff Davis Media Inc.,(Jul. 29, 2002), 1 page.
Mehta, Manish et al., "SLIQ: A Fast Scalable Classifier for Data Mining", available at <<http://vvvvw.dbis.informatik.hu-berlin.de/dbisold/lehre/WS0405/KDD/paper/MAR96.pdf, (Mar. 1996), 15 Pages.
Mengel, A et al., "MATE Dialogue Annotation Guidelines", http://www.ims.unistuttgart.de/proiekte/mate/mdag (Jan. 8, 2000), 64 pages.
Microsoft Computer Dictionary 5th Edition, Entry for "Stack," Microsoft Press, ISBN 0-7356-1495-4, (May 1, 2002), p. 495.
*Microsoft Computer Dictionary*, Microsoft Press, 5$^{th}$ Edition, Jun. 1, 2002, p. 149.
Microsoft Visual Basic 5.0 Programmer's Guide, Microsoft Press, (1997), pp. 42-43, 54-58, 578-579.
Microsoft Word 2000 Screenshots, (2000), pp. 11-17.
Microsoft Word 2000, Screenshots, (1999), pp. 1-5.
Moats, R. "A URN Namespace for IETF Documents", RFC 2648, (Aug. 1999), pp. 1-30.
Moats, R. "URN Syntax", RFC 2141, (May 1997), pp. 1-8.
Musgrave, S., "Networking Technology—Impact and Opportunities", Survey and Statistical Computing 1996, Proceedings of the Second ASC International Conference, London, UK, (Sep. 1996), pp. 369-378.
Nelson, Joe "Client-side Form Validation Using JavaScript", Developer Advisory, (Sep. 21, 2001), pp. 1-9.
Nelson, Mark, "Validation with MSXML and XML Schema", Windows Developer Magazine, (Jan. 11, 2002), 5 pages.
Netscape Communicator 4.61 for OS/2 Warp, Netscape Communication Corporation, Software 1999, The Whole software release & Netscape—Version 4.61 {en}—010615, Netscape Screenshot, (Oct. 2, 2002).
Netscape Window, Netscape Screenshot, (Oct. 2, 2002), 1 page.
Non Final Office Action, U.S. Appl. No. 11/170,521, (Jan. 21, 2009), 86 pages.
Non Final Office Action, U.S. Appl. No. 09/599,086, (Jan. 30, 2006), 33 pages.
Non Final Office Action, U.S. Appl. No. 09/599,086, (Oct. 28, 2003), 21 pages.
Non Final Office Action, U.S. Appl. No. 09/599,086, (Oct. 31, 2007), 48 pages.
Non Final Office Action, U.S. Appl. No. 09/599,086, (Nov. 13, 2006) 33 pages.
Non Final Office Action, U.S. Appl. No. 09/599,086, (Nov. 14, 2008), 55 pages.
Non Final Office Action, U.S. Appl. No. 09/599,086, (Mar. 3, 2005), 25 pages.
Non Final Office Action, U.S. Appl. No. 09/599,809, (May 13, 2009), 17 pages.
Non Final Office Action, U.S. Appl. No. 10/178,291, (Nov. 26, 2004), 21 pages.
Non Final Office Action, U.S. Appl. No. 10/178,291, (Apr. 29, 2004), 14 pages.
Non Final Office Action, U.S. Appl. No. 10/178,291, (Jun. 27, 2005), 22 pages.
Non Final Office Action, U.S. Appl. No. 10/402,640, (Sep. 8, 2008), 16 pages.
Non Final Office Action, U.S. Appl. No. 10/402,640, (Oct. 6, 2006), 15 pgs.
Non Final Office Action, U.S. Appl. No. 10/402,640, (Feb. 12, 2008), 16 pgs.
Non Final Office Action, U.S. Appl. No. 10/402,640, (Apr. 25, 2007), 16 pgs.
Non Final Office Action, U.S. Appl. No. 10/857,689, (Jun. 11, 2009), 21 pages.
Non Final Office Action, U.S. Appl. No. 10/876,433, (Apr. 24, 2009), 25 pages.
Non Final Office Action, U.S. Appl. No. 10/897,647, (Nov. 14, 2008), 28 pages.
Non Final Office Action, U.S. Appl. No. 10/897,647, (Sep. 6, 2007), 21 pages.
Non Final Office Action, U.S. Appl. No. 10/898,656, (Apr. 18, 2008), 17 pages.
Non Final Office Action, U.S. Appl. No. 10/898,656, (Jul. 13, 2007), 13 pages.
Non Final Office Action, U.S. Appl. No. 10/898,657, (Jul. 18, 2007), 18 pages.
Non Final Office Action, U.S. Appl. No. 10/898,657, (Sep. 8, 2008), 24 pages.
Non Final Office Action, U.S. Appl. No. 10/916,692, (Apr. 30, 2009), 14 pages.
Non Final Office Action, U.S. Appl. No. 10/939,588, (Feb. 18, 2009), 30 pages.
Non Final Office Action, U.S. Appl. No. 10/942,528, (Mar. 6, 2009), 31 pages.
Non Final Office Action, U.S. Appl. No. 10/955,087, (Nov. 19, 2007), 22 pgs.
Non Final Office Action, U.S. Appl. No. 10/955,665, (Apr. 2, 2009), 16 pages.
Non Final Office Action, U.S. Appl. No. 10/955,666, (May 7, 2009), 25 pages.
Non Final Office Action, U.S. Appl. No. 10/955,666, (Dec. 26, 2006), 21 pages.
Non Final Office Action, U.S. Appl. No. 10/955,666, (Feb. 4, 2008), 21 pages.
Non Final Office Action, U.S. Appl. No. 10/976,451, (Feb. 23, 2009), 39 pages.
Non Final Office Action, U.S. Appl. No. 10/977,198, (Jan. 10, 2008), 11 pages.
Non Final Office Action, U.S. Appl. No. 10/977,198, (Feb. 2, 2009), 15 pages.

(56) References Cited

OTHER PUBLICATIONS

Non Final Office Action, U.S. Appl. No. 10/977,198, (Mar. 9, 2007), 10 pages.
Non Final Office Action, U.S. Appl. No. 10/988,718, (Jan. 25, 2007), 49 pages.
Non Final Office Action, U.S. Appl. No. 10/988,718, (Jul. 21, 2008), 19 pages.
Non Final Office Action, U.S. Appl. No. 10/988,718, (Jul. 26, 2007), 22 pgs.
Non Final Office Action, U.S. Appl. No. 10/988,720, (Jan. 28, 2008), 19 pages.
Non Final Office Action, U.S. Appl. No. 10/990,152, (May 28, 2009), 16 pgs.
Non Final Office Action, U.S. Appl. No. 11/095,254, (Jun. 8, 2009), 8 pages.
Non final Office Action, U.S. Appl. No. 11/234,767, (Feb. 26, 2009), 23 pages.
Non Final Office Action, U.S. Appl. No. 11/295,178, (May 27, 2009), 110 pgs.
Non-Final Office Action in U.S. Appl. No. 10/990,152, (Jun. 16, 2008), 14 pgs.
Non-Final Office Action in U.S. Appl. No. 12/061,613, (Jun. 17, 2013), 15 pgs.
Non-Final Office Action in U.S. Appl. No. 13/159,239, (May 23, 2013), 34 pgs.
Non-Final Office Action, U.S. Appl. No. 10/402,640, (Dec. 30, 2009), 16 pages.
Non-Final Office Action, U.S. Appl. No. 09/599,299, (Oct. 28, 2003), 32 pages.
Non-Final Office Action, U.S. Appl. No. 09/599,299, (Aug. 12, 2004), 13 pages.
Non-Final Office Action, U.S. Appl. No. 09/599,812, (Feb. 27, 2003), 20 pages.
Non-Final Office Action, U.S. Appl. No. 09/599,812, (Feb. 5, 2004), 35 pages.
Non-Final Office Action, U.S. Appl. No. 09/599,813, (Jan. 24, 2006), 22 pages.
Non-Final Office Action, U.S. Appl. No. 09/599,813, (Feb. 18, 2004), 23 pages.
Non-Final Office Action, U.S. Appl. No. 09/599,813, (Aug. 10, 2005), 25 pages.
Non-Final Office Action, U.S. Appl. No. 09/599,813, (Aug. 19, 2004),18 pages.
Non-Final Office Action, U.S. Appl. No. 10/011,150, (May 19, 2005), 7 pages.
Non-Final Office Action, U.S. Appl. No. 10/402,640, (Apr. 30, 2010), 4 pages.
Non-Final Office Action, U.S. Appl. No. 10/632,297, (Mar. 20, 2006), 23 pages.
Non-Final Office Action, U.S. Appl. No. 10/632,297, (May 25, 2007), 22 pages.
Non-Final Office Action, U.S. Appl. No. 10/723,188, (Apr. 16, 2008), 16 pages.
Non-Final Office Action, U.S. Appl. No. 10/723,188, (Jun. 14, 2006), 25 pages.
Non-Final Office Action, U.S. Appl. No. 10/723,863, (Feb. 8, 2007), 30 Pages.
Non-Final Office Action, U.S. Appl. No. 10/723,863, (Aug. 23, 2006), 16 Pages.
Non-Final Office Action, U.S. Appl. No. 10/723,863, (Nov. 6, 2007), 7 Pages.
Non-Final Office Action, U.S. Appl. No. 10/770,240, (Oct. 29, 2010), 14 pages.
Non-Final Office Action, U.S. Appl. No. 10/770,240, (May 13, 2010), 15 pages.
Non-Final Office Action, U.S. Appl. No. 10/770,240, (Sep. 13, 2013), 15 pages.
Non-Final Office Action, U.S. Appl. No. 10/846,428, (Oct. 15, 2008), 23 pages.
Non-Final Office Action, U.S. Appl. No. 10/846,428, (Jul. 19, 2007), 19 pages.
Non-Final Office Action, U.S. Appl. No. 10/854,961, (Nov. 15, 2006), 22 pgs.
Non-Final Office Action, U.S. Appl. No. 10/916,692, (Apr. 5, 2010), 6 pages.
Non-Final Office Action, U.S. Appl. No. 10/939,588, (Aug. 27, 2009), 28 pgs.
Non-Final Office Action, U.S. Appl. No. 10/953,933, (Jul. 9, 2007), 26 pages.
Non-Final Office Action, U.S. Appl. No. 10/955,665, (Sep. 11, 2008), 17 pgs.
Non-Final Office Action, U.S. Appl. No. 10/976,451, (Oct. 29, 2009), 15 pgs.
Non-Final Office Action, U.S. Appl. No. 10/976,451, (Nov. 10, 2010), 10 pages.
Non-Final Office Action, U.S. Appl. No. 10/976,451, (Apr. 9, 2010), 11 pages.
Non-Final Office Action, U.S. Appl. No. 10/988,732, (Apr. 1, 2008), 28 pages.
Non-Final Office Action, U.S. Appl. No. 10/988,732, (May 26, 2010), 37 pgs.
Non-Final Office Action, U.S. Appl. No. 10/988,732, (Jun. 11, 2009), 31 pgs.
Non-Final Office Action, U.S. Appl. No. 11/012,472, (Oct. 6, 2009), 9 pages.
Non-Final Office Action, U.S. Appl. No. 11/012,472, (Jul. 1, 2010), 10 pages.
Non-Final Office Action, U.S. Appl. No. 11/036,910, (Oct. 2, 2008), 8 pages.
Non-Final Office Action, U.S. Appl. No. 11/036,910, (Nov. 13, 2009), 9 pgs.
Non-Final Office Action, U.S. Appl. No. 11/036,910, (Aug. 19, 2010), 9 pages.
Non-Final Office Action, U.S. Appl. No. 11/044,106, (Sep. 24, 2009), 17 pgs.
Non-Final Office Action, U.S. Appl. No. 11/056,439, (May 23, 2007), 5 pages.
Non-Final Office Action, U.S. Appl. No. 11/056,500, (Sep. 4, 2008), 7 pages.
Non-Final Office Action, U.S. Appl. No. 11/107,347, (Sep. 17, 2009), 9 pgs.
Non-Final Office Action, U.S. Appl. No. 11/107,347, (Jul. 9, 2010), 16 pages.
Non-Final Office Action, U.S. Appl. No. 11/170,521, (Dec. 17, 2009), 11 pages.
Non-Final Office Action, U.S. Appl. No. 11/170,521, (Aug. 3, 2011), 16 pages.
Non-Final Office Action, U.S. Appl. No. 11/218,149, (Jan. 14, 2010), 15 Pages.
Non-Final Office Action, U.S. Appl. No. 11/218,149, (Sep. 20, 2010), 15 pages.
Non-Final Office Action, U.S. Appl. No. 11/227,550, (Mar. 10, 2010), 12 pages.
Non-Final Office Action, U.S. Appl. No. 11/234,767, (Nov. 26, 2010), 28 pages.
Non-Final Office Action, U.S. Appl. No. 11/295,178, (May 26, 2010), 45 pages.
Non-Final Office Action, U.S. Appl. No. 11/557,931, (Oct. 20, 2009), 27 pgs.
Non-Final Office Action, U.S. Appl. No. 11/567,140, (May 18, 2010), 9 pages.
Non-Final Office Action, U.S. Appl. No. 11/567,149, (Sep. 8, 2009), 6 pgs.
Non-Final Office Action, U.S. Appl. No. 12/021,894, (Dec. 31, 2009), 10 pages.
Non-Final Office Action, U.S. Appl. No. 12/061,613, (Mar. 16, 2012), 12 pages.
Non-Final Office Action, U.S. Appl. No. 12/061,613, (Sep. 28, 2010), 9 pages.
Non-Final Office Action, U.S. Appl. No. 12/126,532, (Sep. 27, 2013), 19 Pages.

(56) References Cited

OTHER PUBLICATIONS

Non-Final Office Action, U.S. Appl. No. 12/694,836, (Mar. 9, 2012), 30 pages.
Non-Final Office Action, U.S. Appl. No. 12/722,414, (Aug. 15, 2012), 27 pages.
Non-Final Office Action, U.S. Appl. No. 12/722,414, (May 21, 2013), 20 pages.
Non-Final Office Action, U.S. Appl. No. 13/159,239, Apr. 25, 2014, 38 pages.
Non-Final Office Action, U.S. Appl. No. 13/161,419, (Aug. 15, 2012), 7 pages.
Non-Final Office Action, U.S. Appl. No. 11/234,767, (Aug. 12, 2009), 24 pgs.
Non-Final Office Action, U.S. Appl. No. 11/227,550, (Aug. 3, 2009), 10 pgs.
Noore, Afzel "A Secure Conditional Access System using Digital Signature and Encryption", International Conference on Consumer Electronics, (Jun. 2003), pp. 220-221.
Noriko, Matsushita "Step-up Training of Clarisworks (tabulation), Successful Use of Spreadsheet and Tabulation", Mac People, vol. 4, No. 19, (10101/98), pp. 138-139.
Notice of Allowance, U.S. Appl. No. 09/599,086, (Aug. 17, 2009), 59 pages.
Notice of Allowance, U.S. Appl. No. 09/599,299, (Nov. 30, 2004), 7 pages.
Notice of Allowance, U.S. Appl. No. 09/599,812, (Aug. 3, 2004), 12 pages.
Notice of Allowance, U.S. Appl. No. 09/599,813, (Sep. 19, 2006), 9 pages.
Notice of Allowance, U.S. Appl. No. 10/011,150, (Dec. 16, 2005), 4 pages.
Notice of Allowance, U.S. Appl. No. 10/178,291, (Feb. 6, 2006), 7 pages.
Notice of Allowance, U.S. Appl. No. 10/402,640, (Jun. 15, 2010), 6 pages.
Notice of Allowance, U.S. Appl. No. 10/404,312, (Jan. 12, 2009), 8 pages.
Notice of Allowance, U.S. Appl. No. 10/632,297, (Nov. 14, 2007), 7 pages.
Notice of Allowance, U.S. Appl. No. 10/723,863, (Jun. 30, 2008), 9 pages.
Notice of Allowance, U.S. Appl. No. 10/770,240, Mar. 21, 2014, 10 Pages.
Notice of Allowance, U.S. Appl. No. 10/846,428, (Apr. 29, 2009), 7 pages.
Notice of Allowance, U.S. Appl. No. 10/854,961, (Jun. 14, 2007), 12 pages.
Notice of Allowance, U.S. Appl. No. 10/897,647, (Jan. 19, 2010), 13 pages.
Notice of Allowance, U.S. Appl. No. 10/898,656, (Jan. 2, 2009), 10 pages.
Notice of Allowance, U.S. Appl. No. 10/898,657, (Jun. 11, 2009), 20 pages.
Notice of Allowance, U.S. Appl. No. 10/916,692, (Jun. 14, 2010), 6 pages.
Notice of Allowance, U.S. Appl. No. 10/942,528, (Dec. 3, 2009), 8 pages.
Notice of Allowance, U.S. Appl. No. 10/953,933, (Mar. 14, 2008), 8 pages.
Notice of Allowance, U.S. Appl. No. 10/955,087, (Dec. 11, 2008), 10 pages.
Notice of Allowance, U.S. Appl. No. 10/955,665, (Nov. 3, 2009), 8 pages.
Notice of Allowance, U.S. Appl. No. 10/955,665, (Dec. 30, 2009), 2 pages.
Notice of Allowance, U.S. Appl. No. 10/988,720, (Sep. 17, 2009), 18 pages.
Notice of Allowance, U.S. Appl. No. 10/990,152, (Dec. 21, 2009), 6 pages.
Notice of Allowance, U.S. Appl. No. 11/036,910, (Dec. 7, 2010), 7 pages.
Notice of Allowance, U.S. Appl. No. 11/044,106, (Mar. 15, 2010), 7 pages.
Notice of Allowance, U.S. Appl. No. 11/056,439, (Feb. 5, 2008), 8 pages.
Notice of Allowance, U.S. Appl. No. 11/056,439, (Sep. 18, 2007), 12 pages.
Notice of Allowance, U.S. Appl. No. 11/056,500, (Dec. 2, 2009), 15 pages.
Notice of Allowance, U.S. Appl. No. 11/072,087, (Feb. 23, 2010), 4 pages.
Notice of Allowance, U.S. Appl. No. 11/095,254, (Nov. 18, 2009), 8 pages.
Notice of Allowance, U.S. Appl. No. 11/103,836, (Oct. 18, 2007), 6 pages.
Notice of Allowance, U.S. Appl. No. 11/167,514, (Mar. 11, 2009), 6 pages.
Notice of Allowance, U.S. Appl. No. 11/170,521, (Jan. 19, 2012), 8 pages.
Notice of Allowance, U.S. Appl. No. 11/203,937, (Aug. 3, 2009), 7 pages.
Notice of Allowance, U.S. Appl. No. 11/203,937, (Aug. 31, 2009), 2 pages.
Notice of Allowance, U.S. Appl. No. 11/203,937, Supplemental, (Sep. 15, 2009), 2 pages.
Notice of Allowance, U.S. Appl. No. 11/557,931, (May 5, 2010), 7 pages.
Notice of Allowance, U.S. Appl. No. 11/567,140, (Oct. 11, 2011), 12 pages.
Notice of Allowance, U.S. Appl. No. 11/872,703, (Jan. 27, 2010), 19 pages.
Notice of Allowance, U.S. Appl. No. 11/872,703, (May 14, 2010), 18 pages.
Notice of Allowance, U.S. Appl. No. 11/927,296, (Aug. 8, 2011), 7 pages.
Notice of Allowance, U.S. Appl. No. 12/021,894, (Oct. 29, 2010), 9 pgs.
Notice of Allowance, U.S. Appl. No. 12/061,613, Aug. 7, 2014, 11 pages.
Notice of Allowance, U.S. Appl. No. 12/249,973, (Sep. 28, 2011), 9 pages.
Notice of Allowance, U.S. Appl. No. 13/161,419, (Dec. 7, 2012), 6 pages.
Notice of Re-Examination, Chinese Application Serial No. 01813138.7, (Mar. 11, 2009), 27 pgs.
OLE Open Doc and Network, Retrieved from http://www.pcwebopedia.com on May 9, 2006, Webopedia entries, (May 16, 1998), 7 pages.
OMG XML Metadata Interchange (XMI) Specification, Retrieved from: <http://vvvvw.omg.org/cgi-bin/doc?formal/02-01-01.pdf> Version 1.2, (Jan. 2002), 268 pgs.
Pacheco, Xavier et al., "Delphi 5 Developers Guide", Sams Publishing. Chapter 31, Section: Data Streaming, (1999), 4 pgs.
PCT Search Report, PCT Application No. PCT/US01/15581, (Jan. 29, 2003), 3 pgs.
Peterson, B "Unix Variants", Unix Review, vol. 10, No. 4, (Apr. 1992), pp. 29-31.
Pike, et al., "Plan 9 From Bell Labs", AT&T Bell Laboratories, UKUUG, Summer 1990, 11 pages.
Pike, et al., "The Use of Name Spaces in Plan 9", Operating Systems Review, vol. 27, No. 2, (Apr. 1993), pp. 72-76.
Prevelakis, Vassilis et al., "Sand boxing Applications", FREEN IX Track: 2001 USENIX Annual Technical Conference, pp. 119-126.
Prosise, Jeff "Programming Microsoft Net", retrieved from: <http://academic.safaribooksonline.com/print?xmlid=0-7356-1376-1/IDAVO3T> on Mar. 3, 2011, Microsoft Press,(May 15, 2002), 24 pages.
Rado, Dave "How to create a template that makes it easy for users to 'ill in the blanks' without doing any programming,", Retrieved from http://word.mvps.orq/FAQs/Customization/FillinTheBlanks.htm, (Apr. 30, 2004), 2 pages.

(56) References Cited

OTHER PUBLICATIONS

Raggett, "HTML Tables", Retrieved from http:www//isedu.homuns.edu.vn/WebLib/books/Web/Tel/html3-tables.htm/ on Aug. 6, 2006, W3C Internet Draft, (Jul. 7, 1995), pp. 1-12.
Raman, T. V., et al., "XForms 1.0", (Dec. 2001), Section 1-12.2.3 & Appendices A-G.
Rapaport, L., "Get More From SharePoint", Transform Magazine, vol. 11, No. 3, (Mar. 2002), pp. 13-15.
Wong, et al., "Managing and Querying Multi-Version XML Data with Update Logging", DocEng '02 Copyright 2002, ACM 1-58113-597-7/02/0011, (Nov. 8-9, 2002), pp. 74-81.
Moore, et al., "Collection-based persistent digital archives", U.S. Appl. No. 60/191,662, filed Mar. 23, 2000, 133 pgs.
Rees, Michael J., "Evolving the Browser Towards a Standard User Interface Architecture", School of Information Technology, Bond University, Australia, (2001), pp. 1-7.
Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005), 52 pages.
Resizing Controls Dynamically, Microsoft Visual Basic 5.0 Programmer's Guide 1997, (1997), pp. 578-579.
Restriction Requirement, U.S. Appl. No. 10/011,150, (Dec. 15, 2004), 5 pages.
Restriction Requirement, U.S. Appl. No. 10/402,640, (Aug. 29, 2006), 5 pgs.
Restriction Requirement, U.S. Appl. No. No. 11/012,472, (Jun. 9, 2009), 7 pages.
Restriction Requirement, U.S. Appl. No. 11/227,550, (Apr. 2, 2009), 8 pages.
Rogge, Boris et al., "Validating MPEG-21 Encapsulated Functional Metadata", IEEE 2002, ISBN 0-7803-7304-9/02, (2002), pp. 209-212.
Sato, T. et al., "XFIG Version 3.2 Patch level 2 Users Manual Edition 1.0", Available at httQ:I Itinf2.vub.ac.be/-dvermeir/manuals/xfig/lib/X 11 Ixfig/html/index.html, (Jul. 2, 1998), 37 pages.
Schmalstieg, Dieter et al., "Using Transparent Props for Interaction with the Virtual Table," Proceedings of the 1999 symposium on Interactive 3D graphics., avalable at <http://citeseerx.ist.psu.edu/viewdoc/summary?doi=10.1.1.35.8236>, (Apr. 26, 1999), 7 pages.
Schmid, M. et al., "Protecting Data from Malicious Software", 18th Annual Security Applications Conference,(2002) ,pp. 199-208.
Sebastiani, F., "A Tutorial on Automated Text Categorisation", In Analia Amandi and Ricardo Zunino, editors, Proceedings of ASAI-99, 1st Argentinean Symposium on Artificial Intelligence, Buenos Aires, AR, (1999), pp. 7-35.
Simpson, "WordPerfect 6 for Windows Instant Reference", SYBEX, Alameda, CA, US, ISBN: 978-0-78-211383-9, Jan. 1994, 14 pgs.
Singh, Darshan "Microsoft InfoPath 2003 by Example", Retrieved from the Internet at http://www.perfectxml.com/InfoPath.asp on Jan. 21, 2007, (Apr. 20, 2003), 19 pgs.
SmartUpdate Developer's Guide, Retrieved from http://developer.netscape.com:80/docs/manuals/communicator/jarman/index.htm on Dec. 8, 2000, Netscape Communications Corp, (Mar. 11, 1999) , 83 pages.
Sollins, et al., "Functional Requirements for Uniform Resource Names", RFC 1737, (Dec. 1994), pp. 1-7.
*Stack Algorithm for Extracting Subtree from Serialized Tree*, IBM Technical Disclosure Bulletin, TBD-ACC-NO, NN94033, Mar. 1, 1994, 3 pages.
Staneck, W "Internal and External Media", Electronic Publishing Unleashed, Chapter 22, (1995), pp. 510-542.
Store and Organize Related Project Files in a Binder, Getting results with Microsoft Office, (1990), pp. 109-112.
Streamlining Content Creation, Ixia Soft, Jun. 6, 2002, pp. 1-16.
STYLUSSTUDIO, "StylusStudio: XPath Tools", 2004-2007, StylusStudio, 1-14.
Summons to Attend Oral Proceedings, European Patent Application No. 01935325.9, (Sep. 7, 2012), 9 pages.

Sun, Q et al., "A Robust and Secure Media Signature Scheme for JPEG Images", Proceeding of 2002 IEEE Workshop on Multimedia Signal Processing, (Dec. 2002), pp. 296-299.
Supplemental Notice of Allowance, U.S. Appl. No. 10/955,665, (Feb. 4, 2010), 2 pgs.
Supplemental Notice of Allowance, U.S. Appl. No. 10/955,665, (Nov. 27, 2009), 3 pgs.
Supplemental Notice of Allowance, U.S. Appl. No. 10/955,665, (Mar. 5, 2010), 2 pgs.
Supplemental Notice of Allowance, U.S. Appl. No. 10/990,152, (Apr. 19, 2010), 2 pages.
Supplemental Notice of Allowance, U.S. Appl. No. 11/044,106, (May 13, 2010), 6 pgs.
Supplemental Notice of Allowance, U.S. Appl. No. 11/044,106, (May 19, 2010), 5 pgs.
Supplemental Notice of Allowance, U.S. Appl. No. 11/072,087, (Apr. 19, 2010), 2 pages.
Supplemental Notice of Allowance, U.S. Appl. No. No. 13/161,419, Feb. 25, 2013, 2 pages.
Supplemental Notice of Allowance, U.S. Appl. No. No. 13/161,419, Mar. 25, 2013, 3 pages.
Supplementary European Search Report, Application No. 04779161.1, (Jul. 14, 2011), 4 pages.
Sutanthavibul, Supoj et al., "XFIG version 3.2 Patchlevel2 (Jul. 2, 1998) Users Manual (Edition 1.0)", Retrieved from www.ice.mtu.edu/online docs/sfig3321 on Jan. 28, 2003, Internet Document XP002229137,(007/02/98), 63 pgs.
Taiwan Search Report, Taiwan Appliaction No. 095103951, (Nov. 8, 2012), 1 page.
TEI: P4 Guidelines, TEI Consortium, (Mar. 2002), 340 pages.
Text Encoding Initiative, TEI Consortium, (Mar. 2002), 1 page.
The History of Notes and Domino, developerWorks Technical Resource Portal, Retrieved from: <http://www.ibm.com/developerworks/lotus/library/ls-NDHistory/> on Jul. 9, 2010, (Nov. 14, 2007), 19 pages.
Tomimori, Hiroyuki et al., "An Efficient and Flexible Access Control Framework for Java Programs in Mobile Terminals", Proceeding of 22nd Int'l Conference on Distrubuted Computing Systems Workshops,(2002), pp. 777-782.
Trupin, J "The Visual Programmer", Microsoft Systems Journal, (Apr. 1996), pp. 103-105.
U.S. Appl. No. 60/209,713, Kutay et al., filed Jun. 5, 2000.
Udell, Jon "InfoPath and XForms", Retrieved from the Internet at http://weblog.infoworld.com/udell/2003/02/26.html, (Feb. 26, 2003).
US Amendment mailed Nov. 19, 2012, in U.S. Appl. No. 10/976,451, (10 pages).
US Notice of Allowance mailed Feb. 4, 2013, in U.S. Appl. No. 10/976,451, (10 pages).
U.S. Appl. No. 10/395,505, Notice of Allowance mailed Aug. 24, 2007, 2 pgs.
U.S. Appl. No. 10/632,297, Advisory Action mailed Dec. 29, 2006, 3 pgs.
U.S. Appl. No. 10/632,297, Amendment and Response filed Dec. 7, 2006, 29 pgs.
U.S. Appl. No. 10/632,297, Amendment and Response filed Mar. 8, 2007, 22 pgs.
U.S. Appl. No. 10/632,297, Amendment and Response filed Jun. 20, 2006, 23 pgs.
U.S. Appl. No. 10/632,297, Amendment and Response filed Sep. 14, 2007, 15 pgs.
U.S. Appl. No. 10/632,297, Final Office Action mailed Sep. 8, 2006, 32 pgs.
U.S. Appl. No. 10/632,297, Notice of Allowance mailed Nov. 14, 2007, 7 pgs.
U.S. Appl. No. 10/632,297, Office Action mailed Mar. 20, 2006, 24 pgs.
U.S. Appl. No. 10/632,297, Office Action mailed May 25, 2007, 23 pgs.
U.S. Appl. No. 10/723,188, Advisory Action mailed Feb. 21, 2007, 5 pgs.
U.S. Appl. No. 10/723,188, Amendment filed Oct. 15, 2008, 29 pgs.
U.S. Appl. No. 10/723,188, Amendment filed Feb. 2, 2007, 34 pgs.

(56) References Cited

OTHER PUBLICATIONS

U.S. Appl. No. 10/723,188, Amendment filed May 8, 2009, 24 pgs.
U.S. Appl. No. 10/723,188, Amendment filed Aug. 21, 2006, 30 pgs.
U.S. Appl. No. 10/723,188, Office Action mailed Nov. 3, 2006, 34 pgs.
U.S. Appl. No. 10/723,188, Office Action mailed Apr. 16, 2008, 17 pgs.
U.S. Appl. No. 10/723,188, Office Action mailed Jun. 14, 2006, 64 pgs.
U.S. Appl. No. 10/854,961, Amendment filed Mar. 27, 2007, 36 pgs.
U.S. Appl. No. 10/857,689, Amendment filed Oct. 10, 2008, 8 pgs.
U.S. Appl. No. 10/857,689, Amendment filed Nov. 2, 2007, 9 pgs.
U.S. Appl. No. 10/857,689, Amendment filed Feb. 5, 2010, 9 pgs.
U.S. Appl. No. 10/857,689, Amendment filed Apr. 15, 2008, 11 pgs.
U.S. Appl. No. 10/857,689, Amendment filed Apr. 2, 2009, 8 pgs.
U.S. Appl. No. 10/857,689, Amendment filed Aug. 19, 2009, 9 pgs.
U.S. Appl. No. 10/857,689, Notice of Allowance mailed May 14, 2010, 9 pgs.
U.S. Appl. No. 10/857,689, Office Action mailed Jan. 15, 2008, 16 pgs.
U.S. Appl. No. 10/857,689, Office Action mailed Dec. 17, 2009, 20 pgs.
U.S. Appl. No. 10/857,689, Office Action mailed Jun. 13, 2007, 24 pgs.
U.S. Appl. No. 10/857,689, Office Action mailed Jul. 18, 2008, 19 pgs.
U.S. Appl. No. 10/876,433, Amendment filed Feb. 11, 2009, 10 pgs.
U.S. Appl. No. 10/876,433, Amendment filed Jul. 29, 2008, 10 pgs.
U.S. Appl. No. 10/876,433, Amendment filed Jul. 6, 2009, 10 pgs.
U.S. Appl. No. 10/876,433, Notice of Allowance mailed Nov. 10, 2009, 13 pgs.
U.S. Appl. No. 10/876,433, Office Action mailed Nov. 14, 2008, 32 pgs.
U.S. Appl. No. 10/876,433, Office Action mailed May 12, 2008, 27 pgs.
U.S. Appl. No. 10/955,087, Amendment filed Feb. 11, 2008, 14 pgs.
U.S. Appl. No. 10/955,087, Amendment filed Sep. 16, 2008, 21 pgs.
U.S. Appl. No. 10/955,665, Amendment filed Jan. 12, 2009, 23 pgs.
U.S. Appl. No. 10/955,665, Amendment filed Jul. 2, 2009, 10 pgs.
U.S. Appl. No. 10/955,666, Amendment filed Nov. 13, 2007, 21 pgs.
U.S. Appl. No. 10/955,666, Amendment filed Mar. 2, 2009, 26 pgs.
U.S. Appl. No. 10/955,666, Amendment filed Jun. 21, 2007, 26 pgs.
U.S. Appl. No. 10/955,666, Amendment filed Jul. 22, 2009, 32 pgs.
U.S. Appl. No. 10/955,666, Amendment filed Jul. 25, 2008, 23 pgs.
U.S. Appl. No. 10/955,666, Final Office Action mailed Oct. 14, 2009, 25 pgs.
U.S. Appl. No. 10/976,451, Amendment filed Jan. 12, 2009, 5 pgs.
U.S. Appl. No. 10/976,451, Amendment filed Oct. 25, 2010, 8 pgs.
U.S. Appl. No. 10/976,451, Amendment filed Dec. 16, 2009, 7 pgs.
U.S. Appl. No. 10/976,451, Amendment filed Feb. 16, 2011, 7 pgs.
U.S. Appl. No. 10/976,451, Amendment filed May 26, 2009, 6 pgs.
U.S. Appl. No. 10/976,451, Amendment filed May 5, 2010, 7 pgs.
U.S. Appl. No. 10/976,451, Amendment filed Jun. 13, 2011, 7 pgs.
U.S. Appl. No. 10/976,451, Amendment filed Jul. 17, 2008, 5 pgs.
U.S. Appl. No. 10/976,451, Amendment filed Aug. 26, 2009, 7 pgs.
U.S. Appl. No. 10/976,451, Final Office Action mailed Apr. 6, 2011, 10 pgs.
U.S. Appl. No. 10/976,451, Non-Final Office Action mailed Jul. 23, 2012, 9 pgs.
U.S. Appl. No. 10/976,451, Notice of Allowance mailed May 22, 2013, 2 pgs.
U.S. Appl. No. 10/976,451, Notice of Allowance mailed Jun. 18, 2013, 2 pgs.
U.S. Appl. No. 10/976,451, Office Action mailed Nov. 17, 2008, 10 pgs.
U.S. Appl. No. 10/976,451, Office Action mailed Mar. 20, 2008, 10 pgs.
U.S. Appl. No. 10/977,198, Amendment filed Oct. 31, 2007, 10 pgs.
U.S. Appl. No. 10/977,198, Amendment filed Nov. 21, 2008, 18 pgs.
U.S. Appl. No. 10/977,198, Amendment filed May 30, 2008, 13 pgs.
U.S. Appl. No. 10/977,198, Amendment filed Jun. 2, 2009, 14 pgs.
U.S. Appl. No. 10/977,198, Amendment filed Aug. 9, 2007, 11 pgs.
U.S. Appl. No. 10/988,718, Amendment filed Oct. 14, 2008, 12 pgs.
U.S. Appl. No. 10/988,718, Amendment filed Nov. 26, 2007, 10 pgs.
U.S. Appl. No. 10/988,718, Amendment filed Mar. 13, 2009, 11 pgs.
U.S. Appl. No. 10/988,718, Amendment filed Apr. 14, 2009, 6 pgs.
U.S. Appl. No. 10/988,718, Amendment filed Apr. 25, 2007, 11 pgs.
U.S. Appl. No. 10/988,718, Amendment filed Apr. 30, 2008, 8 pgs.
U.S. Appl. No. 10/988,718, Notice of Allowance mailed Apr. 9, 2009, 13 pgs.
U.S. Appl. No. 10/988,732, Amendment filed Apr. 10, 2009, 20 pgs.
U.S. Appl. No. 10/988,732, Amendment filed Apr. 13, 2010, 15 pgs.
U.S. Appl. No. 10/988,732, Amendment filed Aug. 26, 2010, 31 pgs.
U.S. Appl. No. 10/988,732, Amendment filed Sep. 3, 2009, 18 pgs.
U.S. Appl. No. 10/988,732, Amendment filed Sep. 30, 2008, 18 pgs.
U.S. Appl. No. 10/988,732, Final Office Action mailed Nov. 12, 2010, 39 pgs.
U.S. Appl. No. 11/012,472, Amendment filed Jan. 4, 2010, 14 pgs.
U.S. Appl. No. 11/012,472, Amendment filed Jun. 3, 2010, 9 pgs.
U.S. Appl. No. 11/012,472, Amendment filed Sep. 30, 2010, 9 pgs.
U.S. Appl. No. 11/012,472, Notice of Allowance mailed Nov. 24, 2010, 6 pgs.
U.S. Appl. No. 11/036,910, Advisory Action mailed Sep. 10, 2009, 3 pgs.
U.S. Appl. No. 11/036,910, Amendment filed Oct. 1, 2009, 18 pgs.
U.S. Appl. No. 11/036,910, Amendment filed Feb. 1, 2010, 11 pgs.
U.S. Appl. No. 11/036,910, Amendment filed Mar. 2, 2009, 14 pgs.
U.S. Appl. No. 11/036,910, Amendment filed Jul. 22, 2010, 28 pgs.
U.S. Appl. No. 11/036,910, Amendment filed Aug. 24, 2009, 16 pgs.
U.S. Appl. No. 11/036,910, Amendment filed Sep. 14, 2010, 26 pgs.
U.S. Appl. No. 11/036,910, Notice of Allowance mailed Jan. 5, 2011, 2 pgs.
U.S. Appl. No. 11/036,910, Office Action mailed Oct. 2, 2008, 8 pgs.
U.S. Appl. No. 12/028,651, Amendment and Response filed May 3, 2011, 11 pgs.
U.S. Appl. No. 12/028,651, Amendment and Response filed Jun. 1, 2012, 3 pgs.
U.S. Appl. No. 12/028,651, Amendment and Response filed Sep. 26, 2011, 8 pgs.
U.S. Appl. No. 12/028,651, Notice of Allowance mailed Jan. 3, 2013, 7 pgs.
U.S. Appl. No. 12/028,651, Notice of Allowance mailed Oct. 7, 2011, 10 pgs.
U.S. Appl. No. 12/028,651, Notice of Allowance mailed Nov. 8, 2013, 9 pgs.
U.S. Appl. No. 12/028,651, Notice of Allowance mailed Feb. 20, 2014, 8 pgs.
U.S. Appl. No. 12/028,651, Notice of Allowance mailed Mar. 6, 2012, 8 pgs.
U.S. Appl. No. 12/028,651, Notice of Allowance mailed Apr. 19, 2013, 8 pgs.
U.S. Appl. No. 12/028,651, Notice of Allowance mailed Jul. 24, 2014, 7 pgs.
U.S. Appl. No. 12/028,651, Notice of Allowance mailed Aug. 27, 2013, 8 pgs.
U.S. Appl. No. 12/028,651, Notice of Allowance mailed Aug. 8, 2012, 7 pgs.
U.S. Appl. No. 12/028,651, Office Action mailed Jan. 3, 2011, 17 pgs.
U.S. Appl. No. 12/028,651, Office Action mailed Jul. 26, 2011, 9 pgs.
U.S. Appl. No. 13/915,364, Amendment and Response filed Dec. 17, 2013, 10 pgs.
U.S. Appl. No. 13/915,364, Amendment and Response filed Mar. 27, 2014, 12 pgs.
U.S. Appl. No. 13/915,364, Office Action mailed Jan. 28, 2014, 21 pgs.
U.S. Appl. No. 13/915,364, Office Action mailed Sep. 17, 2013, 20 pgs.
U.S. Appl. No. 60/203,081, filed May 9, 2000.
Usdin, Tommie et al., "XML: Not a Silver Bullet, But a Great Pipe Wrench", Standard View vol. 6, No. 3, (Sep. 1998), pp. 125-132.
Van Hoff, Arthur et al., "The Open Software Description Format", Retrieved from www.w3.org/TR/NOTE-OSD on Nov. 7, 2003 (Aug. 13, 1997), 11 pages.

(56) References Cited

OTHER PUBLICATIONS

Varlamis, Iraklis et al., "Bridging XML-Schema and relational database. A System for generating and manipulating relational databases using valid XML documents", DocEng 01, ACM 1-58113-432-0/01/0011, (Nov. 9-10, 2001), pp. 105-114.

Vasters, Clemens F., "BizTalk Server 2000 A Beginner's Guide", Osborne/McGraw-Hill,(2001), 1-2, 359-402.

Verisign Inc., "Licensing VeriSign Certificates: Securing Multiple Web Server and Domain Configurations", White Paper, Available at <vvvvw.msctrustgate.com/pdf/licensing.pdf>, (Nov. 2, 2001), 15 pages.

Villard, et al., "An Incremental XSL T Transformation Processor for XML Document Manipulation", httQ://www2002.org/CDROM/refereed/321, Printed on May 18, 2007 ,(May 2002), 25 pages.

Watt, Andrew "Microsoft Office Infopath 2003 Kick Start", (Published by Sams) Print ISBN-10:0-672-32623-X (Mar. 24, 2004), 1-57.

Webopedia, "Definition of Network", Retrieved from: <http://www.webopedia.com/TERM/n/network.html>, 2 pages.

Webopedia, "Definition of OLE", Retrieved from: <http://www.webopedia.com/TERM/O/OLE.html>, 3 pages.

Webopedia, "Definition of OpenDoc", Retrieved from: <http://www.webopedia.com/TERM/O/OpenDoc.html>, 3 pages.

Whitehill Composer Software product, Retrieved from www.xml.com/[2ub/[2/221 on Apr. 8, 2004, Whitehill Technologies, Inc., 2 pages.

Williams, Sara et al., "The Component Object Model: A Technical Overview", Microsoft Corp, (Oct. 1994), pp. 1-14.

XForms 1.0, W3C, (Jul. 16, 2001), 179 pgs.

XML Forms Architecture (XFA), Retrieved from http://xml.coverpages.org/xfa.html on Aug. 17, 2006, Cover Pages Technology Reports, (Jun. 16, 2000), 4 pages.

XmlSpy, "XmlSpy 2004 Enterprise Edition Manual", Altova,(May 17, 2004),1-25,220-225.

Yasuji, Fukuhara "Clarisworks, Introduction to Business Document Construction, No. 4, Estimate", NIKKEI MAC, No. 14, (May 17, 1994), pp. 197-204.

Zaki, Mohammed J., et al., "Parallel Classification for Data Mining on Shared-Memory Multiprocessors", ACM, (Mar. 1999), pp. 1-8.

Zdonik, S., "Object Management System Concepts", ACM, (1984), pp. 13-19.

Zdonik, Stanley B., "Object Management System Concepts", Supporting Integrated Office Workstation Applications, Doctoral Thesis, Massachusetts Institute of Technology, (1983), 262 pages.

Final Office Action, U.S. Appl. No. 12/126,532, Feb. 2, 2015, 28 pages.

Non-Final Office Action, U.S. Appl. No. 12/722,414, Feb. 27, 2015, 23 pages.

Non-Final Office Action, U.S. Appl. No. 13/051,741, Mar. 12, 2015, 11 pages.

Non-Final Office Action, U.S. Appl. No. 13/159,239, Apr. 2, 2015, 9 pages.

Ellis, et al., "Buttons vs. Menus: An Exploratory Study of Pull-Down Menu Selection as Compared to Button Bars", Publisher: Department of Computer Science, University of Maryland, College Park, Jun. 1, 1995, 20 pages.

Kingston, "CorelDRAW 7: Getting Started with CorelDraw", Published by Sheffield Hallam University, Corporate Information Systems Pertinent pp. 3, 21, Aug. 1999, 5 pages.

U.S. Appl. No. 13/915,364, Office Action mailed Jul. 29, 2015, 29 pgs.

U.S. Appl. No. 13/915,364, Amendment and Response filed Aug. 14, 2015, 12 pgs.

U.S. Appl. No. 13/915,399, Office Action mailed Jun. 19, 2015, 14 pgs.

U.S. Appl. No. 13/915,399, Amendment and Response filed Jul. 24, 2015, 9 pgs.

Foreign Office Action, EP Application No. 01939034.3, Aug. 31, 2015, 5 pages.

Foreign Office Action, EP Application No. 06111546.5, Jul. 13, 2015, 6 pages.

Notice of Allowance, U.S. Appl. No. 13/051,741, filed Aug. 28, 2015, 13 pages.

Notice of Allowance, U.S. Appl. No. 13/159,239, filed Jul. 29, 2015, 7 pages.

Notice of Allowance, U.S. Appl. No. 13/867,334, filed Sep. 1, 2015, 7 pages.

Notice of Allowance, U.S. Appl. No. 14/530,237, filed Sep. 14, 2015, 5 pages.

\* cited by examiner

TRANSLATION FILE

RELATED APPLICATIONS

This application is a continuation of and claims priority to U.S. patent application Ser. No. 12/028,651, the disclosure which application was filed on Feb. 8, 2008, which was a continuation of U.S. patent application Ser. No. 10/632,297, which application was filed on Aug. 1, 2003.

BACKGROUND

FIG. 1 shows a typical apparatus 100 for processing documents containing structured data expressed using the Extensible Markup Language (XML). The apparatus 100 includes an Extensible Stylesheet Language (XSL) processor 102 that translates an XML document 104 into a transformed document 106. The transformed document 106 can comprise another XML document, or a document expressed in a presentation-oriented markup language, such as Hypertext Markup Language (HTML). XML provides tags that represent the subject matter contained in a document. In contrast, presentation-oriented languages, such as Hypertext Markup Language (HTML), provide tags that convey the visual appearance of a document. Accordingly, these technologies complement each other; XML allows information to be efficiently transferred and processed, while HTML allows information to be presented for display.

XSLT itself uses the syntax of XML. The XSLT processor 102 performs its translation function by making reference to one or more style sheets 108. The style sheets 108 contain a collection of rules for transforming elements in the input XML document 104 into the transformed document 106. To perform this function, XSLT relies heavily on XPath functionality. XPath is a general-purpose query notation for addressing and filtering the elements and text of XML documents. XPath expressions can address parts of an XML document, and can manipulate strings, numbers, and Booleans, etc. In the context of the XSLT processor 102, XPath expressions can be used to find a portion of the XML document 104 that matches a prescribed match pattern, and then perform some translation operation on that portion using a rule provided in the style sheets 108. XML, XSL, and XPath are described at length in their governing specifications provided by the World Wide Web Consortium (W3C).

The translation function provided by the XSLT processor 102 is strictly one-way. In other words, the XSLT processor 102 efficiently translates the structured data in the XML document 104 into the transformed document 106. But conventional XSLT does not also provide a mechanism for translating the transformed document 106 back into the XML document 104 from which it is derived. More specifically, it can generally be said that a collection of elements in the transformed document 106 are derived from or based on one or more elements in the XML document 104; however, there is generally no way of discovering this nexus once the XML document 104 has been translated into the transformed document 106. This situation is akin to the scenario in which a file containing source code expressed in human readable form is transformed into executable code using a compiler. It may be impossible to determine the source code simply by examining the resultant executable code. The one-way nature of the translation of the XML document 104 into the transformed document 106 is represented in FIG. 1 by the arrow 110.

The one-way nature of the translation 110 performed by the XSLT processor 102 introduces difficulties in applications that demand two-way interaction between the XML document 104 and the transformed document 106. For instance, an HTML document may include a collection of fields for receiving data entered by an editing user. If this HTML document is based on an underlying XML document, it would be desirable to provide a mechanism for routing the user's input back to the source XML document. As explained above, bare XSLT does not provide the intelligence to provide this functionality.

A such, there is an exemplary need in the art for a data processing application that provides mapping between structured data and a visual surface used to display the structured data.

SUMMARY

According to one exemplary implementation, a method is described for mapping between parts of an input document and associated parts of an output document. The input document pertains to a first kind of document (such as XML), and the output document pertains to a second kind of document (such as HTML). The method includes: (a) providing a translation file (such as XSLT) that converts documents of the first kind to documents of the second kind; (b) in a first phase, modifying the translation file to include mapping functionality that can provide information regarding relationships between parts of documents of the first kind and associated parts of documents of the second kind, the first phase producing a modified translation file; and (c) in a second phase, using the modified translation file to convert the input document into the output document. Step (c) can include: (c1) activating the mapping functionality; and (c2) using the mapping functionality to provide references in the output document that associate parts of the output document with parts of the input document.

Related apparatus and computer readable media are also described herein.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to the rendering and editing of information based on structured input data. To provide a concrete framework for discussion, this disclosure will specifically describe the transformation of hierarchically organized data expressed in a markup language into an electronic form that can be visually rendered and edited by an end user. Exemplary electronic forms can include a timesheet, work order, travel log, and so on. However, the concepts described herein also have application to other data processing applications besides electronic forms processing.

This disclosure is organized as follows. Section A of this disclosure describes an exemplary design strategy used to provide mapping between structured data and a visual surface. Section B describes an exemplary implementation of the design strategy discussed in Section A. Section C describes an exemplary method of operation of the implementation described in Section B. And Section D describes an exemplary computing environment that can be used to provide the implementation described in Section B.

A. Exemplary Design Strategy

Overview of Design Strategy

Figure 2:
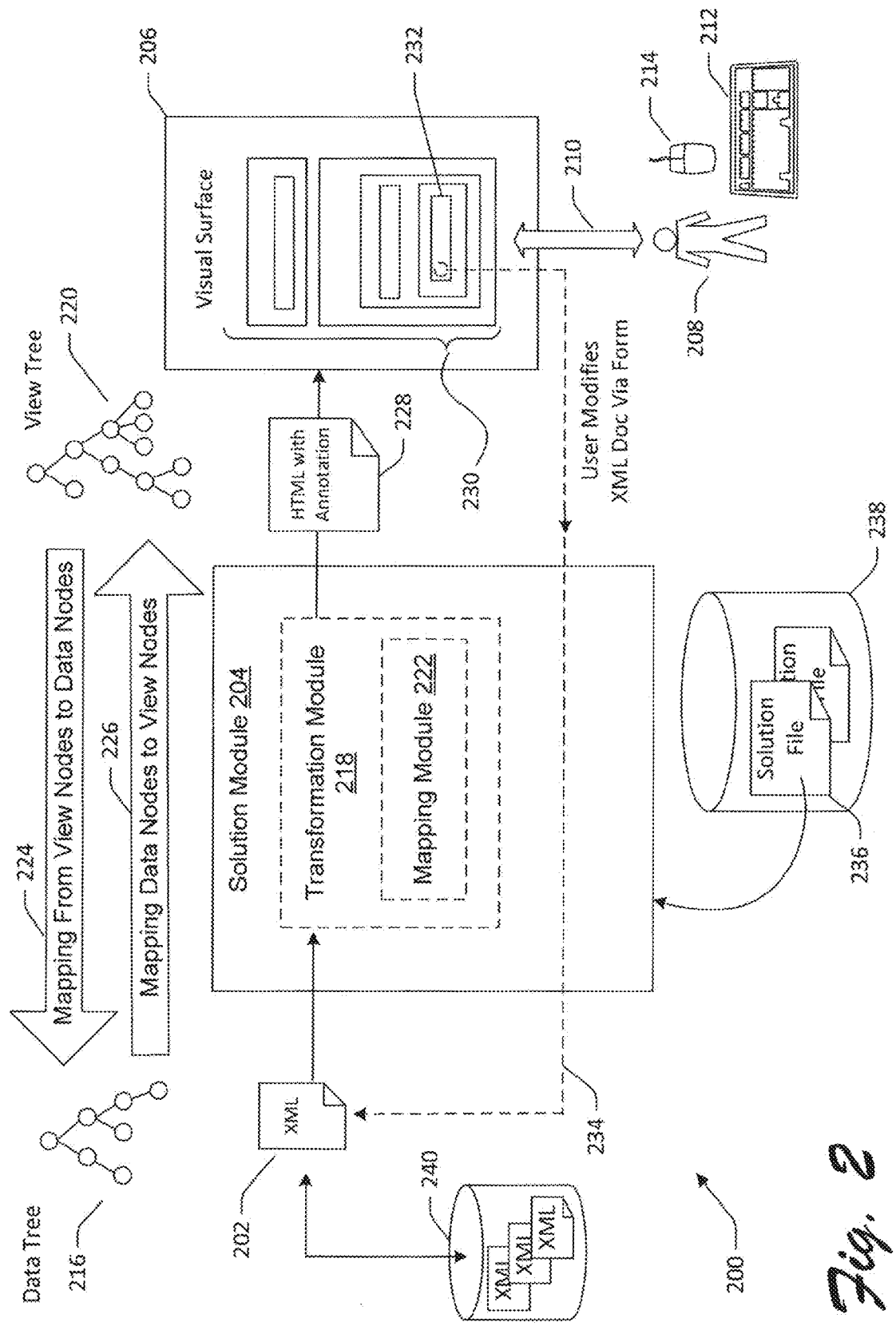
FIG. 2 shows an exemplary data processing application that includes mapping between structured data and a visual surface.

FIG. 2 shows an overview of a data processing application 200 for rendering structured documents. This data processing application 200 is exemplary. The mapping mechanism described herein can be implemented in many different kinds of systems and environments besides the data processing application 200 shown in FIG. 2.

By way of overview, the data processing application 200 processes structured data 202 expressed in a markup language, transforms this structured data 202 using a solution module 204 to produce transformed information, and presents a rendering of a visual surface 206 on an output device based on the transformed information. An editing user 208 interacts with the visual surface 206, as indicated by arrow 210, using, for instance keyboard 212, mouse device 214, or some other input device. The visual surface 206 can constitute the presentation of an electronic form having data entry fields associated with the structured data 202. In this case, the editing user 208's interaction 210 can involve the editing user 208 filling information into the data entry fields of the electronic form, such as by entering information into various text boxes, check boxes, etc.

Each of the above-described principal features—structured data 202, solution module 204, and visual surface 206—will be described in greater detail below.

To begin with, the structured data 202 can be represented in the Extensible Markup Language (XML). XML is a subset of the Standard Generalized Markup Language (SGML) that enables developers to create customized tags that describe the meaning of data, as opposed to the presentation of data. An XML document is composed of XML elements, each of which includes a start tag (such as <author>), an end to (such as </author>), and information between the two tags (which is referred to as the content of the elements). An element may include a name-value pair (referred to as an attribute) related by an equal sign that modifies certain features of the element (such as MONTH="May"). The elements in an XML document have a hierarchical relationship to each other that can be represented as a data tree 216. The elements in the data tree 216 are also commonly referred to as "nodes." A so-called XML schema (not illustrated in FIG. 2) provides a formal specification that defines the types of elements and the organization of elements that should appear in an XML document in order for that document to be considered so-called well formed.

The solution module 204 includes a transformation module 218. The purpose of the transformation module 218 is to transform the structured data 202 into the visual surface 206. The transformation module 218 can perform this task using so-called style sheets, such as style sheets provided by Extensible Stylesheet Language Transformation (XSLT). XSLT transforms the structured data 202 into a format appropriate for presentation, such as the Hypertext Markup language (HTML), Extensible Hypertext Markup Language (XHTML), Dynamic HTML (DFTML), etc. In other words, documents expressed in XML include tags that are particularly tailored to convey the meaning of the data in the documents. The XSLT conversion converts the XML documents into another markup language in which the tags pertain to the visual presentation of the information contained in the documents. (To facilitate discussion, the following description assumes the use of HTML to render the documents; however, other presentation-oriented markup languages can be used to render the documents.) Because HTML is a markup language, it can be conceptualized as a view tree 220 that includes a hierarchical organization of nodes, as in the case of data tree 216. The reader is referred to the World Wide Web Consortium's specifications for background information regarding XML and XSLT.

A mapping module 222 enables nodes in the view tree 220 to be mapped to corresponding nodes in the data tree 216. Further, the mapping module 222 enables nodes in the data tree 216 to be mapped to corresponding nodes in the view tree 220. The mapping of nodes in the view tree 220 to nodes in the data tree 216 allows the solution module 204 to correlate editing operations performed on the visual surface 206 with corresponding nodes in the underling structured data 202. This allows the solution module 204 to store information entered by the editing user 208 at appropriate locations within the structured data 202 during an editing session. FIG. 2 represents the above-described two-way mapping using arrows 224 and 226. More specifically, arrow 224 represents the mapping of information in the view tree 220 back to associated information in the data tree 216. Arrow 226 represents mapping of information in the data tree 216 to information in the view tree 220. The present discussion particularly addresses the mapping represented by arrow 224.

By way of broad overview, the mapping module 222 provides mapping between the visual surface 206 and the structured data 202 by adding annotations to the view tree 220 used to render the visual surface 206. These annotations serve as references which point back to specific locations in the data tree 216. FIG. 2 represents the annotation of the visual surface 206 by showing an annotated HTML document 228 being output from the solution module 204.

Figure 10:
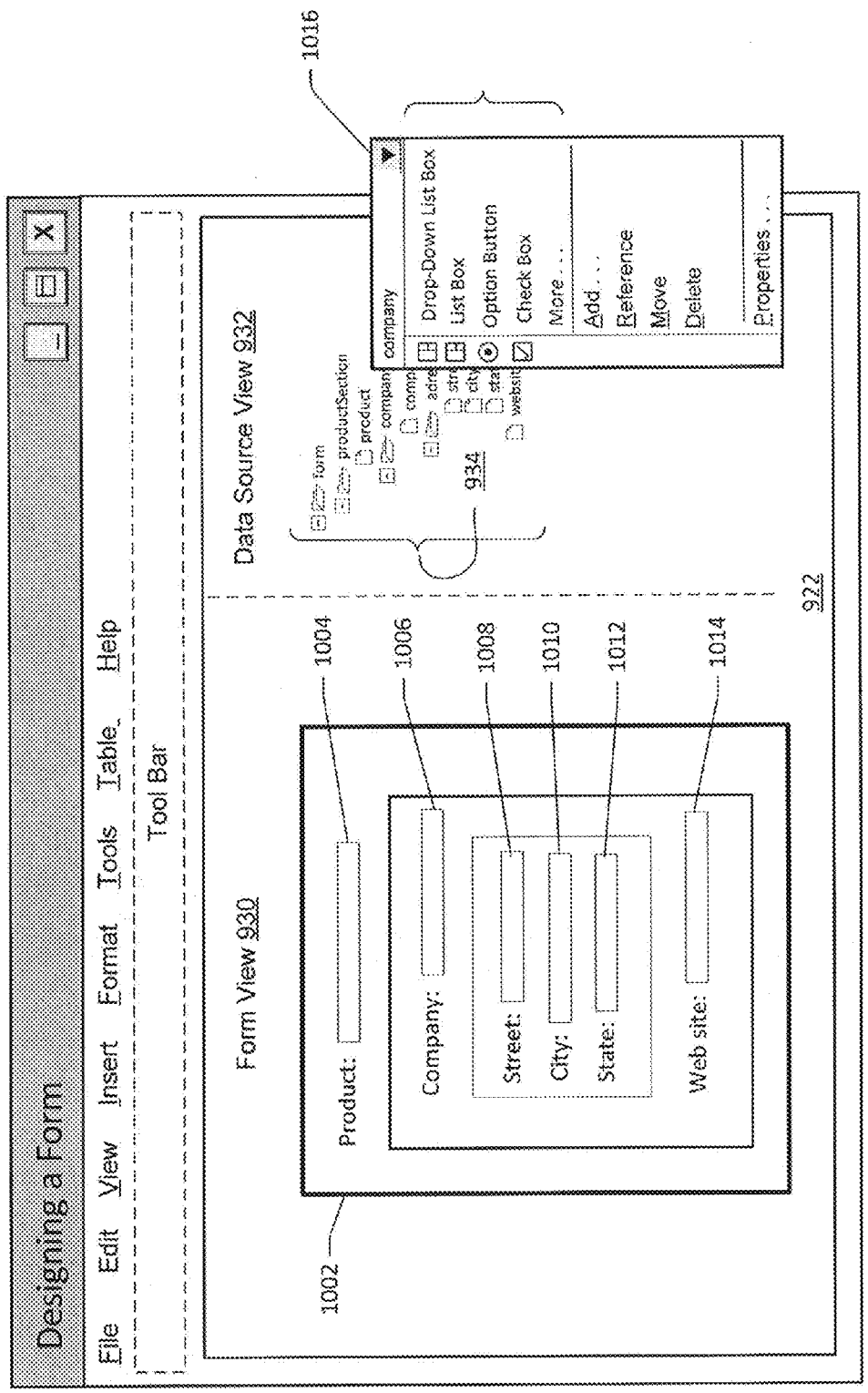
FIG. 10 shows an exemplary user interface (UI) for designing an electronic form.
Figure 11:
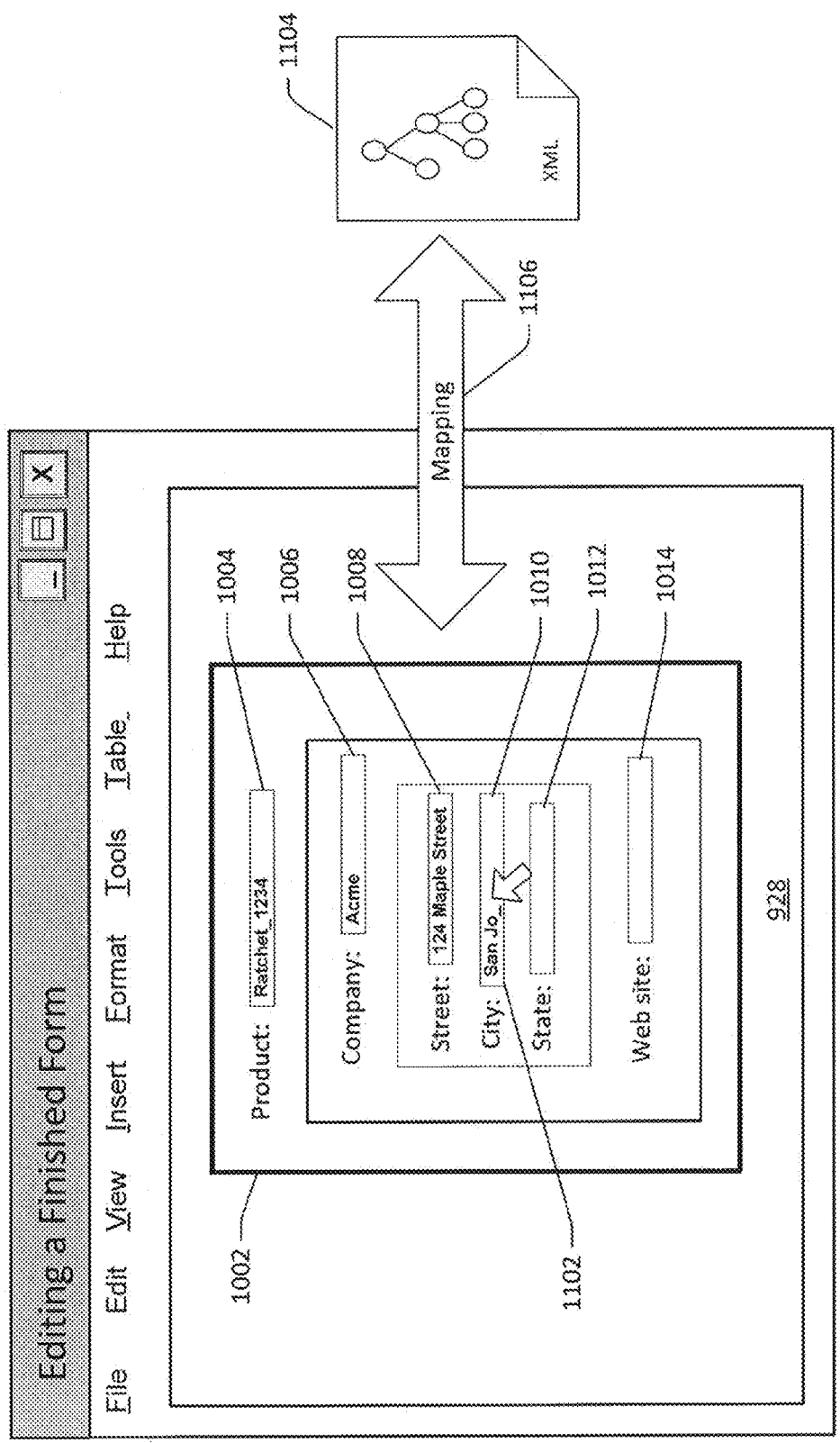
FIG. 11 shows an exemplary user interface (UI) for editing the electronic form created in the user interface of FIG. 10.

The visual surface 206 itself has an appearance that is determined by both the information contained in the structured data 202 as well as the effects of the XSLT transformation provided by the transformation functionality 218. Generally, in the case of electronic forms, the visual surface 206 typically includes a hierarchical structure which is related to the hierarchical structure in the structured data 202. For instance, an exemplary electronic form 230 includes multiple sections pertaining to different topics that reflect the topics in the structured data 202. (However, it is not necessary to have a one-to-one direct correspondence between the organization of the structured data 202 and the organization of the visual surface 206; in other words, the transformation of the structured data 202 to the visual surface 206 is generally considered non-isomorphic). Each section in the exemplary electronic form 230 can include one or more data entry fields for received input from the editing user 208, such as data entry field 232. The data entry fields are also referred to herein as "editing controls." Different graphical components can be used to implement the editing controls, including text boxes, drop-down list boxes, lists boxes, option buttons (also referred to as radio buttons), check boxes, and so on. FIGS. 10 and 11, to be described in turn, provide an example of the visual appearance of an electronic form as it is being designed and edited, respectively.

Path 234 generally represents the routing of information entered via the electronic form 230 back to the structured data 202. In another words, the data entry fields in the electronic form 230 (such as data entry field 232) are associated with respective nodes in the data tree 216. Entry of information via electronic form 230 will therefore prompt the solution module 204 to route such information to appropriate storage locations in the data tree 216. Again, the linking between the electronic form 230 and the structured data 202 is provided by the mapping module 222.

The functionality provided by the solution module 204 is defined, in part, by a solution file, such as exemplary solution file 236 stored in storage 238. The solution file 236 essentially constitutes an electronic form template, providing all of the semantic information required to transform the structured data 202 into the visual surface 206. Different XML documents may have been created by, or otherwise refer to, different electronic form templates. Accordingly, different XML documents may have different solution files associated therewith. Various techniques can be used to retrieve a solution file that is associated with a particular XML document. For instance, an appropriate solution file can be retrieved based on URN (Uniform Resource Name) or URL (Uniform Resource Locator) information contained in the header of an input XML document. That header information links the input document to a corresponding solution file. A storage 240 represents an archive for storing one or more XML documents created by, or otherwise associated with, respective solution files.

Figure 3:
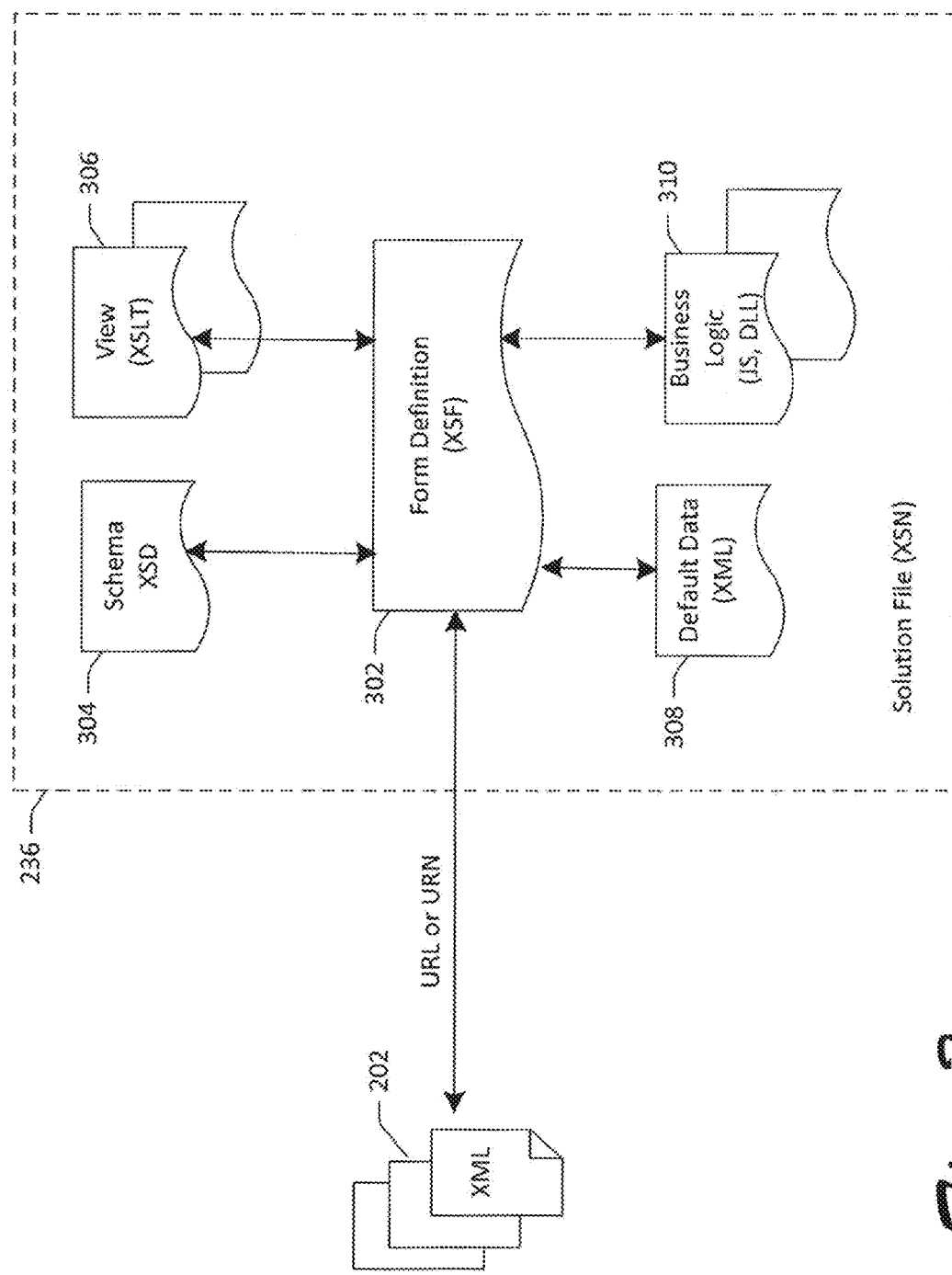
FIG. 3 shows an exemplary solution file used in conjunction with a solution module shown in FIG. 2.

FIG. 3 shows an exemplary composition of the solution file 236. As shown there, the solution file 236 contains a collection of files (302, 304, 306, 308, and 310) that together provide semantic information used, in part, to implement the solution module 204. This collection of files can be packaged together. In one exemplary implementation, this collection of files is referred to using an extension .xsn. A form definition file 302, also called a manifest file, forms the centerpiece of the collection. The form definition file 302 contains information about all of the other files in the solution module 204. This file 302 is assigned the exemplary extension .xsf. A schema file 304 is used to constrain and validate the structured data 202. This file is assigned the exemplary extension .xsd. View files 306 provide presentation logic files that are used to present, view, and transform the structured data 202. These files therefore implement the transformation module 218 discussed in connection with FIG. 2. The view files 306 can include multiple files corresponding to multiple possible views (i.e., visual surfaces 206) that the editing user 208 can select from. The view files 306 are assigned the exemplary extension .xsl. A default data file 308 contains default data that can be displayed in a view for fields that have not been explicitly defined by the editing user 208. This file 308 is assigned the exemplary extension .xml. Finally, business logic files 310 provide programming code used to implement specific editing behavior, data validation, event handlers, control of data flow, and other features. Such programs can be written in any kind of language, such as the scripting language provided by JScript® or VBSCRIPT scripting language. In this case, these files are assigned the exemplary extensions .js or .vb (for JScript® and VBSCRIPT scripting languages, respectively).

The Mapping Module

Figure 4:
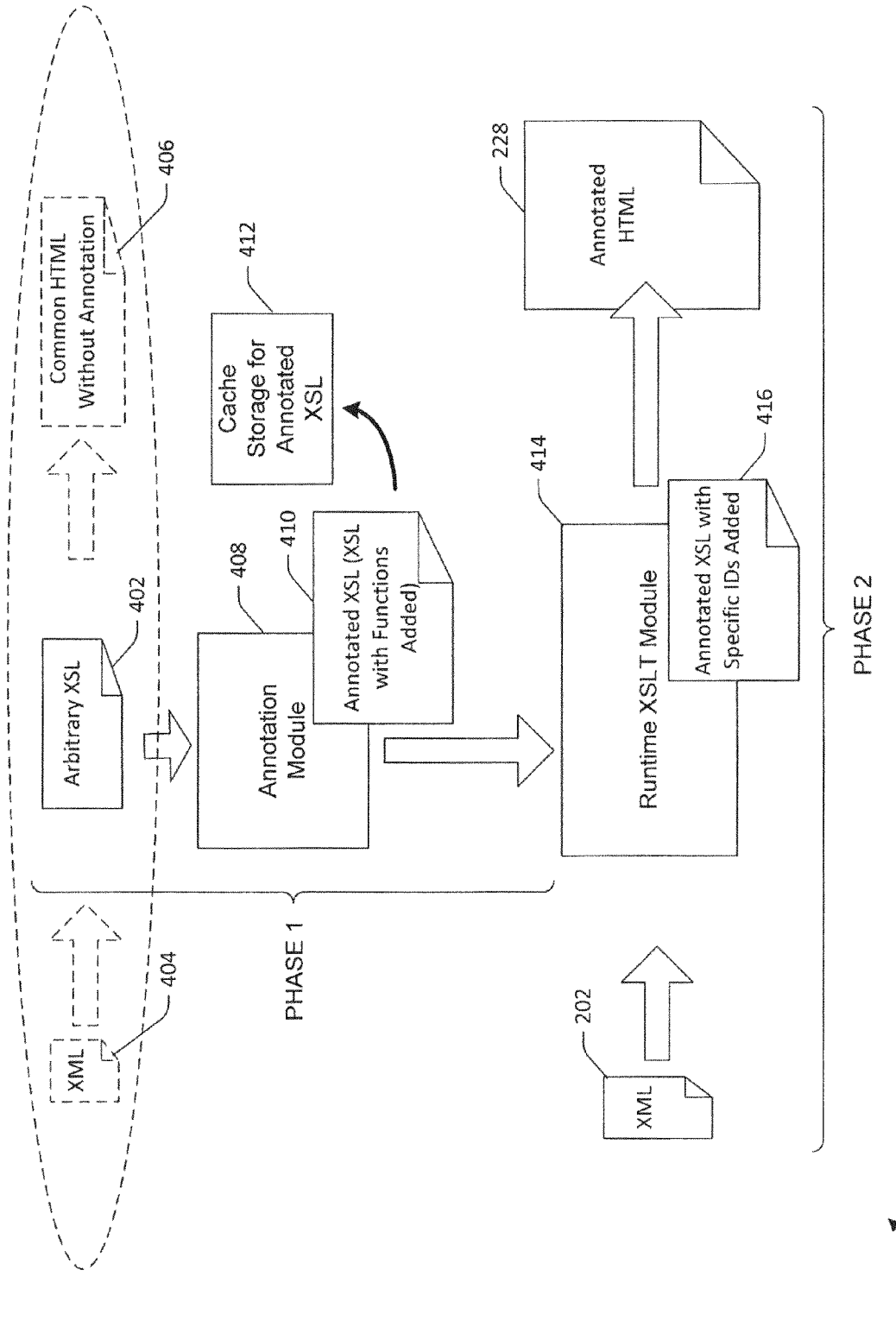
FIG. 4 shows an exemplary mapping module used hi the data processing application of FIG. 2.

FIG. 4 shows an exemplary composition of the mapping module 222 introduced in FIG. 2. The mapping module 222 receives the structured data 202 and adds annotations to it to produce the annotated HTML document 228 (or other kind of annotated transformed document). The mapping module 222 performs this task in two phases: phase 1 and phase 2. In phase 1, the mapping module 222 takes arbitrary XSLT information for other kind of transformation instructions) and adds mapping functions to it. These mapping functions are inserted at particular locations within the XSLT information. These mapping functions provide functionality that, when activated, generate references to specific locations within the structured data 202. However, in the first phase itself, the mapping module 222 simply inserts these mapping functions within the XSLT information; that is in this phase, the mapping module 222 does not execute the functions to return the actual references that point to appropriate parts of the structured data 202. In the second phase, the mapping module 222 executes the mapping functions to provide actual values for the references.

The first phase is performed on the XSLT information itself, outside the context of the processing of any specific XML document. More specifically the first phase can be performed once, for instance, after an electronic form has been newly created or modified. This has the effect of modifying the XSLT information associated with the newly created or modified electronic form by adding mapping functions to it. The second phase, by contrast, is performed each time a particular XML document is rendered. In the second phase, the mapping functions within the XSLT information are executed with respect to a particular XML document, to thereby produce an output HTML document (or other kind of output document) that has references inserted throughout it that point back to various locations in the particular XML document. Thus, to summarize, the first phase is performed once upon the creation or modification of the XSLT information, whereas the second phase is performed each time a particular XML document is rendered. The second phase can also be referred to as the "runtime" phase, as it is performed when a particular XML document is rendered. Additional aspects of the above-described functionality will be described with reference to the logic illustrated in FIG. 4.

To begin with the first phase acts on so-called arbitrary XSLT information 402. The XSLT information 402 is arbitrary in the sense that it is not prepared specifically with the annotation mechanism described above in mind; in other words, the XSLT information 402 can constitute any kind of XSLT information produced by any process in any environment. The arbitrary XSLT information 402 can serve a conventional role of converting an XML document 404 into an HTML document 406 (or other kind of the document). The resultant HTML document 406 would not contain any pointer annotations, and hence would not have the capability of napping a resultant visual surface back to the originating XML document 404.

Phase 1 of the mapping module 222 takes this arbitrary XSLT information 402 and adds mapping functions to it. An annotation module 408 performs this role. The output of the annotation module 40 represents annotated XSLT information 410 having the mapping functions added thereto. The annotated XSLT information 410 can be stored in a storage (for example, a cache storage 412) for later use in phase 2 (the runtime portion of the procedure).

In one implementation, the mapping functions added by the annotation module 408 can be implemented as so-called XSLT extension functions. More specifically, XSLT provides a collection of tools to accomplish certain tasks. However, the range of functions that can be performed with unsupplemented XSLT is limited; XSLT cannot perform some tasks very well, and cannot perform other tasks at all. Extension functions constitute references within the XSLT information that act as triggers to call some extended functionality to execute tasks not provided within XSLT itself. In the instant case, the extension functions perform the task of adding references to the XSLT information that point back to respective locations in the structured data 202. To repeat, however, these mapping functions are not executed in phase 1; rather, in phase 1, they are merely inserted in the XSLT information 402 at appropriate locations.

Different strategies can be used to govern where to insert the mapping functions within the XSLT information 402. These strategies may differ from one processing environment to the next, because different processing environments may involve the processing of different types of documents having different characteristics. In the present case, an electronic form often has a nested structure. For instance, a section of the electronic to in may contain a subsection, and that subsection may have its own respective subsection(s). Any of these sections and subsections can have data entry fields included therein. For example, an electronic form can include a table that defines a primary section. That table, in turn, can include plural subsections (e.g., rows), and each row can contain plural data entry fields. In this context, a so-called outer mapping can be used to identify a certain section or subsection in the electronic form. A so-called inner mapping can be used to specifically identify a data entry field within that section or subsection. The inner mappings thus provide the specific bindings between the data entry fields in the electronic form and the respective nodes of the structured data 202 associated with the data entry fields. The outer mappings provide information regarding the scope (e.g., extent) of a section or subsection that may include one or more inner mapping data entry points. In the context of the above example pertaining to the rendering of a table in the electronic form, outer mappings can be used to demarcate the table itself, as well as individual rows within the table. Inner mappings can be used to identify data entry fields within the table.

Still more specifically, the annotation module 408 can add outer mappings in the XSLT information 402 at locations representative of context changes. There are two ways to change context in XSLT: (1) using an "apply-templates" instruction; and (2) using a "for-each" instruction. The "apply-template" instruction causes the output flow of the XSLT processing to move to a new template, which is evaluated in the new context. To mark these context changes, the annotation module 408 annotates all direct children of template nodes with mapping function calls requesting the respective IDs of the current context. For the "for-each" instruction, the annotation module 408 causes the output flow to move to the child of the "for-each" node. In this case, the annotation module 408 annotates all direct children of the "for-each" nodes with mapping function calls to the respective IDs of the current context. Generally, as is well known, the "apply-template" instruction applies a template rule deemed most suitable for processing a current node and its children. The "for each" instruction performs specified actions for a collection of nodes that satisfy a selection expression.

The annotation module 408 can add inner mappings in those cases where XSLT pulls the contents of XML nodes of the data tree 216 directly into the view tree 220. This content can be mapped directly from the view tree 220 back to the XML nodes in the data tree 216 from which they were pulled. More specifically, XSLT pulls out content using the value of and "copy-of" instructions used in XSLT. The annotation module 408 marks these content grabs by adding mapping function calls requesting the IDs of the respective XML nodes in the data tree 216 being referenced. Annotations are not generated if the mapping is ambiguous. This could happen if the "value-of" instruction refers to more than one XML node in the data tree 216. Generally, as is well known, the "copy-of" instruction of XSLT copies all aspects (attributes, tags, children, etc.) of identified nodes into a result tree. The "value-of" instruction in XSLT converts the identified nodes to a string and adds this string to the result tree.

The annotation module 408 automatically adds the outer and inner mappings based on the above-described guidelines (that is, by adding mapping functions where the above-described XSLT instructions occur). This automatic annotation may not be sufficient for all situations. To address these cases, XSLT authors can "manually" modify the XSLT to include mapping functions at locations selected by the XSLT authors.

Phase 2 of the mapping procedure involves executing the mapping functions added in phase 1 to return specific references to nodes in the data tree 216. A runtime XSLT module 414 performs this function to yield instantiated annotated XSLT information 416 having specific references added thereto. The ultimate output of the runtime XSLT module 414 is the annotated HTML document 228 (or a document expressed in some other structured format). More specifically, the extension functions added in phase 1 provide XPath references to namespaced functions. When the XSLT information 402 is processed at runtime, the runtime XSLT module 414 reads the name paced functions and calls then passing a node list as a parameter. The runtime XSLT module 414 analyzes this node list, ensures that it is unambiguous (e.g., that it contains only one node), and returns identifiers for these nodes. The runtime XSLT module 414 writes these identifiers to a result tree, thus building the HTML document 228 having mapping references added thereto.

Figure 5:
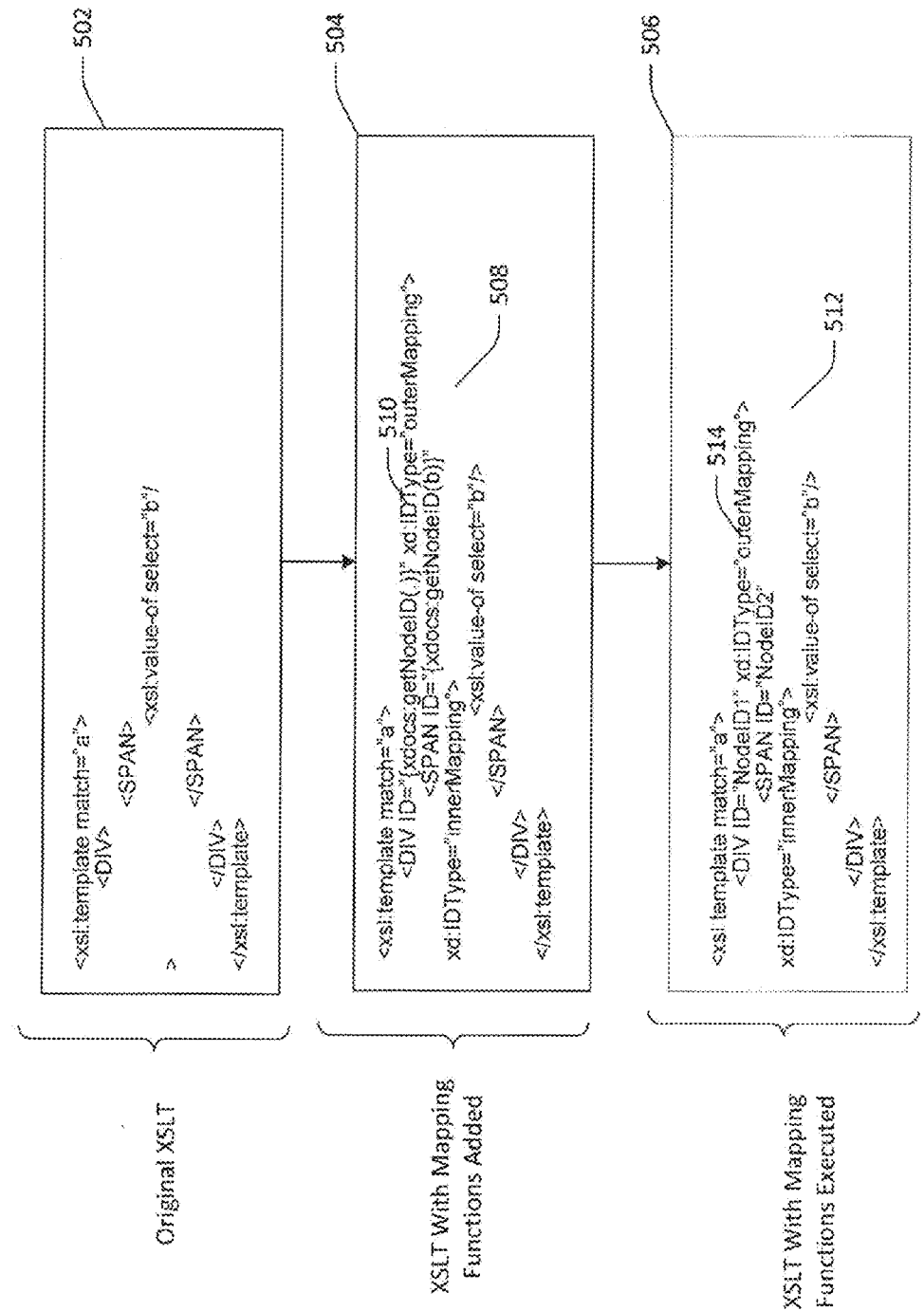
FIG. 5 shows an example of the annotation of an XSLT excerpt with mapping functions, and the subsequent execution of those mapping functions.

FIG. 5 provides an example of the operation of the mapping module 222 shown in FIG. 4. Excerpt 502 represents an original excerpt of XSLT information, corresponding to the arbitrary XSLT information 402 shown in FIG. 4. Excerpt 504 represents the original XSLT information 402 with mapping functions added thereto, thus forming the annotated XSLT information 410 shown in FIG. 4. And excerpt 506 represents the XSLT information 402 having the mapping functions executed at runtime, thus forming the instantiated annotated XSLT 416 shown in FIG. 4. Functions 508 and 510 represent inner and output mapping functions, respectively, added to the XSLT information 402 in phase 1. Annotations 512 and 514 represent inner and output mapping references, respectively, added to the XSLT information 402 in phase 2 in response to the execution of the mapping functions in excerpt 504.

Figure 6:
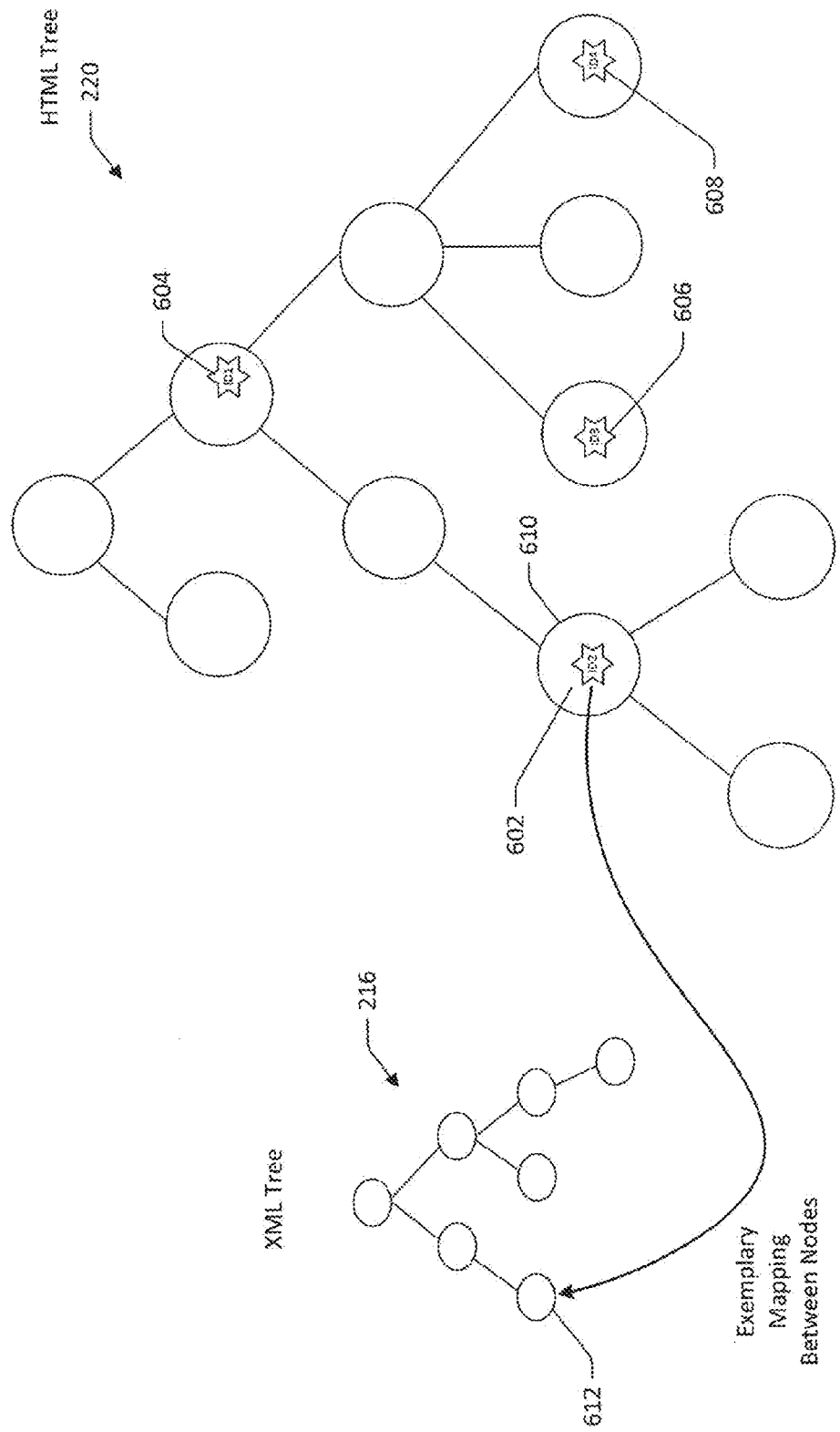
FIG. 6 illustrates an exemplars mapping between nodes of a visual surface and nodes of associated structured data.

FIG. 6 shows a high-level exemplary depiction of the mapping between the nodes of the view tree 220 and the nodes of the data tree 216. For instance, the view tree 220 contains exemplary ID references 602, 604, 606, and 608 added to respective nodes. For instance, exemplary ID reference 602 is associated with node 610. This ID reference 602 points back to a node 612 in the data tree 216. In other words, this reference 602 indicates that the node 612 in the data tree 216 contributed to the formation of node 610 in the view tree 220 through the transformative effects of the XSLT applied to the data tree 216. Node 610 in the view tree 220 may be associated with a data entry field in an electronic form. If this is the case, then knowledge of the linking between node 610 in the view tree 220 and node 612 in the data tree 216 allows the solution module 204 to route data entered into the electronic form via this data entry field to an appropriate location in the structured input data 202 for storage thereat.

Figure 7:
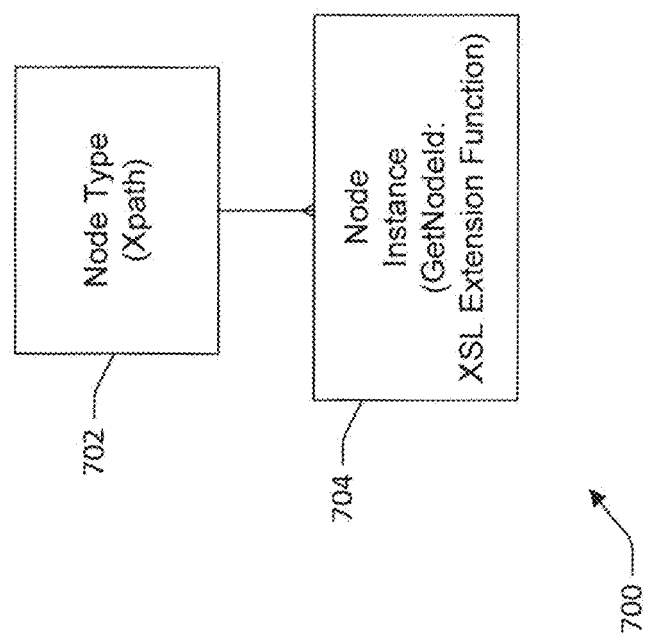
FIG. 7 shows an entity relationship diagram that illustrates phases 1 and 2 of an annotation procedure used in the mapping module of FIG. 4.

FIG. 7 shows an entity relationship diagram 700 that illustrates the conceptual relationship between the generic mapping provided by phase and the instantiated mapping provided by phase 2. (In this diagram, the "crow's feet" connector notation represents a one-to-many and many-to-one type of relationship between entities, as per convention.) That is, entity 702 represents the mapping functions added to the XSLT information in phase 1 of the mapping procedure. The mapping functions in this phase provide general rules for applying mapping functions to specified types of XML nodes in a general group of possible XML documents. However, within this group, individual XML documents can vary in different ways. Hence, conceptually, the mapping functions provided in phase 1 apply to any XML document on a relatively general or abstract level. Entity 704, on the other hand, represents the application of the annotated XSLT to a specific XML document. This happens in phase 2 of the mapping procedure. In phase 2, the mapping functions are executed to return specific pointers in the context of the processing of a specific XML document, to ultimately generate an annotated HTML document. Accordingly, entity 704 represents a particular instance of the general range of possibilities represented by entity 702.

Structural Editing Using Mapping

Figure 8:
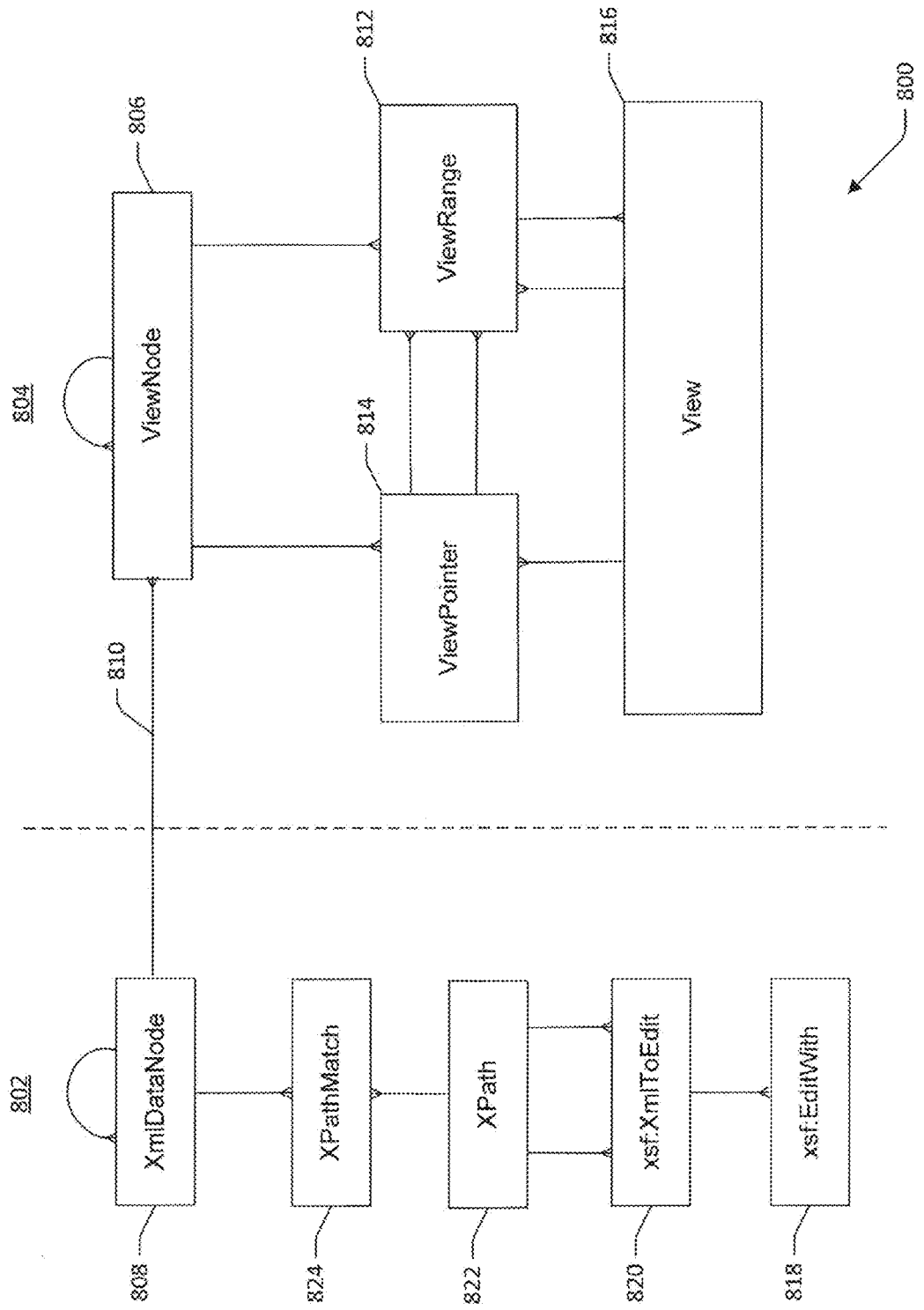
FIG. 8 shows an entity relationship diagram that illustrates coupling between structured data and an associated visual surface, and the use of that coupling to enable editing operations.

FIG. 8 shows an entity relationship diagram 800 that illustrates the coupling between the data and visual aspects of the data processing application 200. This diagram also illustrates structural editing functionality used to edit the structured data 202. That is, the structural editing provides a mechanism that allows input received through the visual presentation of the electronic form to produce corresponding changes in the structured data 202. The structural editing therefore employs the above-described mapping functionality as an integral part thereof.

To begin with, the left-hand side of the entity relationship diagram 800 of FIG. 8 pertains to data handling aspects of the data processing application 200, and is referred to herein simply as data-side 802. The right-hand side 804 pertains to view handling aspects of the data processing application 200 associated with the visual surface 206, and is referred to herein simply as view-side 804. By way of overview, the view-side 804 shows functionality for selecting a particular part of the visual surface 206. In the context of an electronic forms application, this may represent the selection of a particular field in the electronic form by the editing user 208. Changes to the selected field of the electronic form may prompt the data processing application 200 to make corresponding changes in the structured data 202 which is mapped to the selected field. The data-side 802 shows functionality for identifying the particular nodes in the structured data 202 (e.g., XML data) that are mapped to the selected field. In summary, the view-side 804 selects a part of the visual surface 206 (e.g., expressed in HTML) and the data-side 802 finds the XML nodes corresponding to the selected part of the visual surface 206.

More specifically, ViewNode entity 806 represents a node in the visual surface 206 (e.g., a node in the view tree 220), and XmlDataNode entity 808 represents a node in the structured data 202 (e.g., a node in the data tree 216). The loop at the top of ViewNode entity 806 represents that a collection of nodes in the view-side 804 forms a hierarchical tree (e.g., the view tree 220). The loop at the top of the XmlDataNode 808 entity likewise means that a collection nodes in the data-side 802 forms another hierarchical tree (e.g., the data tree 216). A horizontal line 810 that couples the ViewNode entity 806 to the XmlDataNode entity 808 indicates that the view tree 220 is mapped to the data tree 216. This same concept is conveyed by arrows 224 and 226 shown in FIG. 2.

The functionality for selecting a part of the visual surface 206 includes ViewRange entity 812 and ViewPointer entity 814. The ViewRange entity 812 refers to a tool used to select and identify content in the visual surface 206 to be edited. The ViewPointer entity 814 defines endpoints in a range associated with the ViewRange entity 812. A View entity 816 conceptually represents an aggregation of all aspects of the view-side 804; that is, the View entity 816 defines the visual surface 306 as an aggregation of all of the entities shown in the view-side 804.

The entities in the data-side 802 identify the XML nodes that are mapped to the part of the visual surface 206 selected by the ViewRange entity 812 and the ViewPointer entity 814. Generally, the XML editing mechanism operates by: (1) determining a part of the view-side 804 selected by the editing user 208 (defining a "selected part"); (2) determining an associated part of the structured data 202 in the data-side 802 that is linked to the selected part in the view-side 804 (defining an "associated part"); (3) determining whether any editing rules apply to the associated part in the data-side 802 by matching pattern information in the associated part to rules contained in the forms definition file 302 of FIG. 3; and (4) if there are rules that pertain to the associated part, applying those rules to the editing operation involving the selected part of the view-side 804. Generally, the rules can specify the behavior of the editing operation, such as what parts of the view 816 and associated structured data are selectable, editable, etc. The rules can also specify whether certain behavioral features apply to the editing operation, such as proofing, spelling correction, auto-completion, data validation, and so on. Since the behavior of the view-side 804 is determined by performing matching of patterns within the structured data 202, this technique of editing can be viewed as "data-side matching."

A more detailed explanation of the above-described data-side matching is provided as follows. By way of introduction, an electronic form presented in the view-side 804 includes a collection of "editing controls," or simply "controls." These editing controls allow the editing user 208 to enter information into the electronic form using different techniques depending on the nature of the editing controls. Exemplary editing controls include text boxes, rich text boxes, etc. So-called "editing components" represent functionality associated with respective editing controls. The editing components specify how the structured data 202 can be edited in response to the editing user 208's manipulation of the editing controls. In one exemplary implementation, the creation of an editing control also prompts the creation of a corresponding editing component that specifies how this editing control interacts with the structured data. For example, an xcollection editing component is associated with repeating section and repeating table editing controls, an XOptional editing component is associated with an optional section editing control, an xTextList editing component is associated with a plain list, bulleted list of numbered list editing controls, an xField editing component is associated with a rich text box and text box editing controls, and an xImage editing component is associated with a picture editing control.

An xsf:EditWith entity 818 specifies the behavior of an editing control as determined by its editing component. More specifically, this entity 818 specifies that the editing control uses a given editing component and it provides the corresponding parameters to the editing component to determine its exact behavior. An xsf:XmlToEdit entity 820 defines the location of the editing control within the view-side 804, as determined by XML mapping. In brief, the xsf:EditWith entity 818 defines "what to do," and the "xsf:XmlToEdit" entity 820 defines "where to do it."

Consider, for example, the following XML document.

```
<root>
    <issues>
        <issue author = "Pete">
            <title> HTML versa XML tables </title>
            </description>
                <textItem>some text goes here</textItem>
                <textItem>more text goes here</textItem>
            </description>
            <workItems>
                <workItem description = "create visuals"
                    effort = "2"/>
                <workItem description = "create visuals"
                    effort = "2"/>
            </workItems>
            <notes>type here</notes>
        </issue>
    </issues>
</root>
```

The following exemplary editing functionality provided in the forms definition file 302 employs the xTextList editing component to edit "textItem" XML nodes associated with the above-identified XML document.

```
<xsf:xmlToEdit item = "description/textItem">
    <xsf:editWith component = "xTextList" type = "formatted"/>
<xsf:xmlToEdit>
```

The following exemplary editing functionality provided in the forms definition file 402 employs the xCollection editing component to edit "workItem" XML nodes associated with the above-identified XML document.

```
<xsf:xmlToEdit anme = "workItem" Item = "workItems/workItem"
    container = "workItems">
    <xsf:editWith component = "xCollection">
        <xsf:fragmentToInsert>
            <xsf:chooseFragment>
                <workItem description = "create visuals"
                    effort = "2"></workItem>
            </xsf:chooseFragment>
```

-continued

```
            <x/sf:fragmentToInsert>
        </xsf:editWith>
    <xsf:/xmlToEdit>
```

As noted in the above examples, the editing component xCollection has attributes "container" and "item" associated therewith, whereas the editing component xTextList has only attribute "item" associated therewith. The two lines emanating from the top of the xsf:XmlToEdit entity 820 represents the item and collection attributes. The container attribute corresponds to an XPath match pattern which determines the context in which the editing control will be selectable and its actions enabled. If the current context (e.g., view selection or insertion point in the view-side 804 is within some HTML element which maps back to an XML node which satisfies this container match pattern, then the editing control is enabled. More specifically, an exemplary procedure for finding the container XML node is as follows: (i) Start from the current selection within the visual surface 206; and (ii) Continue up the HTML ancestors, and seek an HTML node that maps to an XML node satisfying the container XPath match pattern. If found, a container HTML node and corresponding container XML node are there by provided. In one exemplary implementation, it does not suffice for the container XML node to exist. Actions are enabled only when the current selection in the view-side 804 is within an HTML element which maps to the container XML node. The item attribute is also an XPath match pattern. It specifies the XML nodes to be edited using editing components indicated in the contained <editWith> elements. The item attribute is used to identify an XML node in a manner similar to that stated above with respect to the container attribute.

The fragmentToInsert parameter in the above-identified example of the xCollection editing component specifics the XML fragment which is to be inserted into the source XML. This parameter is set using a fragmentToInsert element, which is a child of the editWith element. Further, the fragmentToInsert element contains one or more chooseFragment child elements, which specify a choice between different versions of the fragment. The fragment itself is specified inline, within the chooseFragment elements.

Finally, an XPath entity 822 and XPathMatch entity 824 represent the above-described use of XPath functionality and pattern matching to identify the XmlDataNode entity 808 associated with the part of the visual surface selected in the view-side 804.

B. Exemplary Apparatus for Implementing Mapping

Figure 1:
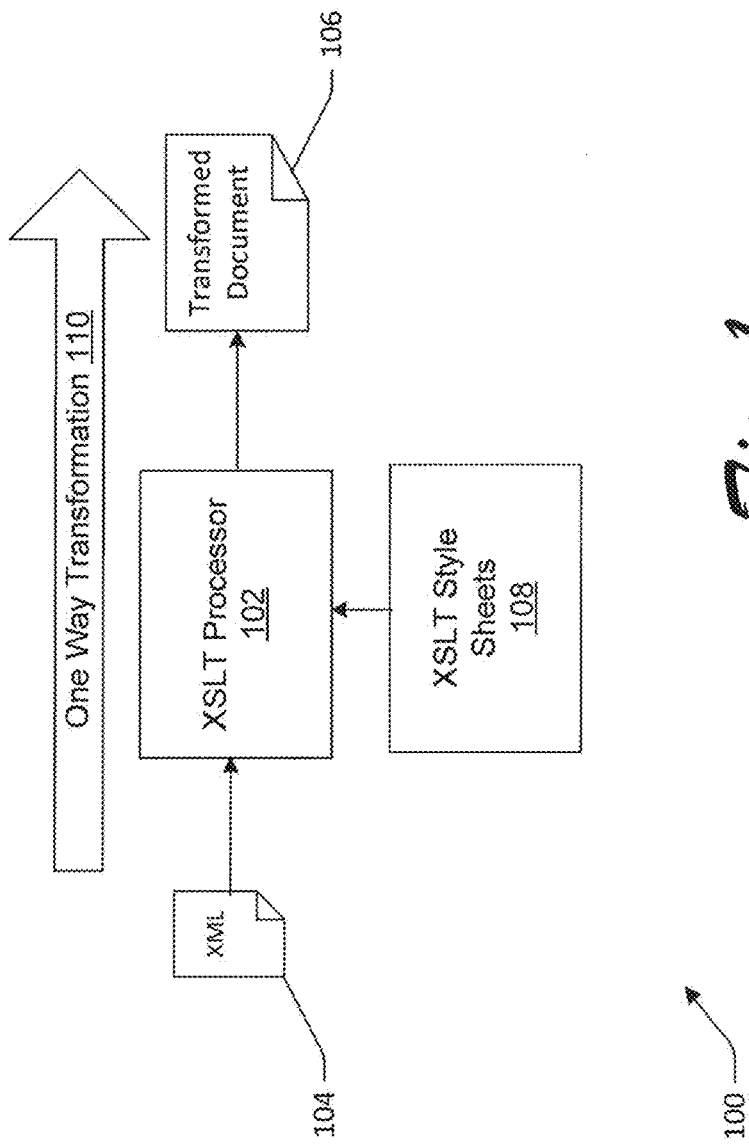
FIG. 1 shows a known technique for transforming an XML document into another document, such as an HTML document.
Figure 9:
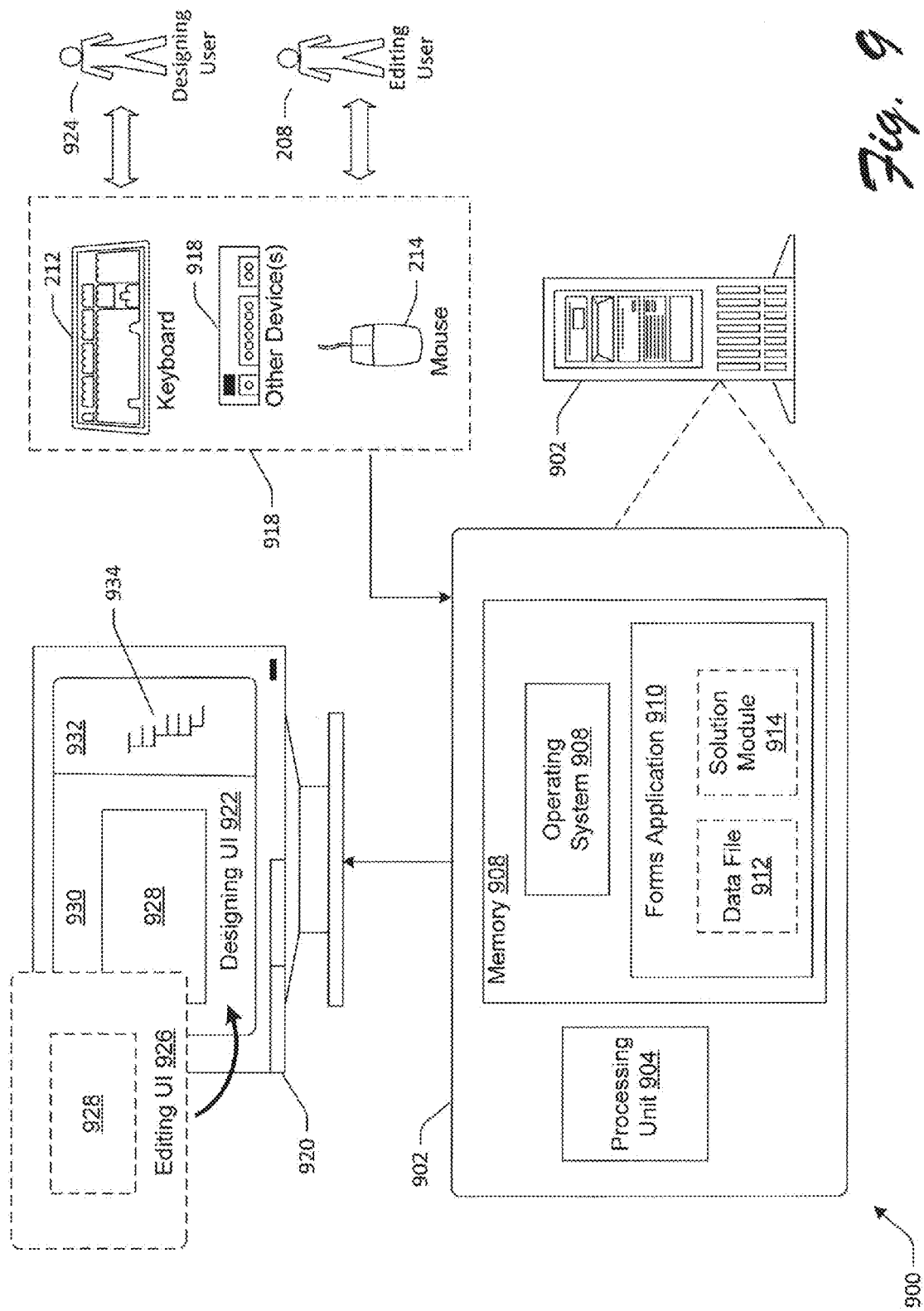
FIG. 9 shows an exemplary apparatus for implementing the data processing application shown in FIG. 2.

FIG. 9 shows an overview of an exemplary apparatus 900 for implementing the data processing application 200 shown in FIG. 1. The apparatus 900 includes a computer 902 that contains one or more processing units 904 and memory 906. Among other information, the memory 906 can store an operating system 908 and the above-described data processing application 200, identified in FIG. 9 as a forms application 910. The forms application 910 can include data files 912 for storing the structured XML data 202, and solution module 914. As noted above, a solution module 914 comprises logic that specifies the appearance and behavior of the visual surface 206 (as was described in connection with FIG. 2). The logic provided by solution module 914 is, in turn, determined by a solution file (such as a solution file 236 composed of the files shown in FIG. 5). The computer 902 is coupled to a collection of input devices 916, including the keyboard 212, mouse device 214, as well as other input devices 918. The computer 902 is also coupled to a display device 920.

In one exemplary implementation, the forms application 910 includes a design mode and an editing mode. The design mode presents design UI 922 on the display device. 920 for interaction with a designing user 924. The editing mode presents editing UI 926 on the display device 920 for interaction with the editing user 208. In the design mode, the forms application 910 creates an electronic form 928, or modifies the structure of the electronic form 928 in a way that affects its basic schema. In other words, the design operation produces the solution file 236 that furnishes the electronic form 928. In the editing mode, the editing user 208 uses the electronic form 928 for its intended purpose—that is, by entering information into the electronic form 928 for a business-related purpose or other purpose.

In the design mode, the forms application 910 can be configured to depict the electronic form 928 under development using a split-screen display technique. More specifically, a forms view portion 930 of the design UI 922 is devoted to a depiction of the normal appearance of the electronic form 928. A data source view portion 932 of the visual surface is devoted to displaying a hierarchical tree 934 that conveys the organization of data fields in the electronic form 928.

FIG. 10 shows an exemplary design UI 922 that illustrates the allocation of the visual surface 206 into the forms view portion 930 and the data source view portion 932. As described above, the forms view portion 930 contains a depiction of the normal appearance of the form 928—in this case, exemplary form 1002. The exemplary electronic form 1002 shown in FIG. 9 includes a plurality text box entry fields (e.g., fields 1004, 1006, 1008, 1010, 1012, and 1014. The data source view portion 932 includes the hierarchical tree 934 showing the nested layout of the text fields (1004-1014) presented in the form 1002.

The forms application 910 provides multiple techniques for creating the electronic form 1002. According to one technique, the electronic form 1002 can be created from scratch by building the electronic form 1002 from successively selected editing controls. The exemplary electronic form 1002 shown in FIG. 10 is entirely constructed using the text entry boxes (1004-1014), but other electronic forms can include other kinds of entry fields (i.e. editing controls), such as drop-down list boxes, list boxes, option button, check boxes, and so on. In another technique, the electronic form 1002 can be created based on any pre-existing .xsd schema document loaded into the hums application 910. The .xsd schema is an XML file that defines the structure and content type of the XML files that are associated with it. In another technique, the electronic form 1002 can be created based on an XML document. The forms application 910 will then create a schema based on the information in the input XML file. In another technique, the electronic form 1002 can be created based on a database schema. In this case, the forms application 910 will extract the schema of the data and convert that record set to XML representation. Still other techniques can be used to create electronic forms.

Once a form has been created, its design (and associated schema) can be further modified. For example, the forms application 910 allows the designing user 924 to modify existing editing controls used in the electronic form 1002, or add additional editing controls. For instance, the UI panel 1016 allows the designing user 924 to modify the editing control associated with the company data field 1006. Selecting a particular control type—for example a check box—will prompt the forms application 910 to substitute the control type previously used to receive company related information with the newly selected control type. There are many other ways to modify the electronic form 1002.

The creation of the form 1002 also creates an associated solution file. The solution file effectively forms a template that can be archived and subsequently used in a business (or other environment). FIG. 11 demonstrates an exemplary use of the form 1002. More specifically, this figure shows the presentation of the electronic form 1002 in the editing mode of operation of the forms application 910. In this case, the editing user 208 is filing text into the text entry fields in the UI presentation 926. For instance, the editing user 208 is currently entering text 1102 into the text field 1010. The editing user 208 can select a particular part of the electronic form 1002 in a conventional manner, such as by pointing to and clicking on a particular field in the electronic form 1002 using the mouse device 214.

As described in Section A of this disclosure, data entry fields (1004-1014) in the electronic form 1002 are mapped to underlying structured data 202—in this case, XML document 1104. This mapping is achieved via annotations added to the HTML document used to render the electronic form 1002. More specifically, the annotations act as references which point to particular parts of the XML document 1104 associated with the data entry fields (1004-1014) in the electronic form 1002. Through this mechanism, the data entered by the editing user 208 is routed back to the XML document 1104 and stored in its data structure at appropriate locations. This mapping functionality is represented in FIG. 11 by the arrow 1106.

C. Exemplary Method of Operation

Figure 12:
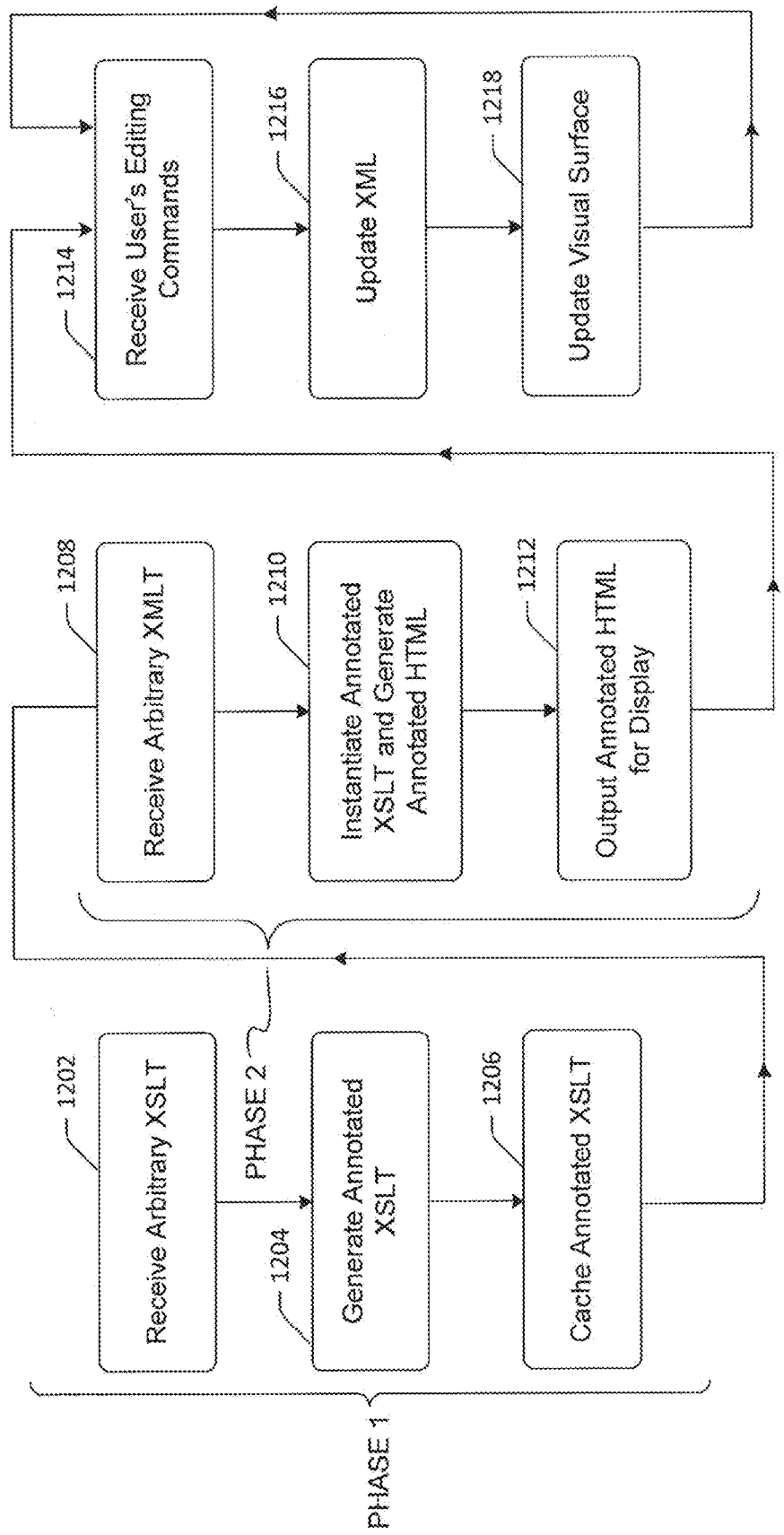
FIG. 12 shows an exemplary procedure for generating annotations in an electronic form that provide mapping back to underlying data, and for subsequently editing the electronic form having those annotations.

FIG. 12 shows an exemplary procedure 1200 for creating and editing an electronic form. The procedure 1200 can be implemented in software or firmware, or a combination of software and firmware.

Phase 1 of the procedure 1200 includes steps 1202, 1204, and 1206. Step 1202 involves receiving XSLT information. This step 1202 might correspond to receiving an XSLT file created in response to the creation or modification of an electronic form, or from some other source. The XSLT information is arbitrary in the sense that it does not need to be developed specifically to accommodate the annotation functionality which is subsequently applied to it. An exemplary technique for creating an XSLT file in the context of electronic forms processing is described in commonly assigned U.S. patent application Ser. No. 10/395,506, filed on Mar. 24, 2003, entitled "System and Method for Designing Electronic Forms," naming Christina Fortini, Jean D. Paoli, Laurent Mollicone, Bulusu Krishna Mohan, and Alessandro Catorcini, which is incorporated herein by reference in its entirety. Step 1204 involves automatically annotating the arbitrary XSLT by adding mapping functions to it. As described above, these mapping functions can constitute extension functions added to the XSLT information at inner and out mapping locations. Step 1206 involves caching the annotated XSLT for later retrieval and use. The XSLT author can also manually add mapping functions to the XSLT information to supplement the automatic annotations added to the XSLT information.

Phase 2 of the procedure 1200 involves steps 1208, 1210, and 1212. Step 1208 entails receiving an XML document to be processed using the annotated XSLT information. The XML document can be considered arbitrary, like the XSLT information, in the sense that it does not have to be structured to accommodate the annotation procedure that is subsequently applied to it; any XML document will suffice. Step 1210 entails executing the mapping functions in the annotated XSLT information to return specific reference values that point back to the structured data 202. Step 1212 entails outputting an annotated HTML document (or some other markup language document) for display. The HTML document is annotated by including references that point back to respective locations within the structured input data 202.

Following display of the annotated HTML document, the editing user 208 can edit the displayed electronic form. Steps 1214, 1216, and 1218 pertain to this editing operation. In step 1214, the forms application 910 receives the editing user 208's commands to execute an editing operation. These commands may be the result of the user pointing to a particular part of the visual surface 206 using the mouse device 214 and then inputting data into data entry fields using the keyboard 212. Other ways of editing the electronic form can be used. Step 1216 involves muting the editing user 208's input back to the source XML document for storage at appropriate locations in the structured XML data. To perform this routing, the above-described mapping annotations are used to link selected parts of the visual surface with associated parts of the XML source data. Finally, in step 1218, the procedure 1200 involves updating the visual surface 206 to reflect the user's editing operations with respect to the visual surface 206. An exemplary technique for performing step 1218 is described in commonly assigned application Ser. No. 10/404,312, filed on Mar. 31, 2003, entitled "System and Method for Incrementally Transforming and Rendering Hierarchical Data Files," naming Prakash Sikchi, Dragos Barac, Ranjan Aggarwal, and Steven J. Mooney as inventors, and incorporated herein by reference in its entirety.

D. Exemplary Computer Environment

Figure 13:
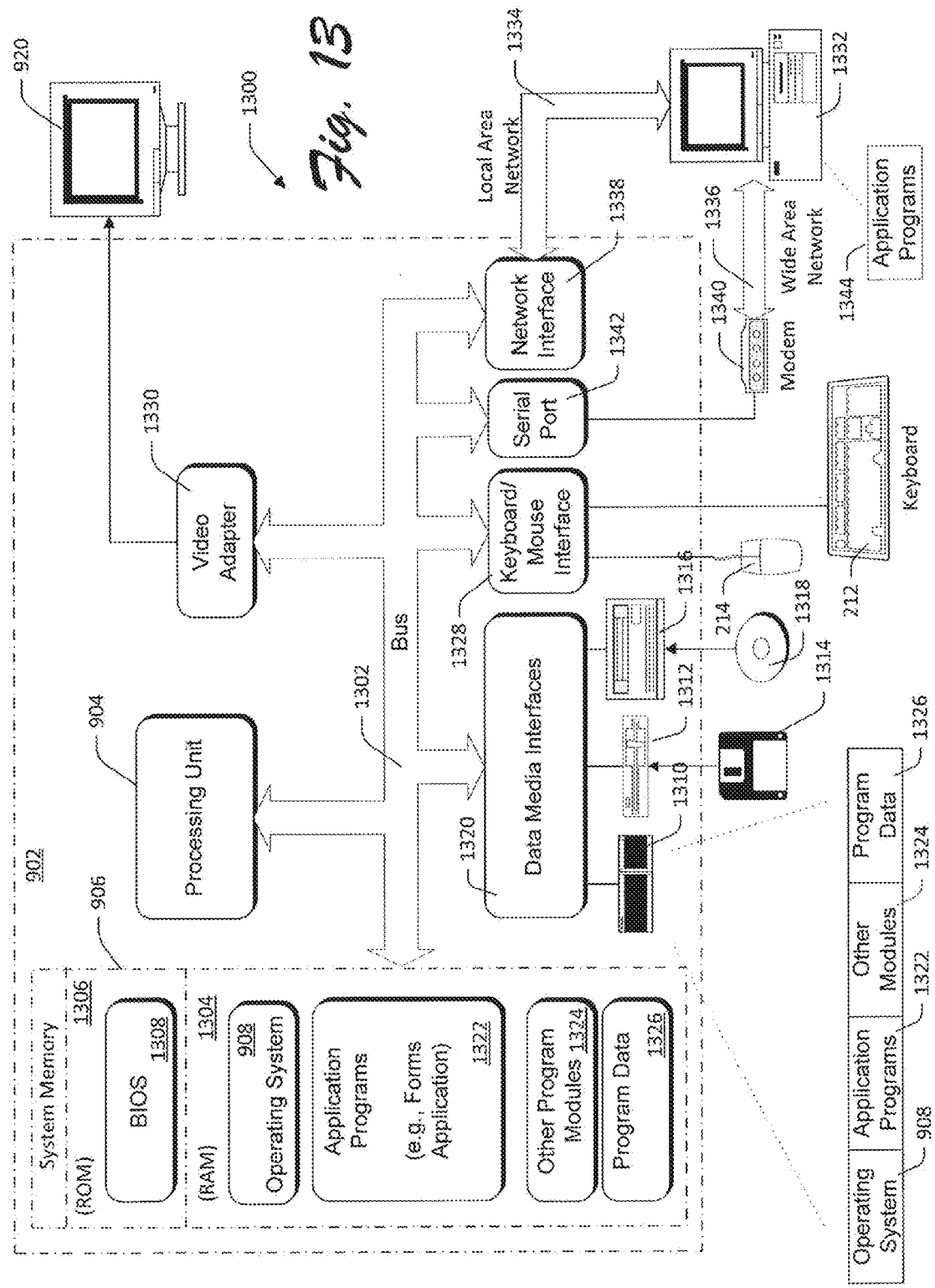
FIG. 13 shows an exemplary computing environment for implementing the data processing application shown in FIG. 2.

FIG. 13 illustrates one example of a computing environment 1300 within which the above-described forms application 910 can be either fully or partially implemented. The computing environment 1300 includes the general purpose computer 902 and display device 920 discussed in the context of FIG. 9. However, the computing environment 1300 can include other kinds of computer and network architecture. For example, although not shown, the computer environment 1300 an include hand-held or laptop devices, set top boxes, programmable consumer electronics, mainframe computers, gaming consoles, etc. Further, FIG. 13 shows elements of the computer environment 1300 grouped together to facilitate discussion. However, the computing environment 1300 can employ distributed processing configuration. In a distributed computing environment, computing resources can be physically dispersed throughout the environment.

Exemplary computer 902 includes one or more processors or processing units 904, a system memory 906, and a bus 1302. The bus 1302 connects various system components together. For instance, the bus 1302 connects the processor 904 to the system memory 906. The bus 1302 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 can also include a variety of computer readable media, including a variety of types of volatile and non-volatile media, each of which can be removable or non-removable. For example, system memory 906 includes computer readable media in the form of volatile memory, such as random access memory (RAM) 1304, and non-volatile memory, such as read only memory (ROM) 1306. ROM 1306 includes an input/output system (BIOS) 1308 that contains the basic routines that help to transfer information between elements within computer 902, such as during startup. RAM 1304 typically contains data and/or program modules in a form that can be quickly accessed by processing unit 904.

Other kinds of computer storage media include a hard disk drive 1310 for reading from and writing to a non-removable, non-volatile magnetic media, a magnetic disk drive 1312 for reading from and writing to a removable, non-volatile magnetic disk 1314 (e.g., a "floppy disk"), and an optical disk drive 1316 for reading from and/or writing to a removable, non-volatile optical disk 1318 such as a CD-ROM, DVD-ROM, or other optical media. The hard disk drive 1310, magnetic disk drive 1312, and optical disk drive 1316 are each connected to the system bus 1302 by one or more data media interfaces 1320. Alternatively, the hard disk drive 1310, magnetic disk drive 1312, and optical disk drive 1316 can be connected to the system bus 1302 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 908, one or more application programs 1322 (such as the forms application 910), other program modules 1324, and program data 1326.

The computer environment 1300 can include a variety of input devices. For instance, the computer environment 1300 includes the keyboard 212 and a pointing device 214 (e.g., a "mouse") for entering commands and information into computer 902. The computer environment 1300 can include other input devices (not illustrated), such as a microphone, joystick, game pad, satellite dish, serial port, scanner, card reading devices, digital or video camera, etc. Input/output interfaces 1328 couple the input devices to the processing unit 904. More generally, input devices can be coupled to the computer 902 through any kind of interface and bus structures, such as a parallel port, serial port, game port, universal serial bus (USB) port, etc.

The computer environment 1300 also includes the display device 920. A video adapter 1330 couples the display device 920 to the bus 1302. In addition to the display device 920, the computer environment 1300 can include other output peripheral devices, such as speakers (not shown), a printer (not shown), etc.

Computer 902 can operate in a networked environment using logical connections to one or more remote computers, such as a remote computing device 1332. The remote computing device 1332 can comprise any kind of computer equipment, including a general purpose personal computer, portable computer, a server, a router, a network computer, a peer device or other common network node, etc. Remote computing device 1332 can include all of the features discussed above with respect to computer 902, or some subset thereof.

Any type of network can be used to couple the computer 902 with remote computing device 1332, such as a local area network (LAN) 1334, or a wide area network (WAN) 1336 (such as the Internet). When implemented in a LAN networking environment, the computer 902 connects to local network 1334 via a network interface or adapter 1338. When implemented in a WAN networking environment, the computer 902 can connect to the WAN 1336 via a modem 1340 or other connection strategy. The modem 1340 can be located internal or external to computer 902, and can be connected to the bus 1302 via serial I/O interfaces 1342 other appropriate coupling mechanism. Although not illustrated, the computing environment 1300 can provide wireless communication functionality for connecting computer 902 with remote computing device 1332 (e.g., via modulated radio signals, modulated infrared signals, etc.).

In a networked environment, the computer 902 can draw from program modules stored in a remote memory storage device 1344. Generally, the depiction of program modules as discrete blocks in FIG. 13 serves only to facilitate discussion; in actuality, the programs modules can be distributed over the computing environment 1300, and this distribution can change in a dynamic fashion as the modules are executed by the processing unit 904.

Wherever physically stored, one or more memory modules 906, 1314, 1318, 1344, etc. can be provided to store the forms application 910 programming code.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system comprising:
    a memory; and
    at least one processor operatively connected with the memory, the processor executing operations that comprise:
        receiving an indication that an editing control has been created that is used to control data entry into an electronic document,
        creating an editing component based on the received indication, wherein the editing component comprises first data that identifies the editing component and second data that specifies how a structured data element is editable in response to manipulation of the editing control in the electronic document, and
        displaying the first data and the second data of the created editing component in a markup language document that corresponds with the electronic document.

2. The system of claim 1, wherein the created editing control is selected from the group consisting of a table editing control, a plain list editing control, a bulleted list editing control, a numbered list editing control, a rich text box editing control, and a text box editing control.

3. The system of claim 2, wherein the editing control is a table editing control, and wherein the editing component is an xCollection editing component.

4. The system of claim 1, wherein the created editing component edits an XML node associated with an XML document.

5. The system of claim 4, wherein the XML node is the parent node of the structured data element.

6. The system of claim 1, wherein the structured data element is displayed in the markup language document.

7. The system of claim 6, wherein the electronic document is an HTML document.

8. A computer-implemented method for mapping structured data to a visual presentation, the computer-implemented method comprising:
    receiving an indication that an editing control has been created that is used to control data entry into an electronic document;
    creating an editing component based on the received indication, wherein the editing component comprises first data that identifies the editing component and second data that specifies how a structured data element is editable in response to manipulation of the editing control in the electronic document; and
    in response to received input for manipulation of the editing control, using a markup language document to determine how the editing control is editable in the electronic document, wherein the second data is presented in the markup language document.

9. The computer-implemented method of claim 8, wherein the created editing control is selected from the group consisting of a table editing control, a plain list editing control, a bulleted list editing control, a numbered list editing control, a rich text box editing control, and a text box editing control.

10. The computer implemented method of claim 9, wherein the editing control is a table editing control, and wherein the editing component is an xCollection editing component.

11. The computer implemented method of claim 8, wherein the created editing component edits a node associated with an XML document.

12. The computer-implemented method of claim 11, wherein the node is part of the structured data element.

13. The computer-implemented method of claim 8, wherein the structured data element is displayed in the electronic document.

14. The computer-implemented method of claim 8, wherein the electronic document is an HTML document.

15. A computer storage device housing instructions that, when executed, are capable of performing a method comprising:
    receiving an indication that an editing control has been created that is used to control data entry into an electronic document;
    creating an editing component based on the received indication, wherein the editing component comprises first data that identifies the editing component and second data that specifies how a structured data element is editable in response to manipulation of the editing control in the electronic document; and
    displaying the first data and the second data of the created editing component in a markup language document that corresponds with the electronic document.

16. The computer storage device of claim 15, wherein the created editing control is selected from the group consisting of a table editing control, a plain list editing control, a bulleted list editing control, a numbered list editing control, a rich text box editing control, and a text box editing control.

17. The computer storage device of claim 16, wherein the editing control is a table editing control, and wherein the editing component is an xCollection editing component.

18. The computer implemented method of claim 15, wherein the created editing component edits a node associated with an XML document.

19. The computer-implemented method of claim 18, wherein the node is part of the structured data element.

20. The computer-implemented method of claim 15, wherein the structured data element is displayed in an HTML document.

\* \* \* \* \*